United States Patent
Aoki et al.

(10) Patent No.: US 6,233,654 B1
(45) Date of Patent: May 15, 2001

(54) RECORDING APPARATUS HAVING A PARTIALLY EXCHANGEABLE DISK ARRAY, A LOADING/UNLOADING DEVICE, AND A CONTROL DEVICE AND WHICH USES A DISK-LIKE RECORDING MEDIUM

(75) Inventors: Yoshio Aoki, San Diego, CA (US); Hideyoshi Horimai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/168,362

(22) Filed: Oct. 7, 1998

Related U.S. Application Data

(63) Continuation of application No. 08/611,174, filed on Mar. 5, 1996, now Pat. No. 5,900,010.

(51) Int. Cl.[7] .............................. G06F 11/20; G11B 17/22
(52) U.S. Cl. .............................. 711/114; 711/114; 714/6; 369/30
(58) Field of Search .................................. 711/114, 113; 714/6, 7; 369/30, 34

(56) References Cited

U.S. PATENT DOCUMENTS

| | | | | |
|---|---|---|---|---|
| 5,034,914 | * | 7/1991 | Osterlund | 710/52 |
| 5,155,835 | * | 10/1992 | Belsan | 711/114 |
| 5,276,867 | * | 1/1994 | Kenley et al. | 707/204 |
| 5,440,686 | * | 8/1995 | Dahman et al. | 345/511 |
| 5,465,350 | * | 11/1995 | Fueki | 707/204 |
| 5,495,457 | * | 2/1996 | Takasi | 369/30 |
| 5,497,457 | * | 3/1996 | Ford | 714/6 |
| 5,528,566 | * | 6/1996 | McGee et al. | 369/37 |
| 5,574,851 | * | 11/1996 | Rathunde | 714/7 |
| 5,636,356 | * | 6/1997 | Kakuta et al. | 711/114 |
| 5,729,552 | * | 3/1998 | Yorimitsu | 714/718 |
| 5,900,010 | * | 5/1999 | Aoki et al. | 714/114 |

OTHER PUBLICATIONS

Paul Massiglin, "The RAIDbook", A Source Book for Disk Array Technology, Fourth Edition, The RAID Advisory Board, St. Peter, Mn., Aug. 8, 1994.*
"HP's Smart Auto–RAID Backup Technology", Newsbytes, pNEW08040012, Aug. 4, 1995.*
De Voe, Deborah, "Vendors to Unveil RAID Storage System", InfoWorld, vol. 18, No. 13 p. 42(1), Mar. 25, 1996.*
Crowthers, Edward and Lender, Joe,"RAID Technology Advances to the Next Level", Computer Technology Review, vol. 16, No. 3, p. 46, Mar. 1996.*
Storage Dimensions, "Fault–Tolerant Storage for Non–Stop Networks", pp. 14–18 and pp. 42–43, Aug. 15, 1995.*

* cited by examiner

*Primary Examiner*—Do Hyun Yoo
*Assistant Examiner*—Hong Kim
(74) *Attorney, Agent, or Firm*—Frommer Lawrence & Haug, LLP; William S. Frommer; Dennis M. Smid

(57) ABSTRACT

When a plurality of magneto-optic disks are inserted via a mail slot provided in a front panel block, a controller controls a manipulator of a robotics block so as to load magneto-optic (MO) disks in MO disk arrays constituted by connecting a plurality of MO drives and one Redundant Array of Inexpensive Disk (RAID) controller. Then, when a RAID recording system is selected by the user, the controller controls the recording operation of the MO disk arrays in accordance with the selected recording system. More specifically, when a RAID recording striping system is selected by the user, the controller divides the data supplied from the outside and controls the recording operation of the MO drives so as to perform the recording in parallel by the MO drives. As a result, data such as image data may be handled with a high transfer speed.

9 Claims, 48 Drawing Sheets

FIG.13

WRITE DIRECTION →

| ī＼j= | 0 | 1 | ... | 7 | 8 | 9 | 10 | 11 | 12 | 13 | 14 | 15 |
|---|---|---|---|---|---|---|---|---|---|---|---|---|
| 130 | D0 | D1 | | D7 | D8 | D9 | D10 | D11 | D12 | D13 | D14 | D15 |
| 129 | D16 | D17 | | D23 | D24 | D25 | D26 | D27 | D28 | D29 | D30 | D31 |
| 128 | D32 | D33 | | D39 | D40 | D41 | D42 | D43 | D44 | D45 | D46 | D47 |
| 127 | D48 | D49 | | D55 | D56 | D57 | D58 | D59 | D60 | D61 | D62 | D63 |
| 126 | D64 | D65 | | D71 | D72 | D73 | D74 | D75 | D76 | D77 | D78 | D79 |
| 125 | D80 | D81 | | D87 | D88 | D89 | D90 | D91 | D92 | D93 | D94 | D95 |
| 124 | D96 | D97 | | D103 | D104 | D105 | D106 | D107 | D108 | D109 | D110 | D111 |
| 123 | D112 | D113 | | D119 | D120 | D121 | D122 | D123 | D124 | D125 | D126 | D127 |
| ... | | | | | | | | | | | | |
| 4 | D2016 | D2017 | | D2023 | D2024 | D2025 | D2026 | D2027 | D2028 | D2029 | D2030 | D2031 |
| 3 | D2032 | D2033 | | D2039 | D2040 | D2041 | D2042 | D2043 | D2044 | D2045 | D2046 | D2047 |
| 2 | U.D. | U.D. | | U.D. | U.D. | U.D. | U.D. | U.D. | U.D. | U.D. | U.D. | U.D. |
| 1 | U.D. | U.D. | | U.D. | U.D. | U.D. | U.D. | U.D. | U.D. | U.D. | U.D. | U.D. |
| 0 | U.D. | U.D. | | U.D. | CRC1 | CRC2 | CRC3 | CRC4 | CRC5 | CRC6 | CRC7 | CRC8 |
| -1 | E1,1 | E2,1 | | E8,1 | E9,1 | E10,1 | E11,1 | E12,1 | E13,1 | E14,1 | E15,1 | E16,1 |
| -2 | E1,2 | E2,2 | | E8,2 | E9,2 | E10,2 | E11,2 | E12,2 | E13,2 | E14,2 | E15,2 | E16,2 |
| -3 | E1,3 | E2,3 | | E8,3 | E9,3 | E10,3 | E11,3 | E12,3 | E13,3 | E14,3 | E15,3 | E16,3 |
| -4 | E1,4 | E2,4 | | E8,4 | E9,4 | E10,4 | E11,4 | E12,4 | E13,4 | E14,4 | E15,4 | E16,4 |
| ... | | | | | | | | | | | | |
| -13 | E1,13 | E2,13 | | E8,13 | E9,13 | E10,13 | E11,13 | E12,13 | E13,13 | E14,13 | E15,13 | E16,13 |
| -14 | E1,14 | E2,14 | | E8,14 | E9,14 | E10,14 | E11,14 | E12,14 | E13,14 | E14,14 | E15,14 | E16,14 |
| -15 | E1,15 | E2,15 | | E8,15 | E9,15 | E10,15 | E11,15 | E12,15 | E13,15 | E14,15 | E15,15 | E16,15 |
| -16 | E1,16 | E2,16 | | E8,16 | E9,16 | E10,16 | E11,16 | E12,16 | E13,16 | E14,16 | E15,16 | E16,16 |

TOTAL 145×16=2352 BYTES

← 145 CODE WORD →

| ZONE | OUTER RADIUS (μm) | TRACKS | CLOCK | SECTOR | BYTE/SEG | SEG/SECTOR | MIN DENSITY | CAP (MB) |
|---|---|---|---|---|---|---|---|---|
| GCP | 42100 | 736 | 24 | 40 | 46 | 65 | 0.42817 | 0.078 |
| BUFFER TRACKS | 41216.8 | 2 | 48 | 100 | 46 | 65 | 0.42811 | 0.195 |
| CONTROL TRACKS | 41214.4 | 5 | 48 | 40 | 46 | 65 | 0.42808 | 0.078 |
| BUFFER TRACKS | 41208.4 | 2 | 48 | 100 | 46 | 65 | 0.42802 | 0.195 |
| TEST TRACKS | 41206 | 5 | 48 | 20800 | 46 | 53 | 0.41745 | 40.625 |
| USER ZONE 0 | 41200 | 848 | 48 | 20800 | 46 | 53 | 0.41745 | 40.625 |
| USER ZONE 1 | 40182.4 | 864 | 47 | 20800 | 45 | 54 | 0.41533 | 40.625 |
| USER ZONE 2 | 39145.6 | 880 | 46 | 20800 | 44 | 55 | 0.41291 | 40.625 |
| USER ZONE 3 | 38089.6 | 912 | 45 | 20800 | 43 | 57 | 0.40996 | 40.625 |
| USER ZONE 4 | 36995.2 | 944 | 43 | 20800 | 41 | 59 | 0.41589 | 40.625 |
| USER ZONE 5 | 35862.4 | 976 | 42 | 20800 | 40 | 61 | 0.41189 | 40.625 |
| USER ZONE 6 | 34691.2 | 1024 | 40 | 20800 | 38 | 64 | 0.41716 | 40.625 |
| USER ZONE 7 | 33462.4 | 1056 | 39 | 20800 | 37 | 66 | 0.41166 | 40.625 |
| USER ZONE 8 | 32195.2 | 1120 | 37 | 20800 | 35 | 70 | 0.4158 | 40.625 |
| USER ZONE 9 | 30851.2 | 1184 | 35 | 20800 | 33 | 74 | 0.41931 | 40.625 |
| USER ZONE 10 | 29430.4 | 1216 | 34 | 20800 | 32 | 76 | 0.41024 | 40.625 |
| USER ZONE 11 | 27971.2 | 1296 | 32 | 20800 | 30 | 81 | 0.41165 | 40.625 |
| USER ZONE 12 | 26416 | 1392 | 30 | 20800 | 28 | 87 | 0.41133 | 40.625 |
| USER ZONE 13 | 24745.6 | 1488 | 28 | 20800 | 26 | 93 | 0.40891 | 40.625 |
| USER ZONE 14 | 22960 | 1696 | 25 | 20800 | 23 | 106 | 0.41738 | 40.625 |
| USER ZONE 15 | 20924.8 | 770 | 24 | 9100 | 22 | 110 | 0.41557 | 17.773 |
| TEST TRACKS | 20000.8 | 5 | 24 | 50 | 22 | 130 | 0.41545 | 0.098 |
| BUFFER TRACKS | 19994.8 | 2 | 24 | 20 | 22 | 130 | 0.4154 | 0.039 |
| CONTROL TRACKS | 19992.4 | 5 | 24 | 50 | 22 | 130 | 0.41527 | 0.098 |
| BUFFER TRACKS | 19986.4 | 2 | 24 | 20 | 22 | 130 | 0.41522 | 0.039 |
| GCP | 19984 19000 | 820 | 24 | | | | | |

FIG.15

☐ INNER CIRCUMFERENTIAL SFP TRACK PHYSICAL ADDRESS
BIT 15 TO BIT 0 : \*\*\*\*\*\*\*\*

SCRAMBLE TABLE

| 80 | 6a | 46 | b4 | 9c | 90 | 92 | ed | 78 | c1 | 8a | e9 | 86 | eb | f9 | 7e |
|----|----|----|----|----|----|----|----|----|----|----|----|----|----|----|----|
| 40 | 35 | 23 | 5a | 4e | 48 | c9 | 76 | bc | 60 | c5 | 74 | c3 | f5 | 7c | 3f |
| a0 | 9a | 11 | 2d | 27 | a4 | 64 | 3b | 5e | b0 | 62 | ba | e1 | 7a | be | 1f |
| 50 | cd | 88 | 96 | 13 | 52 | b2 | 1d | 2f | 58 | 31 | dd | 70 | 3d | df | 0f |
| a8 | 66 | 44 | cd | 09 | 29 | d9 | 8e | 17 | ac | 98 | 6e | b8 | 9e | ef | 07 |
| 54 | 33 | a2 | e5 | 84 | 94 | 6c | c7 | 0b | 56 | 4c | 37 | 5c | cf | f7 | 03 |
| aa | 19 | d1 | 72 | 42 | 4a | b6 | e3 | 05 | 2b | a6 | 1b | ae | e7 | fb | 01 |
| d5 | 8c | 68 | 39 | 21 | 25 | db | f1 | 82 | 15 | d3 | 0d | d7 | f3 | fd |    |

FOCUS ERROR = (A+C)−(B+D)
MAGNETO-OPTIC SIGNAL = (A+B)−(C+D)
RF SIGNAL = E

RAID1 (MIRRORING)

RAID3 (STRIPING)

RAID5 (STRIPING)

RECORDING APPARATUS HAVING A PARTIALLY EXCHANGEABLE DISK ARRAY, A LOADING/UNLOADING DEVICE, AND A CONTROL DEVICE AND WHICH USES A DISK-LIKE RECORDING MEDIUM

CROSS-REFERENCE TO RELATED APPLICATION

The present application is a continuation of application Ser. No. 08/611,174 filed on Mar. 5, 1996 now U.S. Pat. No. 5,900,010 which issued May 4, 1999.

TECHNICAL FIELD

The present invention relates to a recording apparatus which uses a writable disk-like recording medium such as for example a hard disk, a phase varying optical disk, an organic dye disk, a magneto-optic disk, etc. and performs recording control for a disk array formed by connecting a plurality of drives by a Redundant Array of Inexpensive Disk (RAID) recording system to enable handling of a high data transfer speed, an unlimited increase of capacity, etc.

BACKGROUND ART

A speed of transfer of data of 4 M to 8 MB/second is sufficient for handling data base processing and desk top publishing (DTP), but when handling image data having a large amount of data, a further higher speed of transfer of data is necessary. Namely, when fetching full color image data consisting of 640 pixels×480 pixels, a speed of transfer of data of about 26 MB per second is required, but hard disk drives of current personal computers cannot cope handle such a speed of transfer of data. For this reason, in hard disk drives, to enable handling of data of a high transfer speed such as image data, a disk array system was developed.

This disk array system is constituted by for example a first hard disk drive (HDD1) to a fifth hard disk drive (HDD5) as a plurality of hard disk drives. The recording of the data is carried out by RAID (Redundant Array of Inexpensive Disk) 1 to RAID5 recording systems defined for individual functions and individual performances. Note that, among the RAID1 to RAID5, the RAID1, RAID3, and RAID5 systems have actually been used as recording systems.

More specifically, when recording one series of data consisting of data 1, data 2, data 3, . . . attaching importance to safety, the recording of the data is carried out by using a mirroring system, that is, the RAID1 recording system. This mirroring system is designed to record the same data of the data 1, data 2, data 3, . . . by each of the first to fifth hard disk drives. Due to this, even in a case where trouble occurs in for example the first hard disk drive and the series of data was not correctly recorded, the same data as that for the first hard disk drive is recorded by each of the remaining second to fifth hard disk drives and therefore the safety of the data can be secured.

Next, when recording the series of data attaching importance to the speed of transfer of data, the recording of the data is carried out by using a striping system, that is, one of the RAID3 or RAID5 recording systems.

The RAID3 striping system is designed to use a specific hard disk drive among a plurality of hard disk drives as a hard disk drive for parity data. In this case, the fifth hard disk drive is used as the hard disk drive for the parity data. This RAID3 striping system is designed to record the data 1, data 5, data 9, . . . by the first hard disk drive; record the data 2, data 6, data 10, . . . by the second hard disk drive; record the data 3, data 7, data 11, . . . by the third hard disk drive; and record the data 4, data 8, data 12, . . . by the fourth hard disk drive. The parity data of the data 1 to data 4, the parity data of the data 5 to data 8, the parity data of the data 9 to data 12, . . . are recorded by the fifth hard disk drive. Due to this, the series of data can be recorded in parallel by the hard disk drives, and therefore the system can handle data of a high transfer speed.

Next, the RAID5 striping system is designed to record the parity data dispersed among a plurality of hard disk drives. This striping system of RAID5 is designed to record the data 1, data 2, data 3, and data 4 by the first hard disk drive to fourth hard disk drive and, at the same time, record the parity data of the data 1 to data 4 by the fifth hard disk drive; record the data 5 to data 7 and the data 8 by the first hard disk drive to third hard disk drive and by the fifth hard disk drive, respectively, and, at the same time, record the parity data of the data 5 to data 8 by the fourth hard disk drive; record the data 9 to data 10 and the data 11 and data 12 by the first and second hard disk drives and by the fourth and fifth hard disk drives, respectively, and, at the same time, record the parity data of the data 9 to data 12 by the third hard disk drive. Due to this, the series of data can be recorded in parallel by the hard disk drives and therefore the system can handle data of a high transfer speed.

In the RAID3 recording system, the parity data is recorded only by the fifth hard disk drive, and therefore the writing of the data cannot be carried out simultaneously by different hard disk drives, but in the RAID5 recording system, the parity data is recorded dispersed among the hard disk drives and therefore the writing of the data can be simultaneously carried out by the different hard disk drives and the overall performance can be improved.

The RAID1, RAID3, and RAID5 recording systems used in such a disk array system can be selected in accordance with the data to be recorded or the desire of the user. For this reason, image data which requires a high speed of transfer of data may be recorded by the RAID3 or RAID5 system which can handle a high speed of transfer of data.

However, in such a conventional disk array system, while since the first to fifth hard disk drives of the plurality of hard disk drives can be used connected with each other and therefore the virtual capacity is infinitely large, in practice, a single hard disk drive system is constituted by the first to fifth hard disk drives and therefore the capacity thereof is restricted to that of five hard disks. Also, for example even if 100 of these disk array systems are connected and used, each system is independent, and therefore it becomes difficult to comprehensively control them and therefore an increase of capacity still cannot be achieved. Further, even in a case where trouble occurs in just one hard disk drive, it is necessary to exchange all of the hard disk system and therefore it cannot be said to be a removable (easily partially exchangeable) system.

On the other hand, known in the past has been a "juke" device having a single magneto-optic disk drive and a disk changer unit for loading or removing a plurality of magneto-optic disks to and from the magneto-optic disk drive. This juke device writes data on the magneto-optic disk loaded in the magneto-optic disk drive When finishing writing the entire capacity of the magneto-optic disk, the disk changer unit exchanges the magneto-optic disk loaded in the disk drive with a new magneto-optic disk and continues the recording of the data. For this reason, this juke device enables the overall storage capacity to be made infinitely large by recording data taking out the magneto-optic disks which have finished being written on and successively loading new magneto-optic disks in the disk drive.

Here, since the juke device records the data by a single disk drive, there is a concern that the speed of transfer of data would be restricted to the data processing speed of the disk drive and that therefore data of a high speed of transfer could not be handled. For this reason, the juke device is provided with a hard disk which temporarily stores the supplied data, uses this as a buffer memory, and records the data read from the hard disk on the magneto-optic disk, thereby handling data of a high transfer speed.

However, since this juke device records data by a single disk drive, if a trouble occurs in the disk drive, it becomes impossible to record the data. On top of this, replacement entails replacement of the entire disk so this also could not be said to be a removable system. Also, even if a hard disk is used as a buffer memory, current hard disk drives cannot handle data of further higher transfer speeds such as the image data as mentioned above, and therefore there are limits to the transfer speeds of the data which can be handled.

OBJECT AND DISCLOSURE OF THE INVENTION

The present invention was made in consideration of this situation and has as an object thereof to provide a recording apparatus which can handle data of a high transfer speed such as image data, can achieve an unlimited increase of capacity, and can realize a removable system wherein partial exchange of a part where trouble occurs is easy without an interruption of the recording when such trouble occurs.

So as to achieve such an object, the recording apparatus according to the present invention is provided with a disk array comprised of a plurality of connected recording means for writing information on a loaded disk-like recording medium; a loading and unloading means for loading and unloading the disk-like recording medium to and from the respective recording means of the disk array; and a control means for controlling the loading and unloading of the disk-like recording medium by the loading and unloading means and, at the same time, controlling the recording by the disk array by a RAID recording system defined for individual functions and individual performances.

More specifically, as one of the RAID recording systems, there is a recording system referred to as striping. When this striping is selected, the control means divides a series of data and controls the respective recording means of the disk array so that the respective recording means record the information in parallel. Due to this, it is possible to record the information in parallel by the respective recording means and therefore handle data of a high transfer speed such as for example image data.

Also, the control means controls the loading and unloading means so as to exchange an already recorded disk-like recording medium with a new disk-like recording medium when finishing recording by a recording means. Due to this, whenever finishing recording by a recording means, a disk exchange is carried out and the recording can be continued, therefore an infinite increase of capacity can be achieved.

Further, by providing two or more disk arrays, when trouble occurs in one disk array, the disk array in which this trouble occurs is stopped and, at the same time, the other disk array is activated and the recording of the information is continued. During the time when the recording is carried out by this other disk array, the disk array in which the trouble occurs can be exchanged. For this reason, a removable system in which partial exchange of a part in which the trouble has occurred is easy can be provided.

BRIEF DESCRIPTION OF THE DRAWINGS

FIG. 13 is a view showing the data format of the data sector of the magneto-optic disk.

FIG. 15 is a view showing the set parameters of the area division of the magneto-optic disk.

BEST MODE FOR CARRYING OUT THE INVENTION

Figure 1:
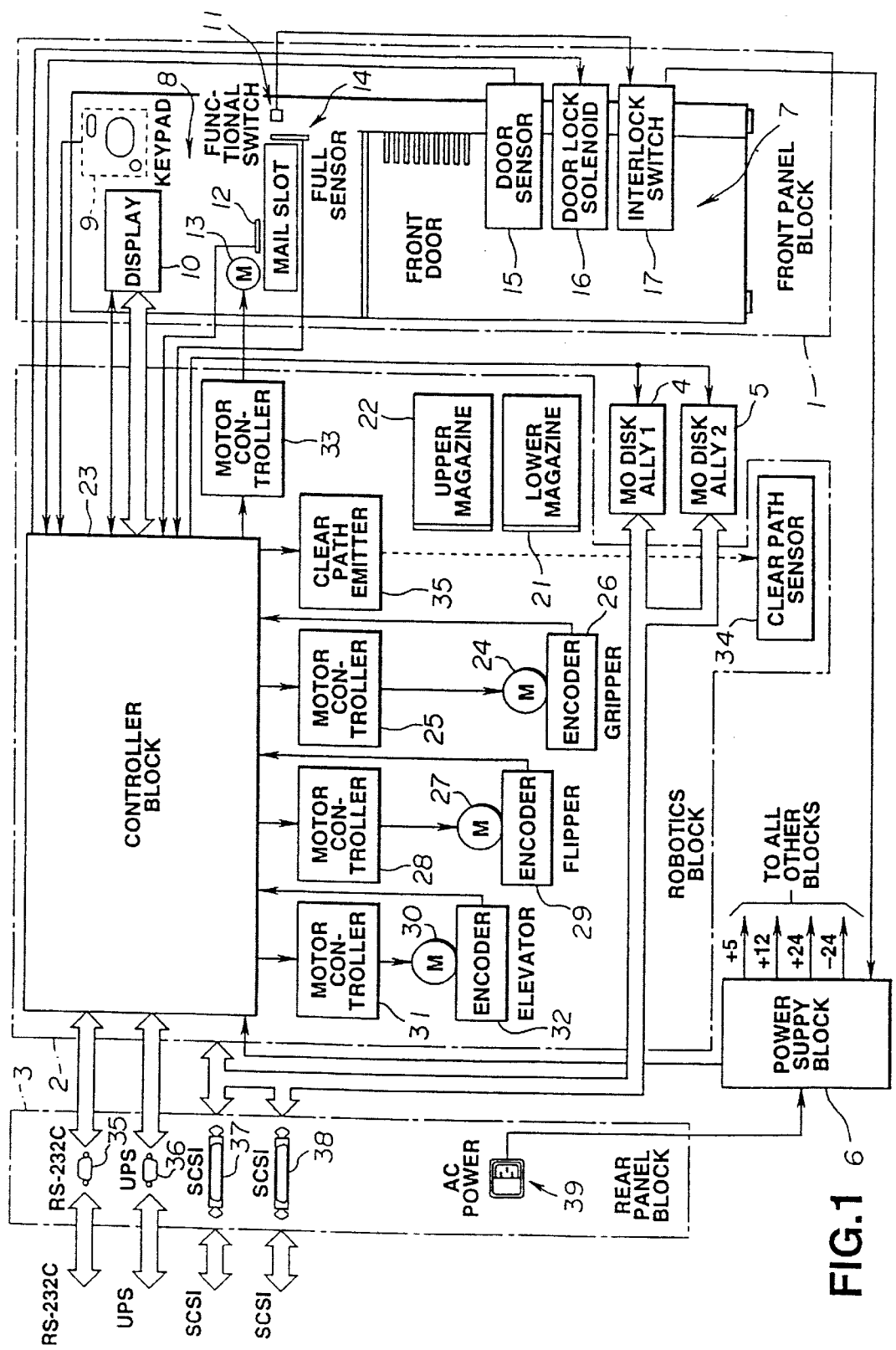
FIG. 1 is a block diagram of a juke device to which the recording apparatus according to the present invention is applied.

Below, a detailed explanation will be made of the best mode for realizing the recording apparatus according to the present invention by referring to the drawings.

The recording apparatus according to the present invention can be applied to a juke device as shown in FIG. 1. This juke device is constituted by: a front panel block 1 provided at the entire surface of the related juke device; a robotics block 2 constituting an internal portion of the related juke device; a rear panel block 3 provided at the rear side of the related juke device; a first Magneto-Optic (MO) disk array 4 which is provided inside the related juke device and is formed by connection of a plurality of magneto-optic disk drives; a second MO disk array 5 similarly formed by connection of a plurality of magneto-optic disk drives; and a power supply block 6 supplying a predetermined power to the respective portions of the related juke device.

The front panel block 1 is constituted by a front door 7 which is opened or closed when exchanging the respective MO disk arrays 4 and 5 etc. and a front panel 8.

In the front panel 8, provision is made of a keypad 9 provided with various types of operation keys; a display 10 for displaying for example an operation mode; a functional switch 11 for designating the opening or closing of the front door 7; a mail slot 12 which is an insertion/ejection port of the magneto-optic disk; a transfer motor 13 which transfers the magneto-optic disk inserted via the mail slot 12 to the mail box and, at the same time, transfers the ejected magneto-optic disk from the mail box to the mail slot 12; and a full sensor 14 detecting that the number of the magneto-optic disks inserted into the related juke device has reached the prescribed number.

In the front door 7 are provided a door sensor 15 detecting the opening or closing state of the related front door 7; a door lock solenoid (door lock coil) 16 for controlling the opening or closing of the related front door 7; and an interlock switch 17 for controlling the opening or closing of the related front door 7 in accordance with the operation of the functional switch 11.

Next, the robotics block 2 has: a lower magazine 21 which can accommodate 10 magneto-optic disks inside the same; an upper magazine which is provided so as to be stacked on the top surface of the lower magazine 21 and can accommodate 10 magneto-optic disks inside the same; and a controller block 23 for controlling the entire related juke device. Also, the robotics block 2 has: a motor 24 for a grip operation for controlling the grip operation of a manipulator 40 for moving the magneto-optic disk inserted into the related juke device to a predetermined position; a motor controller 25 for the grip operation which controls the rotational speed and rotational direction of the motor 24 for the grip operation in accordance with the controller block 23; and an encoder 29 for the grip operation which detects the rotational speed and rotational direction of the motor 24 for the grip operation and supplies this detection data to the controller block 23. Also, the robotics block 2 has: a motor 27 for rotation operation which controls the manipulator 40 to rotate in a clockwise direction, counterclockwise direction, or a horizontal direction; a motor controller 28 for the rotation operation for controlling the rotational speed and the rotational direction of the motor 27 for the rotation operation under the control of the controller block 23; and an encoder 29 for the rotation operation which detects the rotational speed and rotational direction of the motor 27 for the rotation operation and supplies this detection data to the controller block 23. Also, the robotics clock 2 has: a motor 30 for a vertical operation for controlling the movement of the manipulator 40 in the vertical direction; a motor controller 31 for the vertical operation for controlling the rotational speed and rotational direction of the motor 30 for the vertical operation under the control of the controller block 23; and an encoder 32 for the vertical operation which detects the rotational speed and rotational direction of the motor 30 for the vertical operation and supplies this detection data to the controller block 23. Also, the robotics clock 2 has: a transfer motor controller 33 which controls the rotational speed and rotational direction of the transfer motor 13 for performing the insertion and ejection operation of the magneto-optic disks via the mail slot 12; a clear pass sensor 34; and a clear pass emitter 20.

Next, the rear panel block 3 has: an RS232 connector terminal 35 which is an input/output terminal for serial transmission; a UPS (Uninterruptible Power System) connector terminal 36; a first for SCSI connector terminal 37 which is an input/output terminal for parallel transmission; a second SCSI connector terminal 38 which is similarly an input/output terminal for parallel transmission; and an AC power source connector terminal 39 connected to commercial power source.

The RS232C connector terminal 35 and the UPS connector terminal 36 are connected to the controller block 23, respectively. The controller block 23 converts the serial data supplied via the RS232C connector terminal 35 to parallel data and supplies the same to the respective MO disk arrays 4 and 5 and, at the same time, converts the parallel data from the respective MO disk arrays 4 and 5 to serial data and supplies the same to the RS232C connector terminal 35.

Also, the SCSI connector terminals 37 and 38 are connected to the controller block 23 and the respective MO disk arrays 4 and 5. The respective MO disk arrays 4 and 5 directly perform the transfer of the data via the SCSI connector terminals 37 and 38, and the controller block 23 converts the parallel data from the respective MO disk arrays 4 and 5 to serial data and supplies the same to the RS232C connector terminal 35.

Also, the AC power source connector terminal 39 is connected to the power supply block 6. The power supply block 6 forms powers of +5V, +12V, +24V, and −24V based on the commercial power source fetched via this AC power source connector terminal 39 and supplies the same to the respective portions.

Figure 2:
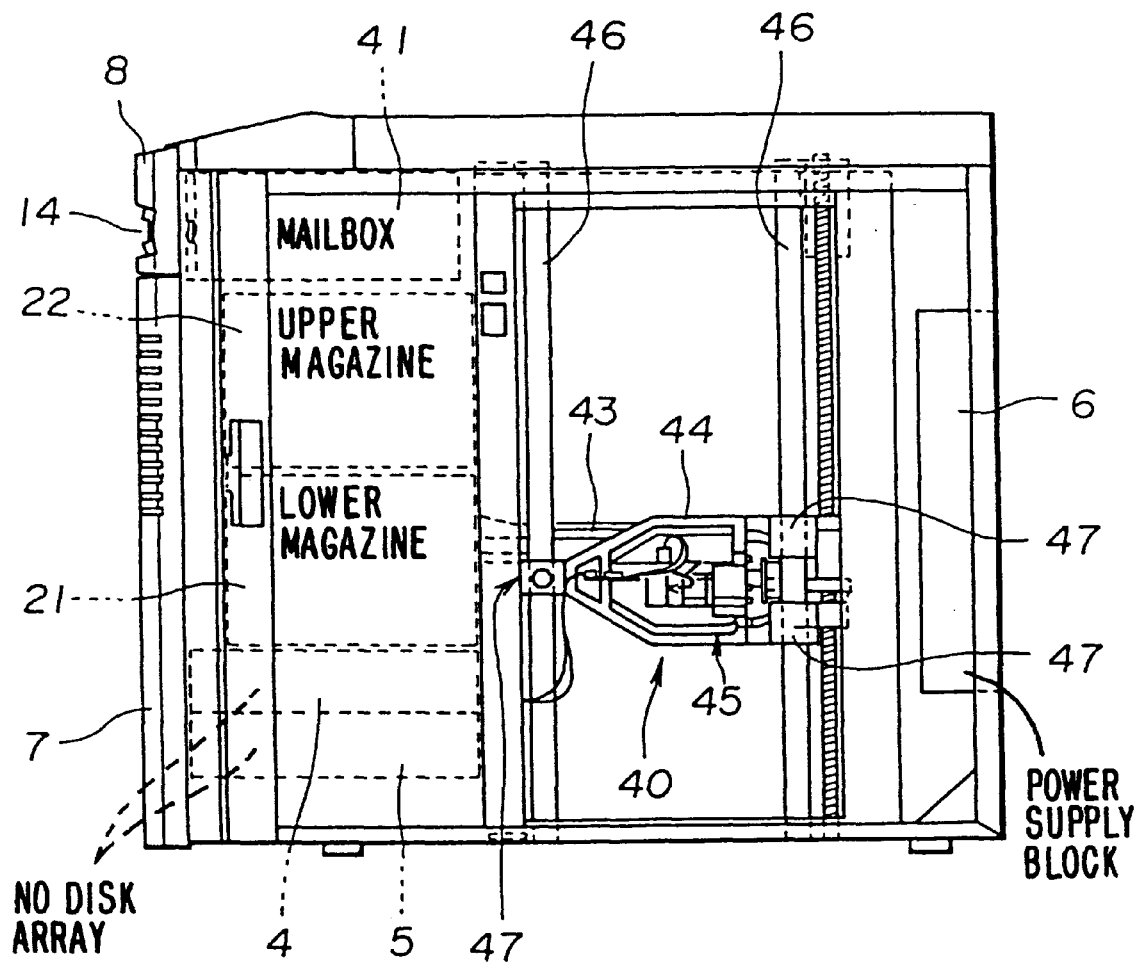
FIG. 2 is a lateral cross-sectional view of the juke device.

Next, the manipulator 40 is constituted by, as shown in FIG. 2, a carriage 43 having a gripper 40 which performs the operation of gripping and lifting the magneto-optic disks transferred to the mail box 41 via the mail slot 12 one by one etc.; a carriage holding portion 44 for holding the carriage 43; and a driving portion 45 for moving the carriage 43 vertically, horizontally, forward, or backward and rotating the same. In the inside of the related juke device, four supporting columns 46 which form schematically square shapes at the bottom surface portions thereof and are provided to stand from the four corners of a square to the upper surface of the juke device so as to be perpendicular to the bottom surface are provided. The carriage holding portion 44 holds the carriage 43 so that it can freely move to the left, right, forward, or backward and rotate and has supporting column grasping portions 47 which grasp the supporting columns 46 so that the related carriage holding portion 44 can vertically move along the four supporting columns 46 on the two ends thereof.

The carriage driving portion 45 generates a driving force for vertically moving the manipulator 40 along the supporting columns 46, generates a driving force for the horizontal and forward and backward movement and rotation of the carriage 43 and, at the same time, generates a driving force for gripping and lifting the magneto-optic disk by the gripper 42.

Figure 3:
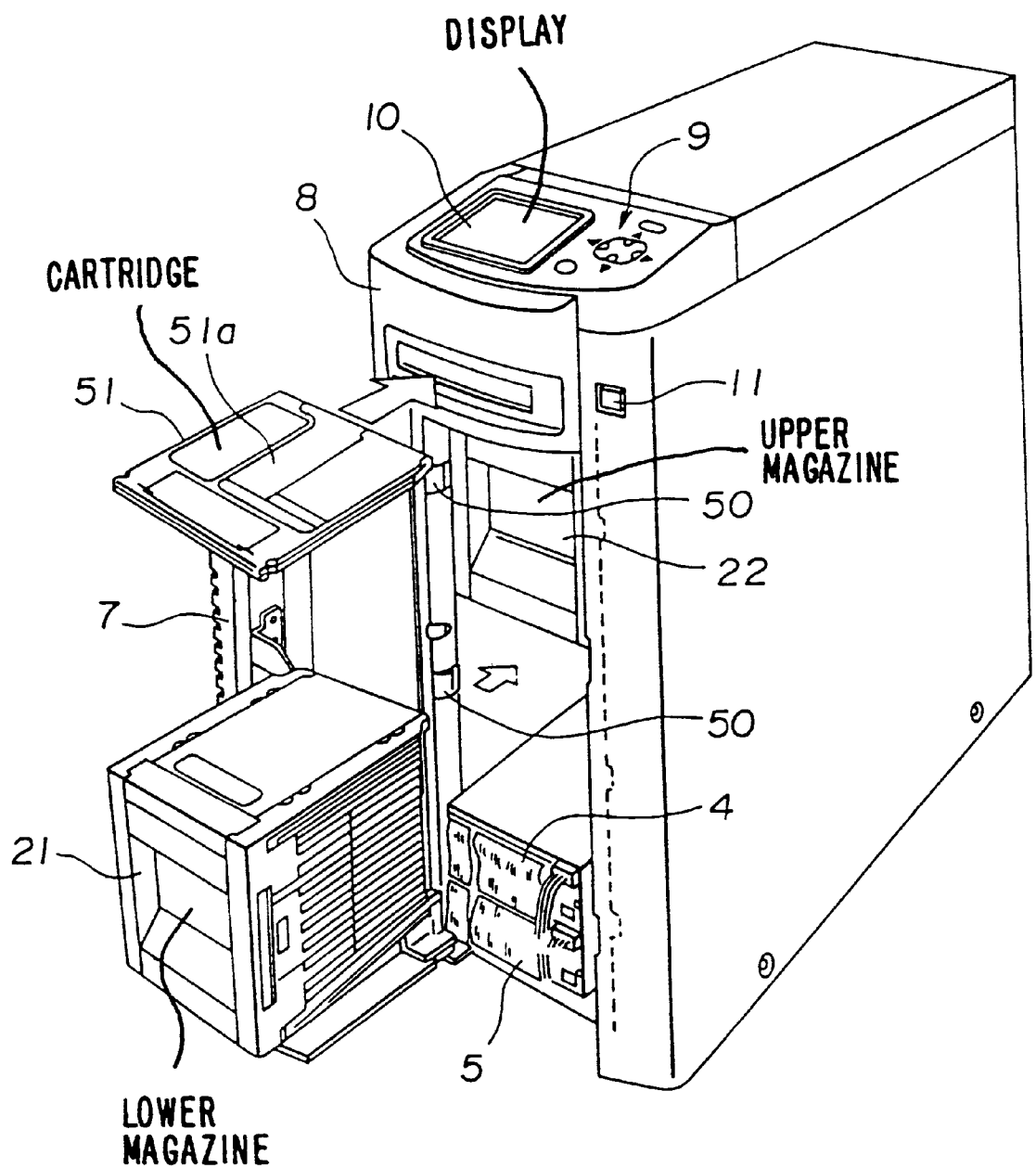
FIG. 3 is a perspective view for explaining the work for exchange of a magazine and an MO disk array inside the juke device.

Next, the overall outer appearance of the juke device becomes as shown in FIG. 3. One end of the front door 7 is cantilever-supported by a hinge 50 so that the door can be freely opened and closed. By opening this front door 7, the lower magazine 21, upper magazine 22, and the first and second MO disk arrays 4 and 5 can be respectively drawn out or loaded. The magazines 21 and 22 have box shapes accommodating 10 magneto-optic disks accommodated in the cartridge 51 in a manner so that they are stacked in parallel with respect to the bottom surface of the related juke device, respectively, and are designed so that the magneto-optic disks are inserted from the rear side of the respective magazines 21 and 22 (side opposite to the front side at which the front door 7 is provided when loading the magazines 21 and 22 in the juke device). The magneto-optic disks can be loaded at one time by having the user take out the magazines 21 and 22, manually insert the disks, and then load the magazines 21 and 22 accommodating the magneto-optic disks back in the juke device. Also, by inserting the magneto-optic disks via the mail slot 12, the inserted magneto-optic disks are transferred to the mail box 41, and the magneto-optic disks transferred to this mail box 41 are loaded in the respective magazines 21 and 22 by the manipulator 40. Due to this, the magneto-optic disks can be automatically loaded in the magazines 21 and 22.

Figure 4:
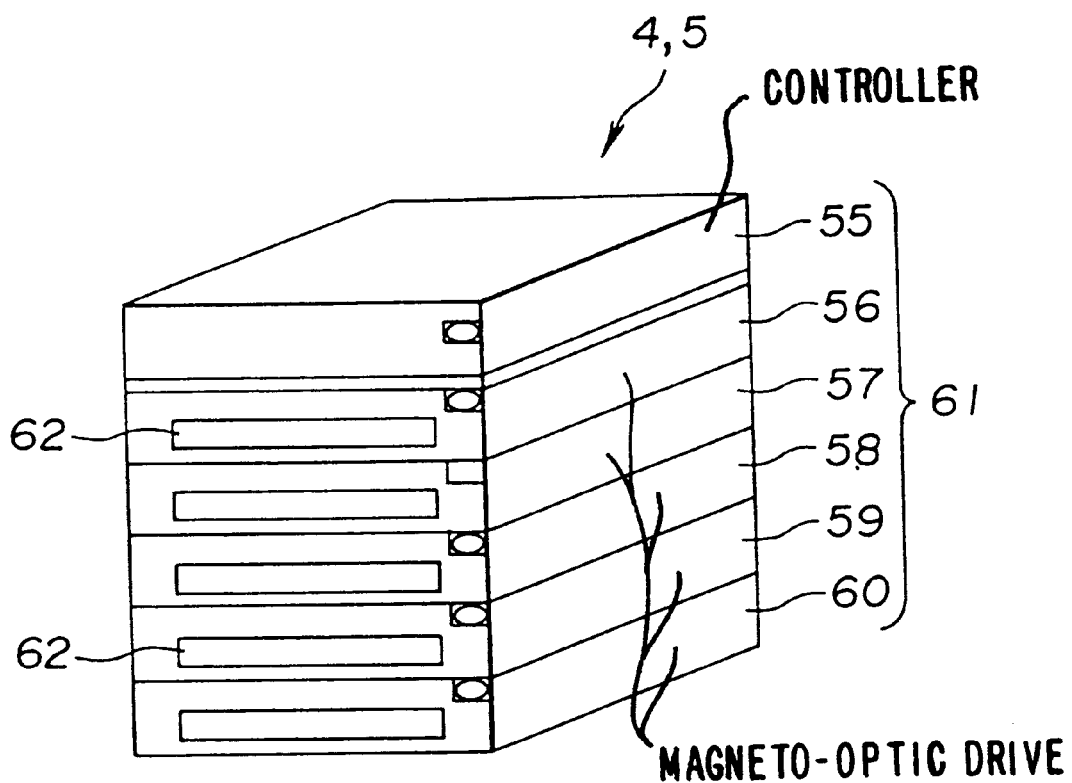
FIG. 4 is a view showing an outer appearance of the MO disk array provided in the juke device.

Next, the first and second MO disk arrays 4 and 5 are constituted by, as shown in FIG. 4, a RAID (Redundant Array of Inexpensive Disk) controller 55 and an MO drive array 61 constituted by first to fifth MO drives 56 to 60 connected with each other, respectively.

The MO drives 56 to 60 each have a disk insertion and ejection port 62. The magneto-optic disks are inserted into or ejected from the MO drives 56 to 60 via this disk insertion and ejection port 62. Also, the RAID controller 55 is connected to the controller block 23, and as will be explained, controls the recording systems of the MO drives 56 to 60 to RAID (Redundant Array of Inexpensive Disks) 1, RAID3, or RAID5, which are the recording systems defined for individual functions and individual performances, in accordance with the control of the controller block 23. Note that, the RAID1, RAID3, and RAID5 recording systems are selected by the key operation of the keypad 9 provided at the front panel 8.

Figure 5:
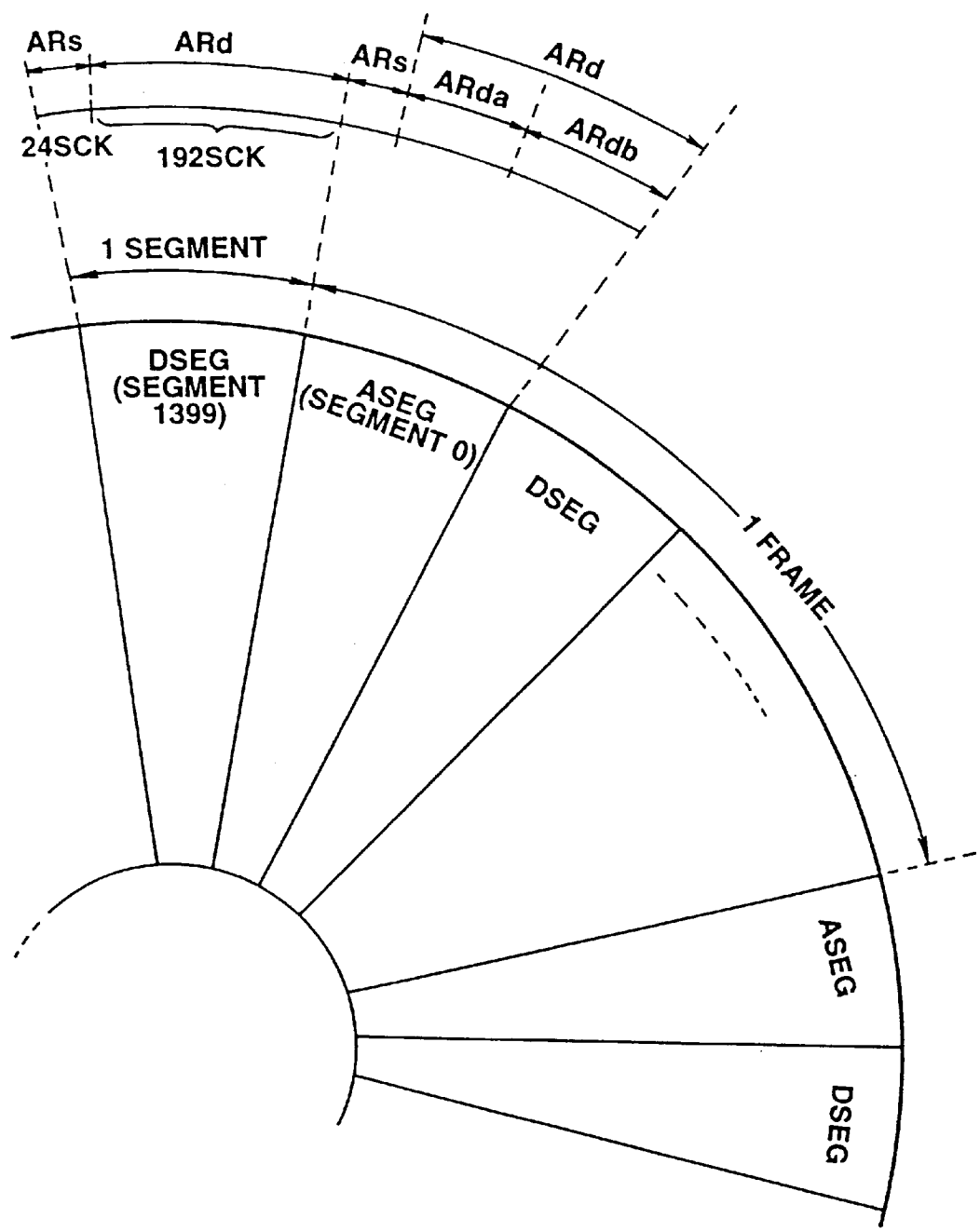
FIG. 5 is a view showing a segment structure of a magneto-optic disk on and from which recording and reproduction are carried out by the juke device.

Here, the magneto-optic disks to and from which the recording and reproduction of data are carried out by the MO drives 56 to 60 are magneto-optic disks of a sample servo system in which servo patterns for servo control are provided in the form of a pre-pit at every predetermined interval with respect to a spirally provided recording track and one turn of the track is divided into 1400 segments (segment 0 to segment 1399) as shown in FIG. 5.

The segments are classified as address segments ASEG and data segments DSEG.

Figure 12:
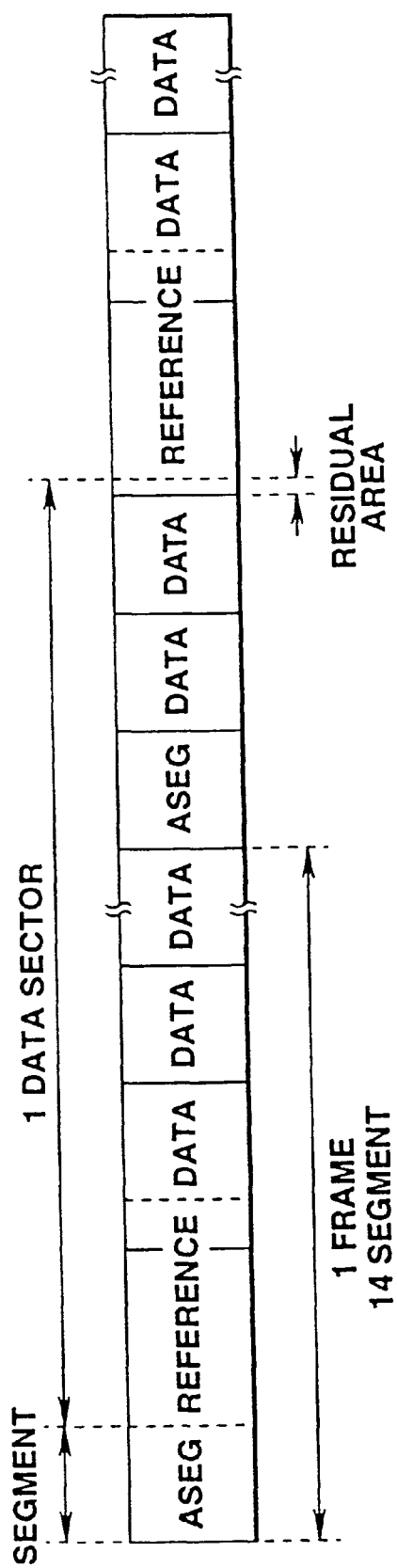
* FIG. 12 is a view showing the configuration of a frame and a data sector of the magneto-optic disk.

In the track portion of the address segment ASEG, a track number, that is, the positional information in the radial direction on the disk, and a segment number, that is, the positional information in a tangential direction, are recorded by pre-pits. There is one address segment ASEG for every 14 segments as shown in FIG. 12 and there are 100 address segments in one turn of the track. The portion from a certain address segment ASEG to the next address segment ASEG is defined as one frame, and one turn of the track is constituted by 100 frames.

The data segments DSEG are the 13 segments between two consecutive address segments ASEG. There are 1300 data segments DSEG in one turn. Each segment is constituted by an area corresponding to 216 servo clocks, that is, comprises a servo area ARs corresponding to 24 servo clocks and a data area ARd corresponding to 192 servo clocks. Note that, in the address segment ASEG, the data area ARd comprises an address area ARda and a laser control area ARdb.

In the servo area ARs, as shown in FIG. 6A to FIG. 6E, three pits Pa, Pb and Pc having lengths of an amount of 2 servo clock and a focus sample area ARfs having a length of an amount of 6 clocks are provided. Also, the pits Pa, Pb, and Pc are provided so that the distance from the center of the pit Pa to the center of the pit Pb and the distance from the center of the pit Pb to the center of the pit Pc have lengths corresponding to 5 servo clocks, respectively.

In this way, by giving a length corresponding to 2 servo clocks to each of the pits Pa, Pb, and Pc of the servo area ARs, the part in which no pit is formed (mirror portion) can be reduced and generation of a ghost pit etc. at the time of making the disk can be prevented. Further, at the time of access, a stable RF signal can be reproduced based on the pits Pb and Pc, and therefore various types of servo signals such as a stable tracking servo signal, focus servo signal, etc. can be formed. Further, since the centers of the pits Pa, Pb, and Pc are separated by a predetermined interval or more, data interference among the RF signals reproduced from the pits Pa, Pb, and Pc can be made extremely small. Note that, so as to make the data interference among the pits small, desirably the pits Pa, Pb and Pc are separated by 5 servo clocks or more.

Next, the second pit Pb positioned at the 11 to 12 clock periods and the third pit Pc positioned at the 16 to 17 clock periods are wobble pits provided at positions deviated from the center of the track in the radius direction of the disk by exactly an amount of +¼ track pitch. Tracking error is detected by the difference of amplitude values of the RF signals reproduced from these pits Pb and Pc. Also, as will be mentioned later by referring to FIG. 33, the phase information of the servo clock is detected by the difference of the amplitude values of the two shoulder parts of the RF signals reproduced from these pits Pb and Pc. Further this phase information is added to detect the phase information of the clock not depending upon the tracking state.

Figure 6:
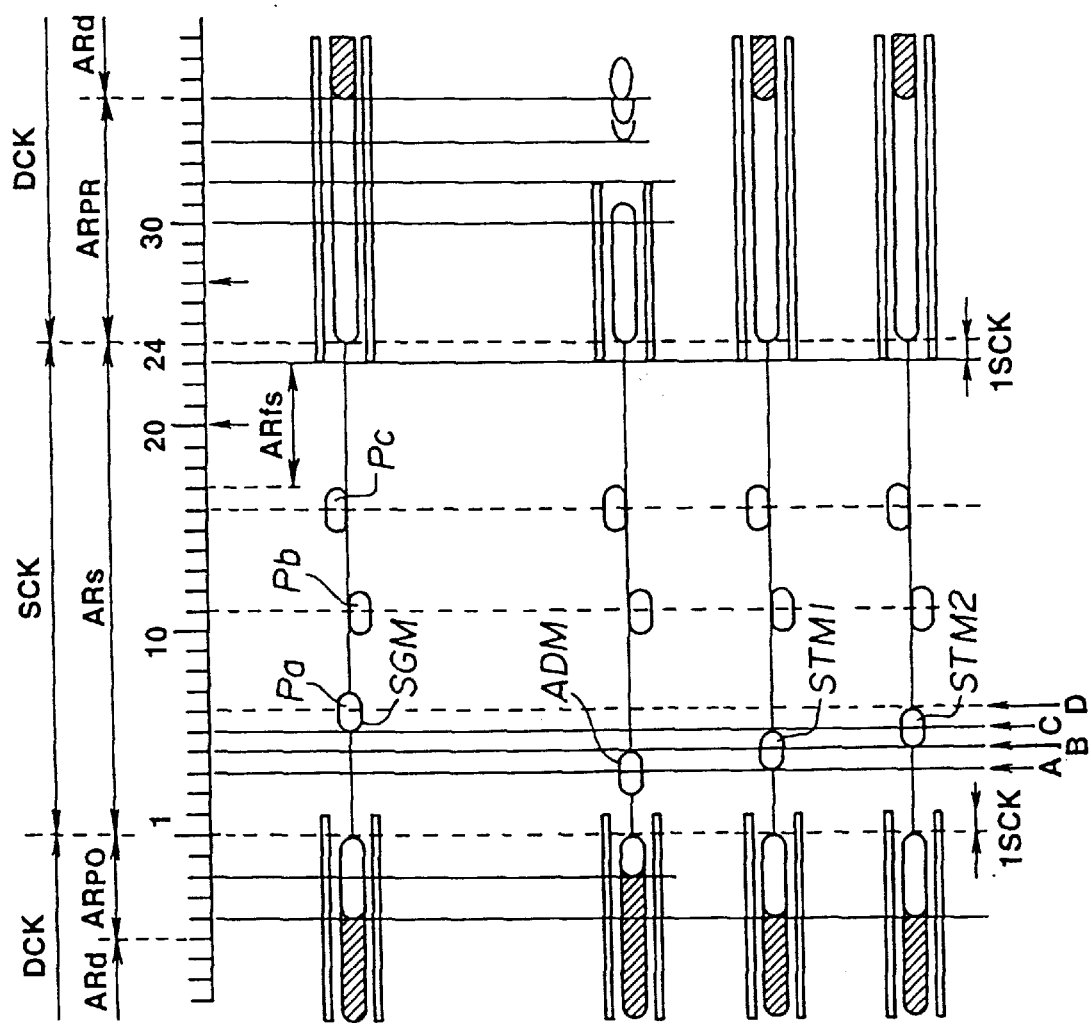
FIGS. 6A, 6B, 6C, 6D, and 6E are diagrams of servo areas of the magneto-optic disk.

Also, the first pit Pa existing at the first of the servo area ARs shows the attribute of the segment by the recording position. More specifically, where recording is carried out so that the first pit Pa is positioned at the 3 to 4 clock periods as shown in FIG. 6C, the first pit Pa is an address mark ADM and indicates that the segment thereof is the address segment ASEG. Also, where the recording is carried out so that the first pit Pa is positioned at the 4 to 5 clock periods as shown in FIG. 6D, the first pit Pa is a first sector mark STM1 and indicates that the segment thereof is the leading segment of the sector. Also, where the recording is carried out so that the first pit Pa is positioned at the 5 to 6 clock periods as shown in FIG. 6E, the first pit Pa is a second sector mark STM2 and indicates that the next segment is the leading segment of the sector. Further, where the first pit Pa is recorded at a recording position other than the above recording positions, the first pit Pa is given a segment mark SGM.

Figure 7:
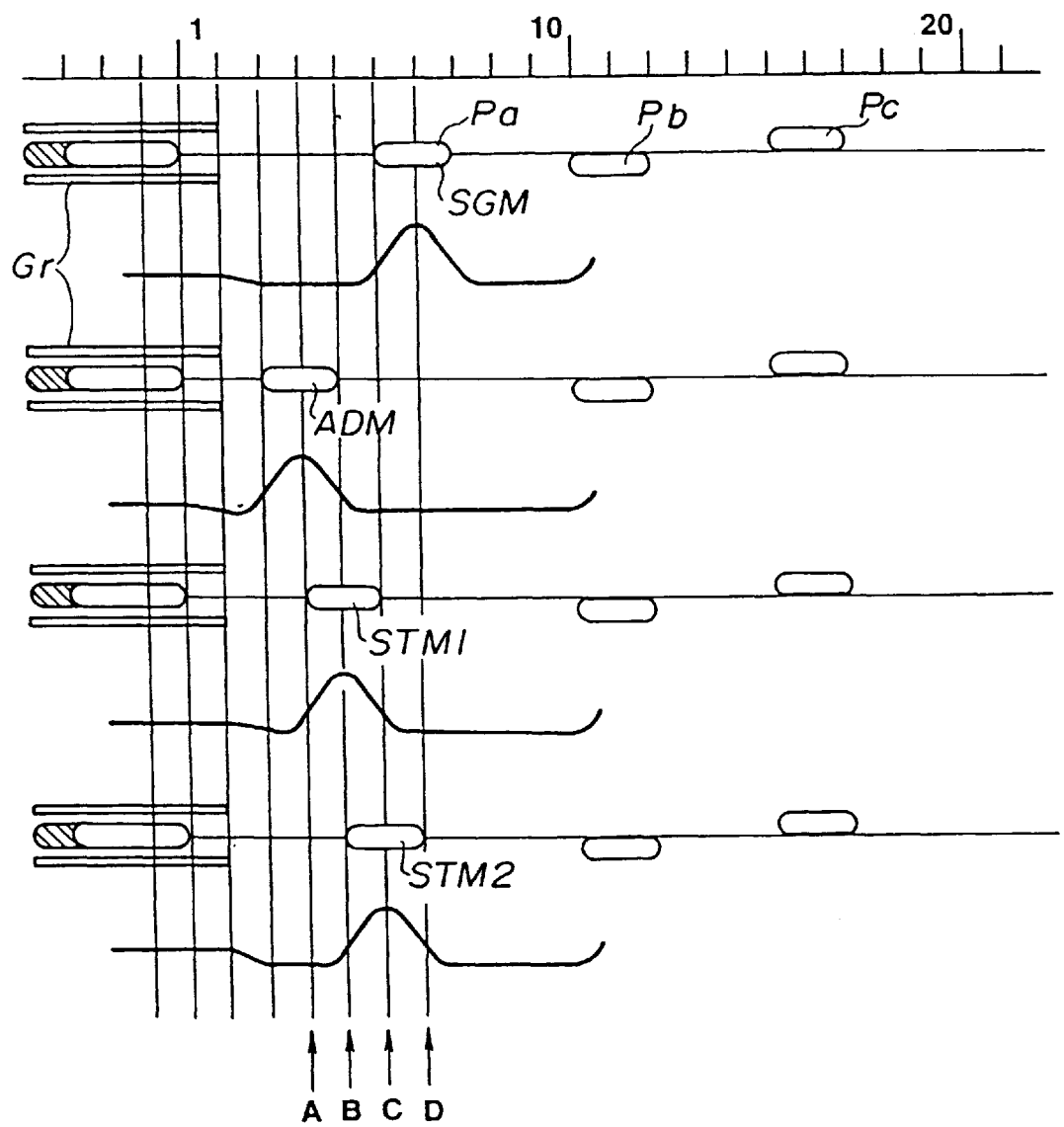
FIG. 7 is a view for explaining a method of detection of a first pit of the servo area of the magneto-optic disk.

The information indicated by this first pit Pa is identified by detecting the position of the maximum amplitude value of the reproduced RF signals by using the so-called differential detection method, that is, detection of the maximum value of the difference, as shown in for example FIG. 7.

Since in this way the recording position of the first pit Pa recorded at the start of the servo area ARs is used to indicate the address mark ADM, first sector mark STM1, and the second sector mark STM2, it is not necessary to record the sector number or the track address for every sector and the recording capacity of the related magneto-optic disk can be enlarged by that amount.

Figure 8:
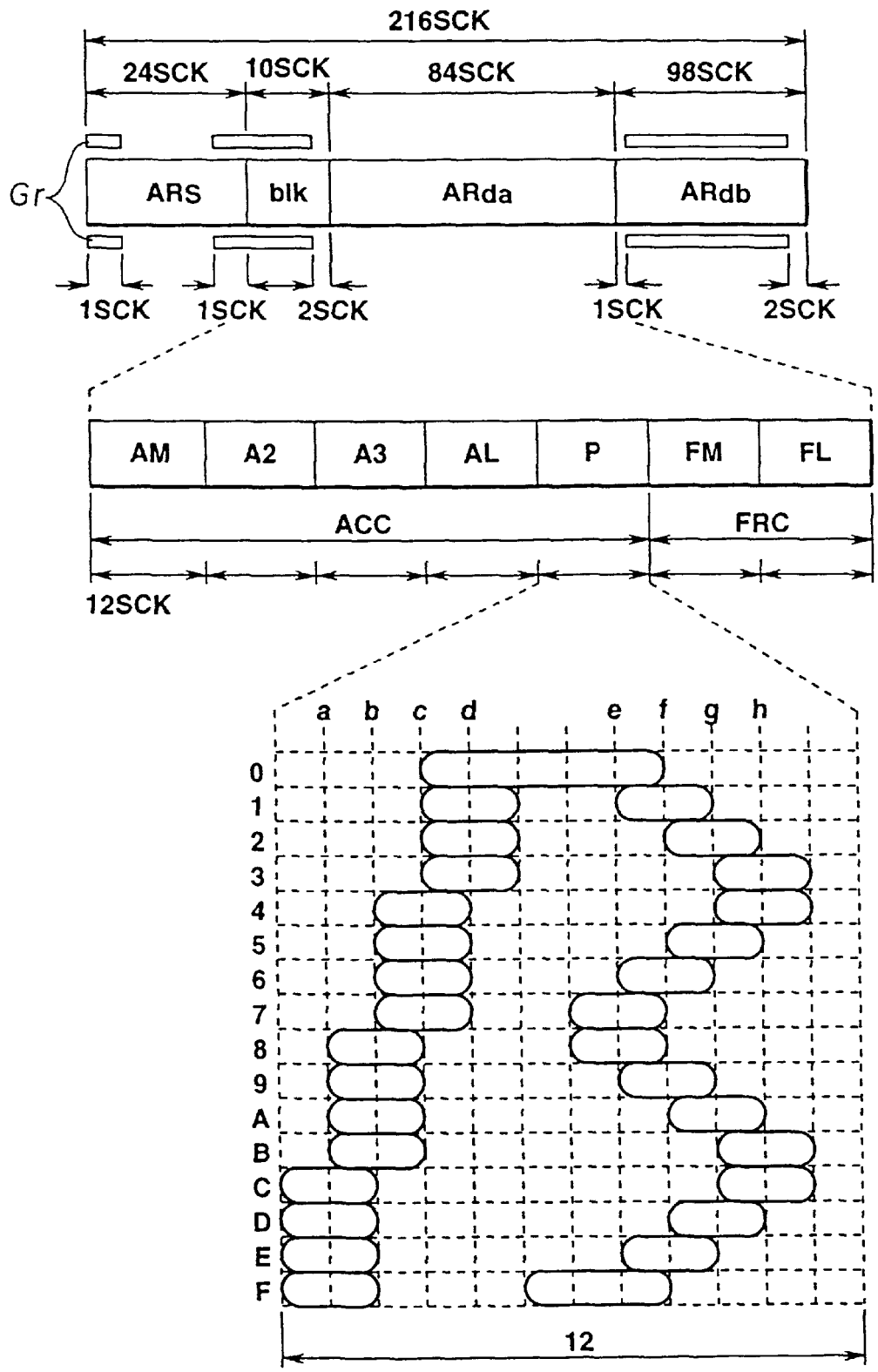
FIG. 8 is a view showing the format of an address segment of the magneto-optic disk.

Also, in the address segment ASEG, as shown in FIG. 8, as the positional information in the radial direction of the disk, an access code ACC consisting of a 16-bit track address [AM], [A2], [A3], [AL], and the parity data [P] thereof and further as the positional information in the tangential direction, a frame code FRC consisting of frame addresses [FM] and [FL] are converted to gray codes and recorded by pre-pits.

Figure 9A:
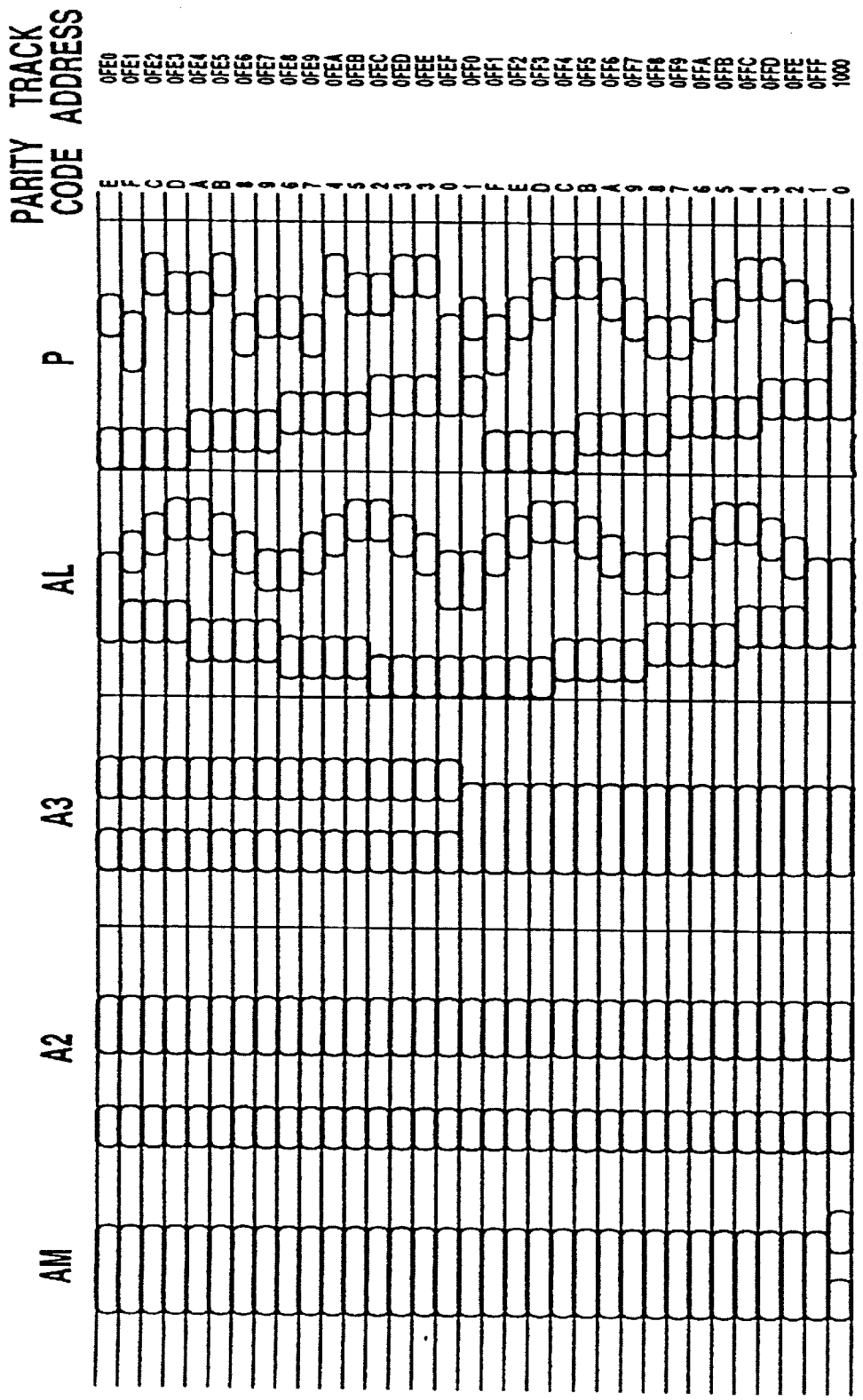
FIG. 9 is a view showing a part of an access code recorded in the address segment of the magneto-optic disk.
Figure 9B:
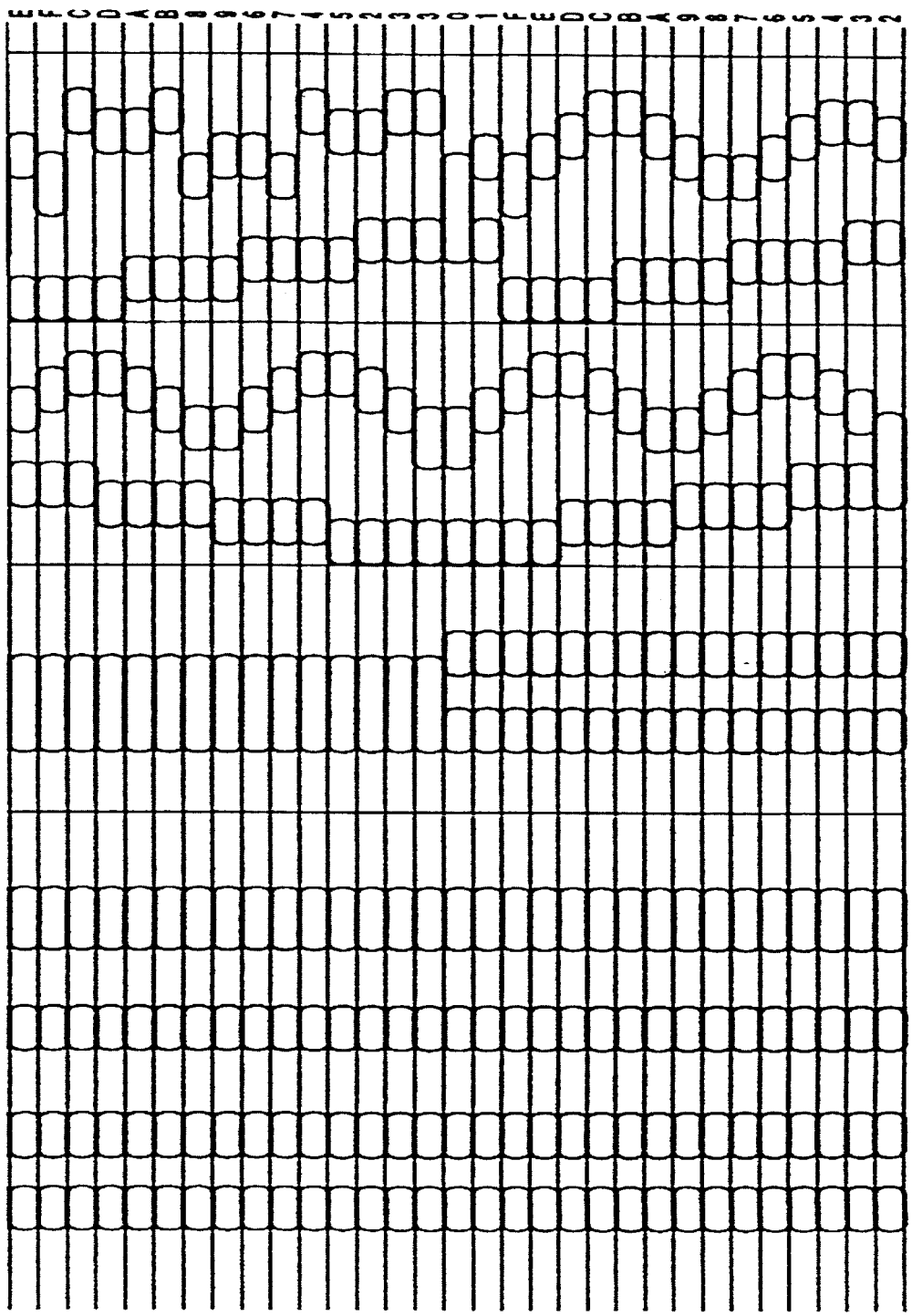

In the access code ACC, the 16-bit track address is divided into 4-bit sections and, based on the gray code table shown in FIG. 8, is subjected to table conversion in the order of AM=the 15 to 12 bit (MSN), A2=the 11 to 8 bit (2SN), A3=the 7 to 4 bit (3SN), and AL=the 3 to 0 bit (LSN) and recorded. At this time, only when the least significant bit of 4 bits is "1", the access code has a value obtained by taking a complement of "1" with respect to the next 4 bits. Due to this, as shown in for example FIG. 9, the recording is carried out so that these access codes change only by one pattern between adjacent tracks. Also, the parity code is divided into groups according to the bit position of the access code, and in the respective groups [15, 11, 7, 3], [14, 10, 6, 2], [13, 9, 5, 1], and [12, 8, 4, 0], a result obtained by taking a parity which becomes "1" when the bit of the value of "1" is an even number is recorded.

In this way, in the magneto-optic disk, only when the least significant bit of 4 bits is "1", the access code is given a value obtained by taking the complement of "1" with respect to the next 4 bits, and the change of these access codes between adjacent tracks is restricted to one pattern. Due to this, in a case of "0" where the distance between the pit expressing the gray code of the upper significant 2 bits and the pit expressing the gray code of the lower significant 2 bits is the shortest, and in a case of "F" where one has the shortest distance and the other has the longest distance, the pit is formed at the center region of an amount of 1 clock, and therefore an inconvenience that the center region becomes a mirror portion continuing in radial direction can be prevented. Accordingly, the mirror portion can be minimized, and therefore the storage capacity of the disk can be improved, and in addition the flow of the plastic is made uniform at the time of making the disk and a high quality disk can be made.

Next, the frame code FRC is formed and recorded by dividing the 8-bit frame address, which is the information of the address segment ASEG in the tangential direction and expresses the frame number, is divided into its upper and lower 4 bits, and the upper significant 4 bits FM=7 to 4 bit (MSN) and the lower significant 4 bits LM=3 to 0 bit (LSN) are converted to the gray code by the same method as that for the above access code. Note that, this frame code FRC is recorded in the form of 8 bits, and therefore information of 0 to 256 can be recorded, but there are 99 address segments ASEG in the magneto-optic disk and therefore the frame code is recorded by using values of from 0 to 99.

Next, the focus sample area ARfs of the servo area ARs is a mirror portion and is used when performing the focus servo, lead power APC (Automatic Power Control), clamping of the RF signal, etc. It is difficult to correctly specify the position of the various types of sample pulses for these processings and a fluctuation of a less than a +0.5 servo clock pitch is anticipated. For this reason, even if such a fluctuation occurs, to secure the sampling with a correct value without influence by the level fluctuation of the reproduced RF signal, the related focus sample area ARfs is made a mirror portion corresponding to 6 clocks.

Figure 10:
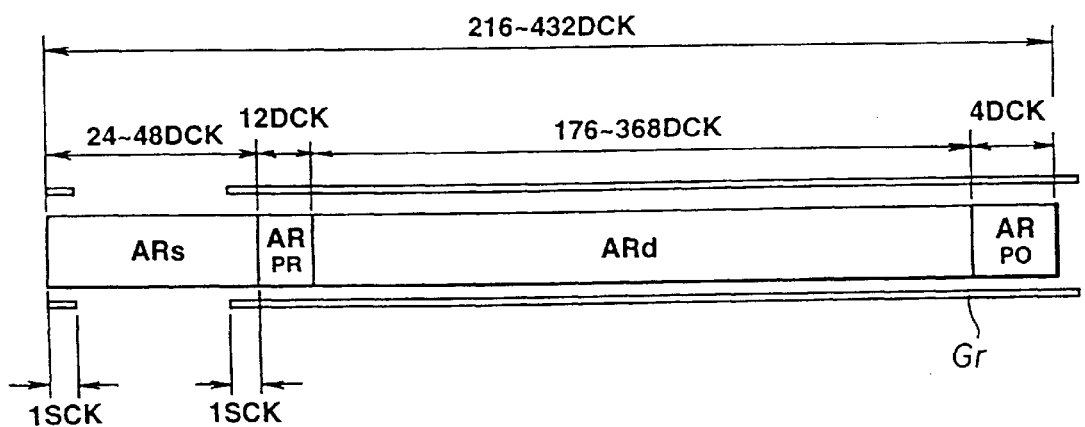
FIG. 10 is a view showing the format of a data segment of the magneto-optic disk.

Next, the data area ARd of the data segment DSEG is constituted by, as shown in FIG. 10, a data area ARd corresponding to 176 to 368 data clocks for recording the user data, a pre-write area $AR_{PR}$ corresponding to 12 data clocks, and a post-write area $AR_{PO}$ corresponding to 4 data clocks.

Note that, as will be explained later, the magneto-optic disk is designed for so-called zone CAV recording and reproduction wherein the recording region thereof is divided into 16 zones of from a zone 0 to a zone 15 in total along the disk diameter direction and the recording and reproduction of the data are carried out at a rotational speed having a constant angle speed based on a data clock of a phase which is controlled in accordance with the position of the zones. For this reason, since the phase of the data clock changes in accordance with the zones, also the number of the data clocks changes in accordance with the zones.

The pre-write area $AR_{PR}$ is a region which is used as a clamping area for securing a distance necessary for the preheating from when the MO drives 56 to 60 start the irradiation of the laser beam to when the temperature of the disk becomes a temperature suited to the data recording and, at the same time, suppressing the DC fluctuation due to the complex refraction of the MO signal etc. at the time of reproduction. Note that, so as to secure interchangeability of the format, this pre-write area $AR_{PR}$ is provided even in a case where the magneto-optic disk is a so-called ROM disk.

The post-write area $AR_{PO}$ is provided for preventing data from remaining after erasure at the time of overwriting and, at the same time, for securing a distance which data interference occurring due to the edge of the group Gr can be prevented. The magneto-optic disk is bulk-erased in one direction at the time of shipment and has recorded on its pre-write area $AR_{PR}$ data corresponding to 4 data clocks having the same polarity as that for the bulk erasing direction before shipment. Due to this, even in a case where data is not normally recorded in the pre-write area $AR_{PR}$ due to insufficient residual heat of the media, the data recorded in the pre-write area $AR_{PR}$ does not change, and therefore stable reproduction of data is made possible. Also, by recording the same data corresponding to 4 data clocks in the post-write area $AR_{PO}$, when decoding from the rear data in Viterbi decoding, a data train stabilized to a constant value can be provided. For this reason, when performing the clamping at the time of reproduction by utilizing this pre-write area $AR_{PR}$, since a data train stabilized to the constant value is obtained, an accurate clamping operation can be carried out.

Next, since a recordable optical disk such as a magneto-optic disk does not have pits formed in the data recording region, the area which becomes the mirror portion tends to become larger than in an optical disk used only for reproduction in which all data are recorded as the pre-pits.

However, in the related magneto-optic disk, as shown in FIG. 10, a group Gr having a depth of ⅛ where the wavelength of the laser beam is 1 is provided in a part corresponding to the data area ARd. Due to this, the number of the mirror portions can be decreased as a whole, and the adverse influence exerted upon the servo pits at the time of making the disk can be reduced. Note that, this group Gr is not used for the tracking control, and therefore precision of the depth etc. thereof is not required.

Figure 11:
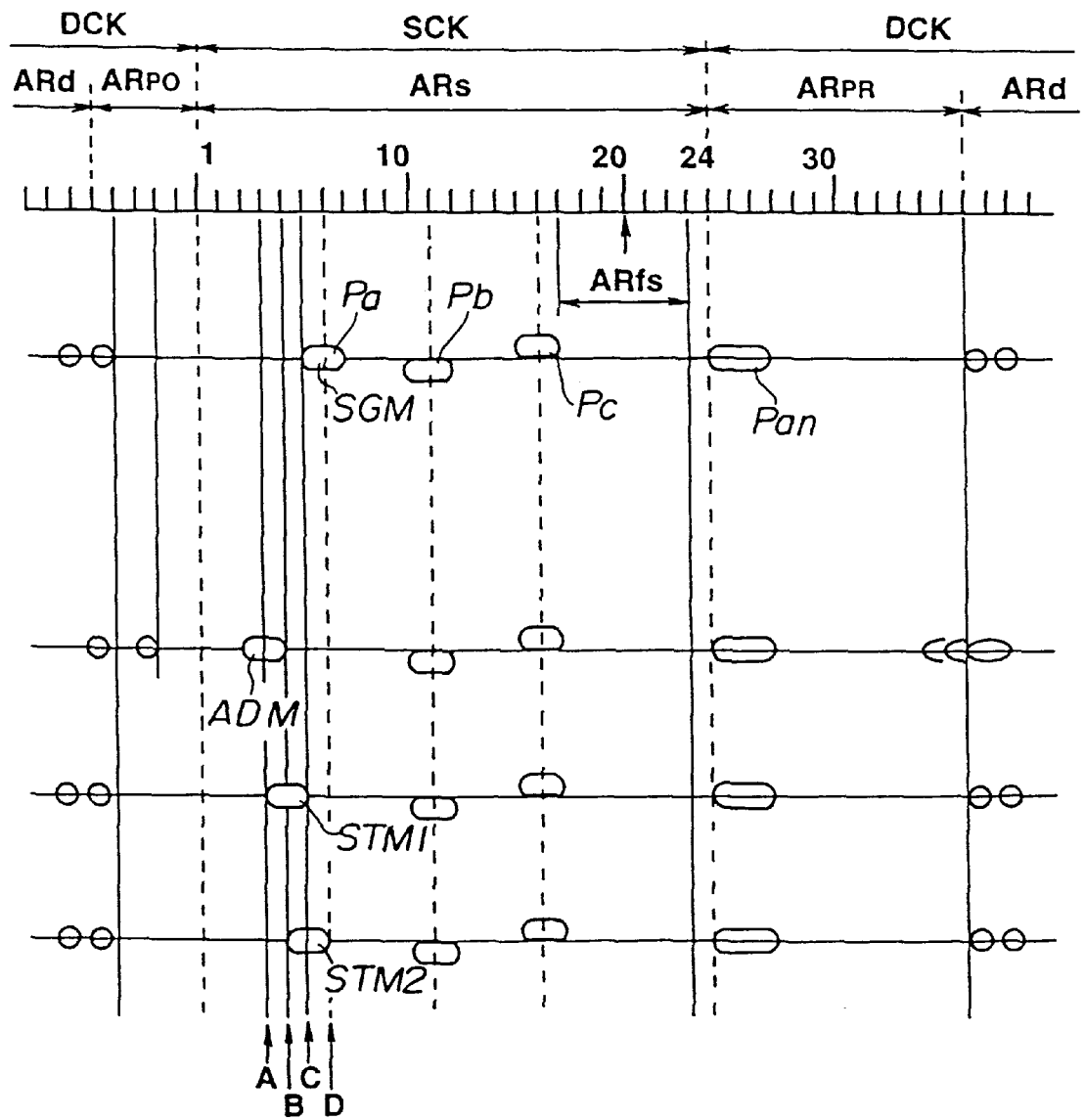
FIG. 11 is a view showing the format of the servo area of a ROM region in a case where a ROM region is provided on the magneto-optic disk.

Also, where the related magneto-optic disk is a ROM disk used only for reproduction, the structure thereof becomes one with the group Gr shown in FIG. 10 deleted and, as shown in FIG. 11, an anchor pit Pan corresponding to 3 data clocks is recorded in the leading part of the data area ARd. Due to this, even in a case where the related magneto-optic disk is a ROM disk only for reproduction, the number of the mirror portions can be decreased as a whole and the adverse influence exerted upon the servo pits at the time of making the disk can be reduced.

Next, one data sector is constituted by 2418 bytes in total, that is, 66 bytes of reference data, 2048 bytes of user data (D0 to D2047), 256 bytes of ECC (E1,1 to E16,16), 8 bytes of CRC (CRC1 to CRC8), and 40 bytes of user defined data (UD) as shown in FIG. 12 and FIG. 13. Note that, FIG. 13 shows a data format of 2352 bytes obtained by eliminating the 66 bytes of reference data.

Figure 14:
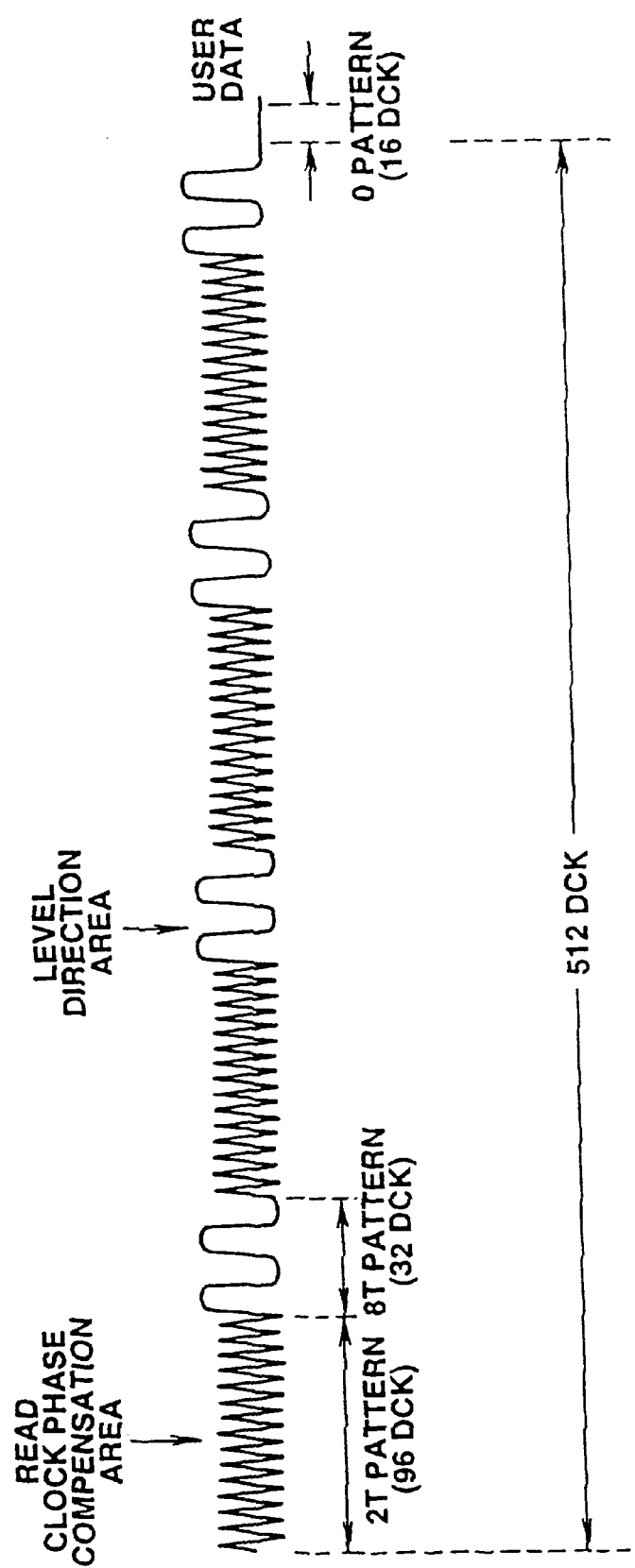
FIG. 14 is a view showing the reproduction waveform of a reference pattern of the data sector of the magneto-optic disk.

As the reference data, a total of four blocks of a reference pattern, wherein 1 block is constituted by 4 bytes of an 8T pattern and 12 bytes if a 2T pattern, and 66 bytes of a specific pattern which are provided as a margin for setting the detected information and is constituted by 2 byte of an all "0" pattern are recorded so that an RF signal having a waveform as shown in FIG. 14 is obtained at the time of reproduction.

The 8T pattern is used for setting three levels (high H, middle M, and low L) in the detection of data by a partial response (1, 1) and Viterbi decoding, while the 2T pattern is used when correcting the deviation of the pit position like DC due to fluctuations in the recording power etc. at the time of reproduction.

Also, in the data area ARd of the data segment DSEG, the data other than the reference data is scrambled and converted to NRZI and recorded for every segment.

Figure 16:
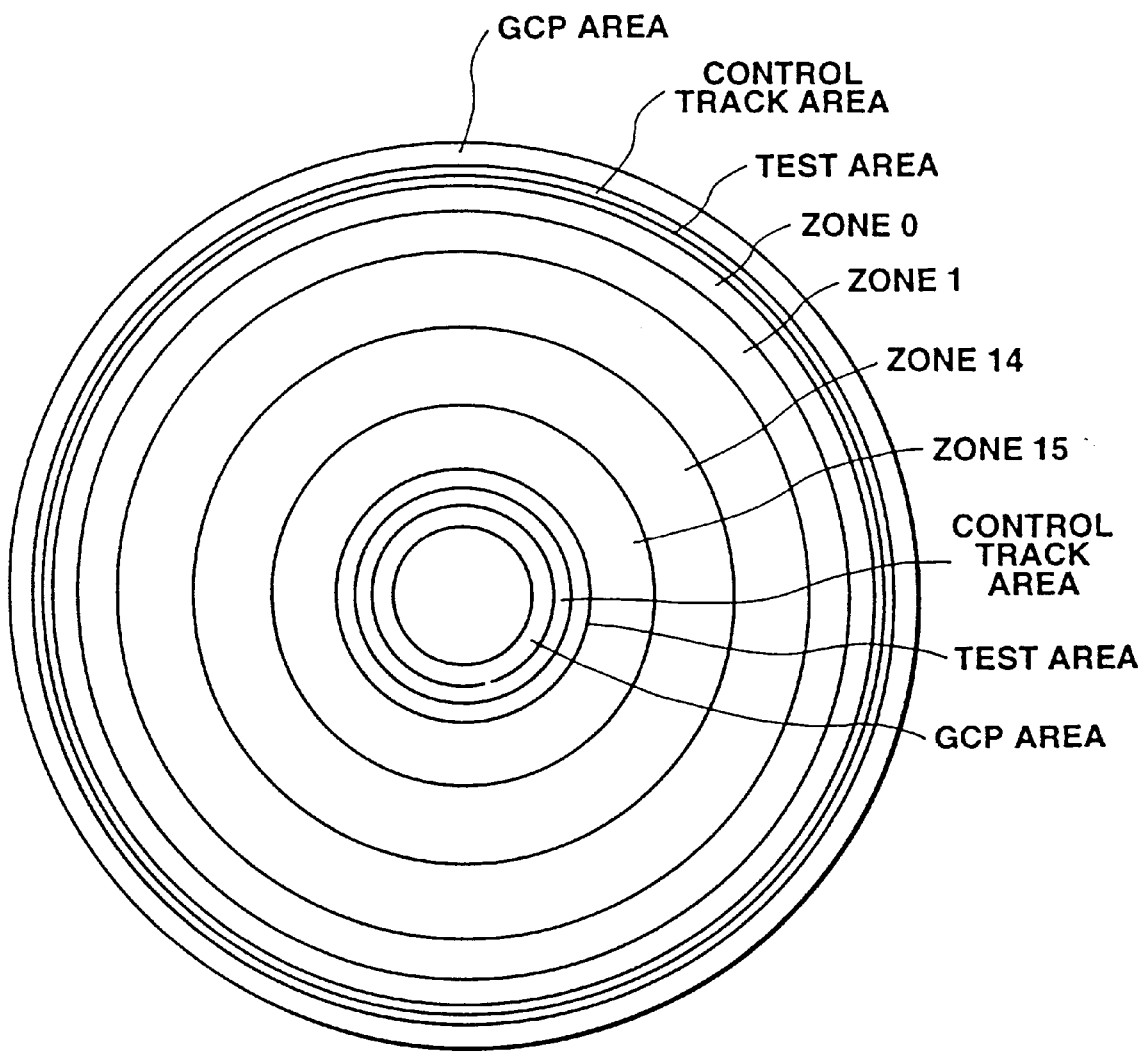
FIG. 16 is a view showing the state of the area division of the magneto-optic disk.

Next, the related magneto-optic disk is a so-called zone CAV disk and is constituted, as shown in FIG. 15 and FIG. 16, from the outer circumference, 736 tracks of a GCP (Gray Code Part) area, 2 tracks of buffer tracks, 5 tracks of control tracks, 2 tracks of buffer tracks, 5 tracks of test tracks, 848 tracks of a user zone 0, 864 tracks of a user zone 1, 880 tracks of a user zone 2, 912 tracks of a user zone 3, 944 tracks of a user zone 4, 976 tracks of a user zone 5, 1024 tracks of a user zone 6, 1056 tracks of a user zone 7, 1120 tracks of a user zone 8, 1184 tracks of a user zone 9, 1296 tracks of a user zone 11, 1392 tracks of a user zone 12, 1488 tracks of a user zone 13, 1696 tracks of a user zone 14, 770 tracks of a user zone 15, 5 tracks of test tracks, 2 tracks of buffer tracks, 5 tracks of control tracks, 2 tracks of buffer tracks, and 820 tracks of a GCP area.

Here, so as to complete the sector for every zone and, at the same time, make the number of sectors constant by when defining the number of tracks in the zone as Tz, the number of data segments necessary per sector in a certain zone as Dsz, and the number of data segments per track as Dt, it is sufficient so far as the number of sectors Sz in the zone is expressed as Sz=Tz.Dt/Dsz and the number of tracks is determined so that Tz becomes equal to K.Dsz. By assigning the number of sectors Sz determined by using a value which becomes close to the data capacity per zone obtained by dividing the data capacity of the whole disk by number of all zones as the value of K from the zone of the outer circumferential side and determining the data clock frequency so that the recording density of the innermost circumferential track of that zone does not become more than the predetermined recording density, all parameters can be obtained. Note that, it is assumed that the capacity of one sector is for example a constant 2352 bytes.

Figure 17:
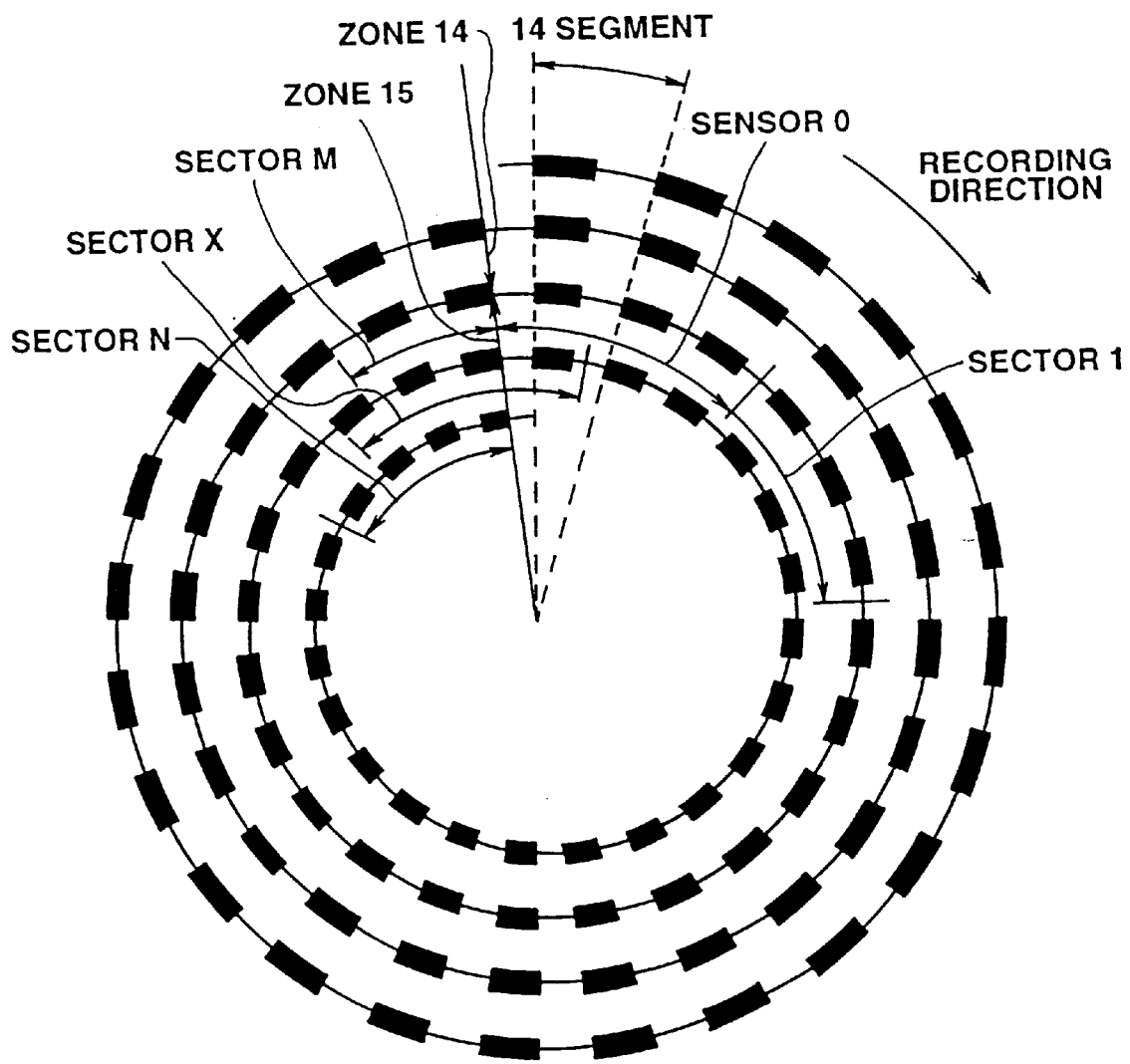
FIG. 17 is a view showing the format of the data sector of the magneto-optic disk.

In this case, as shown in FIG. 17, when the sector is started from a certain segment and the number of segments constituting a sector ends, that sector is ended. Even in a case where an excess byte exists in a final segment, the next sector is not started from that excess byte, but the next sector is newly started from the next segment. Due to this, at the head of the zone, a sector starting from the segment 0 of the 0 frame code can be constituted without fail. Also, where a parity sector is provided for a certain number of sectors, the number of sectors of each zone can be made uniform, and the capacity of the parity sector can be made constant.

Note that, there is a possibility that the zone of the innermost circumference will not become the same in number of sectors as the other zones because of its relationship with the recording area, but a region up to the track wherein the sector is ended at segment 1399 is defined as an innermost circumference zone.

Next, in such a magneto-optic disk, the number of bytes of data per segment (byte/seg) and the number of segments per sector (seg/sector) are determined by the data clock DCK formed by multiplying the servo clock SCK by M/N when defining "M" as the value of the clock shown in FIG. 15 and defining "N" as 24.

Namely, if the number of servo clocks in the servo area ARs is N and the data clock DCK is M/N times the servo clock SCK, the number of the servo clocks SCKseg and the number of the data clocks DCKseg per segment become:

SCKseg=9N

DCKseg=SCKsegM/N Note that M and N are integers.

Next, as mentioned above, a track is divided into 1400 segments and 1300 among them become the data segments DSEG, but the user data is not recorded in the GCP area. For this reason, 100 segments among the 1300 data segments DSEG are used as the GCP segments GCPseg for recording the GCP information such as the media information.

Figure 18:
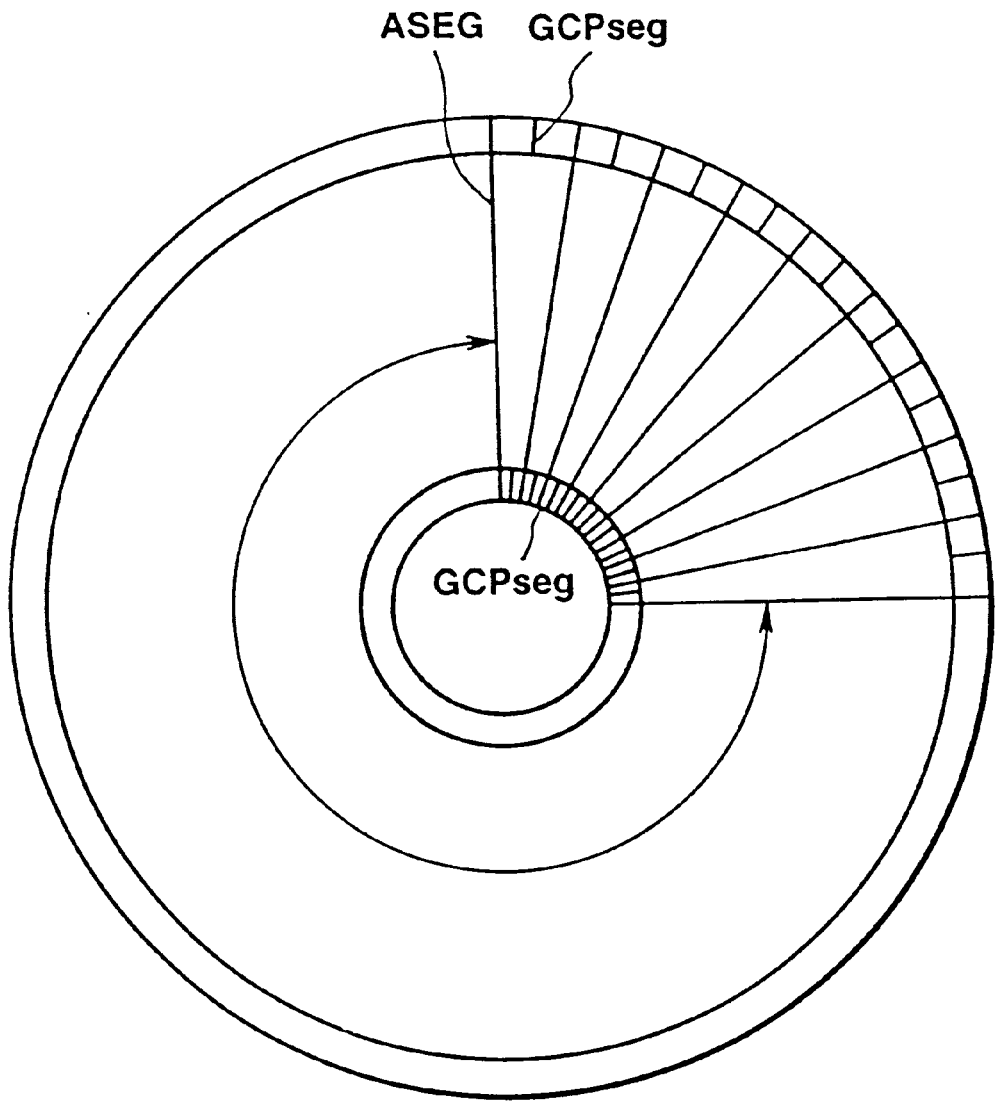
FIG. 18 is a view showing a state of arrangement of a GCP segment of the magneto-optic disk.
Figure 19:
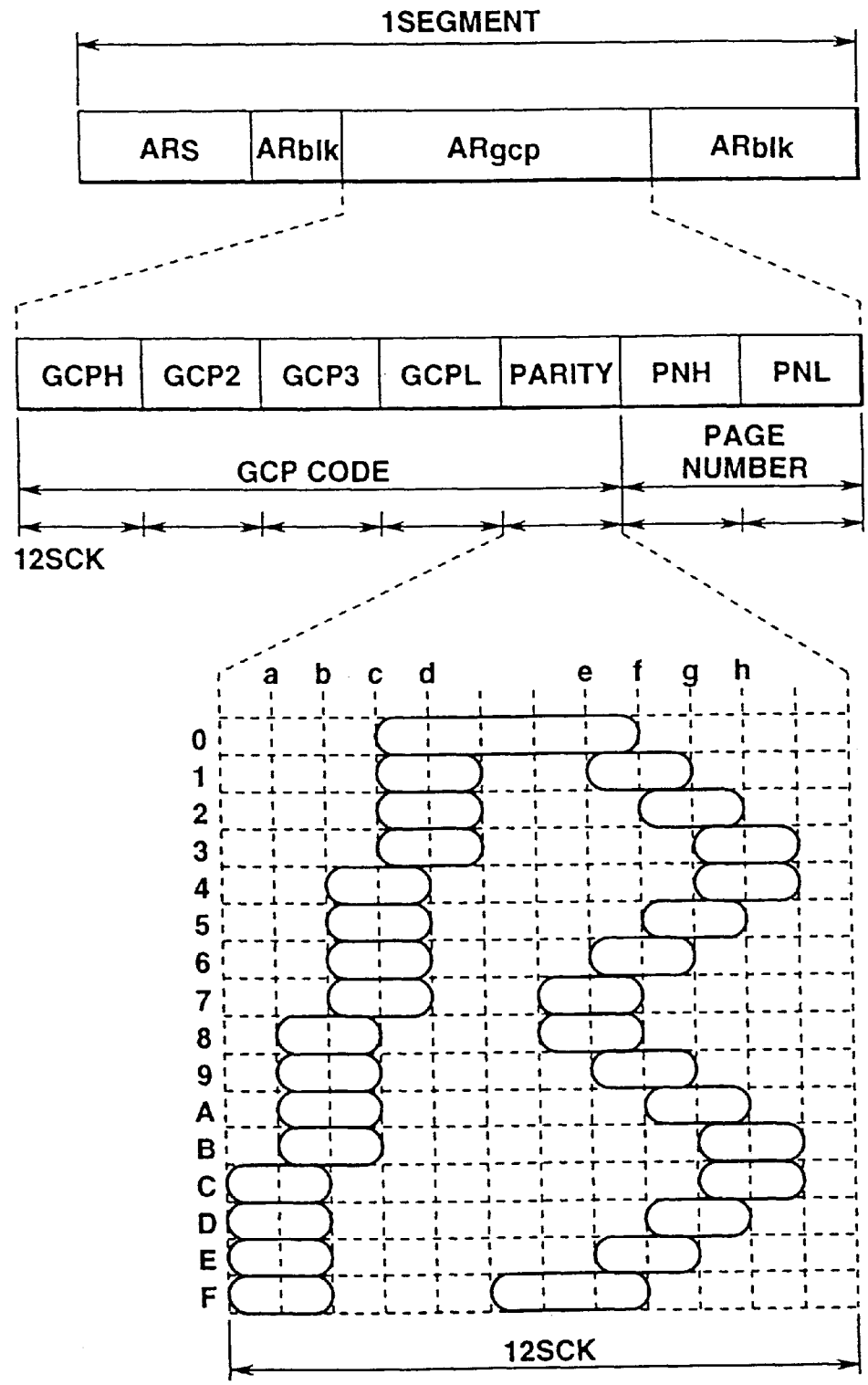
FIG. 19 is a view showing the structure of the GCP segment.

The GCPseg of the GCP segment is assigned to the data segment at an intermediate position of the address segments ASEG as shown in FIG. 18 and is constituted by a servo area ARs, GCP area ARgcp, and a blank ARblk as shown in FIG. 19.

In the GCP area ARgcp, seven series of 4-bit data subjected to gray coding by the same method as that for the access code ACC of the address segment ASEG are recorded. More specifically, in the GCP area ARgcp, a GCP code consisting of [GCPH], [GCP2], [GCP3], [GCPL] and parity data [P] thereof and page numbers [PNH] and [PNL] are recorded with the pre-pits, respectively. To the GCP code, the parity data [P] is added to make error detection possible. Also, page numbers [PNH] and [PNL] are added to make it possible to provide a plurality of media information as the GCP information. Also, where as much as 16 pages of the page numbers [PNH] and [PNL] are recorded, by recording the same information as the page numbers [PNH] and [PNL], it is possible to make the system resistant against error.

Figure 20:
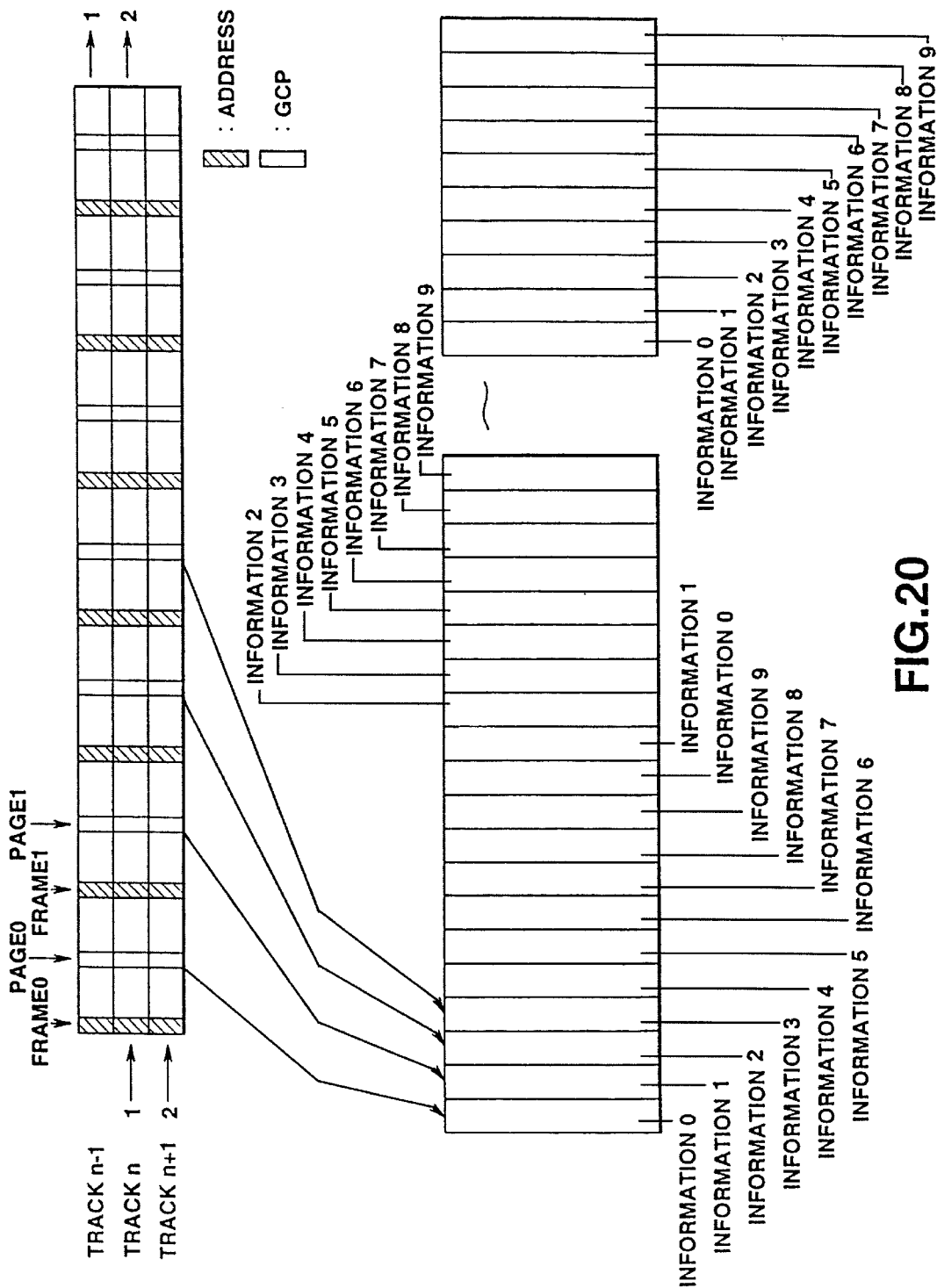
FIG. 20 is a view showing a relationship between a page number of the GCP segment of the magneto-optic disk and a frame address of an address segment.

Also, in the GCP area ARgcp, as shown in FIG. 20, the GCP segments GCPseg are arranged in a state where the number of the least digit of the address (frame number) recorded in the address segment ASEG and the page number of the GCP segment GCPseg are made to match with each other. Due to this, erroneous reading of the frame number of the address segment ASEG and the page number of the GCP segment GCPseg can be prevented. Also, since one turn of the track is constituted by 100 frames, by repeatedly recording 10 pages, that is, 10 types of GCP information, 10 times, erroneous reading of the 10 types of GCP information can be greatly reduced.

Figure 21:
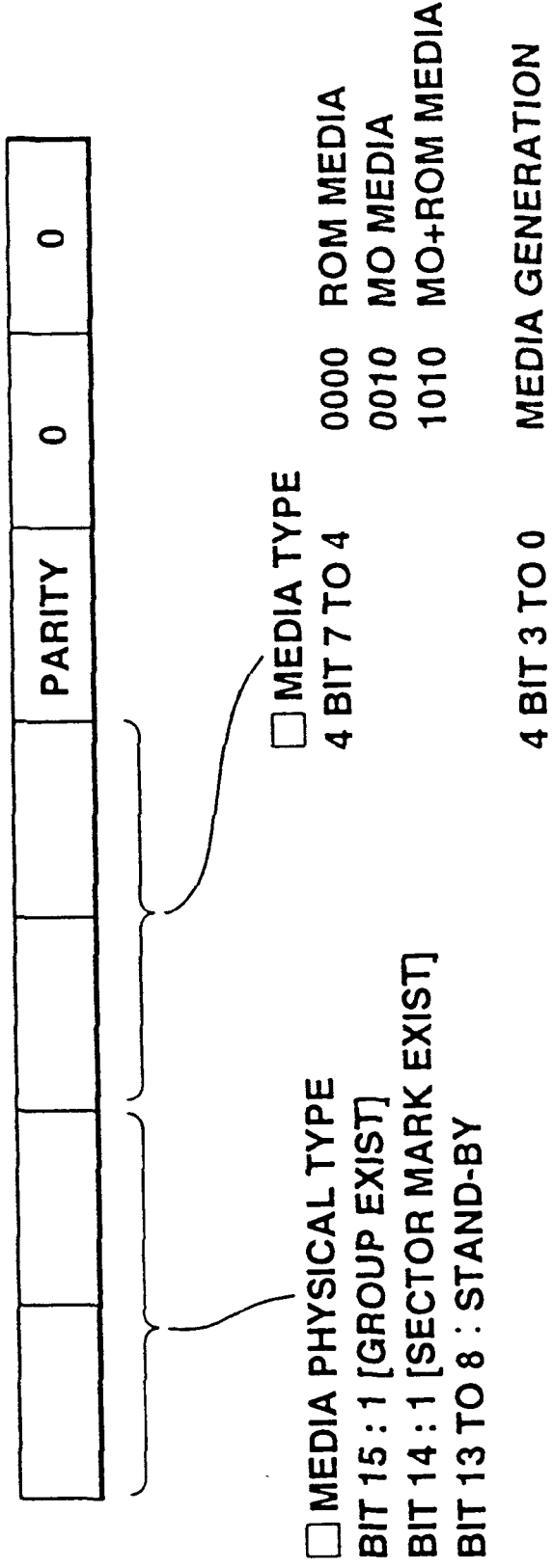
FIG. 21 is a view showing the content of the GCP information of the page number 1 of the GCP segment.

Next, the GCP information of the page number 0 among the GCP information recorded in the GCP segment GCPseg is information indicating the media information/media type as shown in FIG. 21, information indicating the physical format of the media such as the presence/absence of a group, presence/absence of a sector mark, etc. is provided by the bit 15 to the bit 14, information indicating the format of the media such as the MO, ROM, etc. is provided by the bit 7 to the bit 4, and generation information of the media is provided by the bit 3 to the bit 0.

Figure 22:
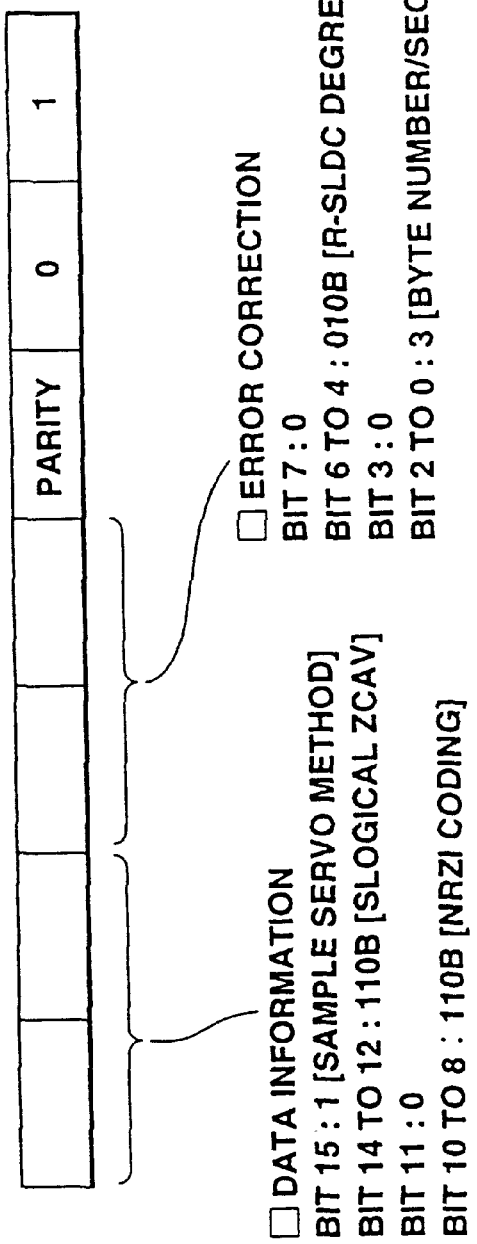
FIG. 22 is a view showing the content of the GCP information of the page number 2 of the GCP segment.

Also, the GCP information of the page number 1 is information indicating the data information/error correction format as shown in FIG. 22, information indicating the sample servo system, logical CAV, NRZI coding, etc. is provided by the bit 15 to the bit 8, and information indicating the error correction format is provided by the bit 7 to the bit 0.

Figure 23:
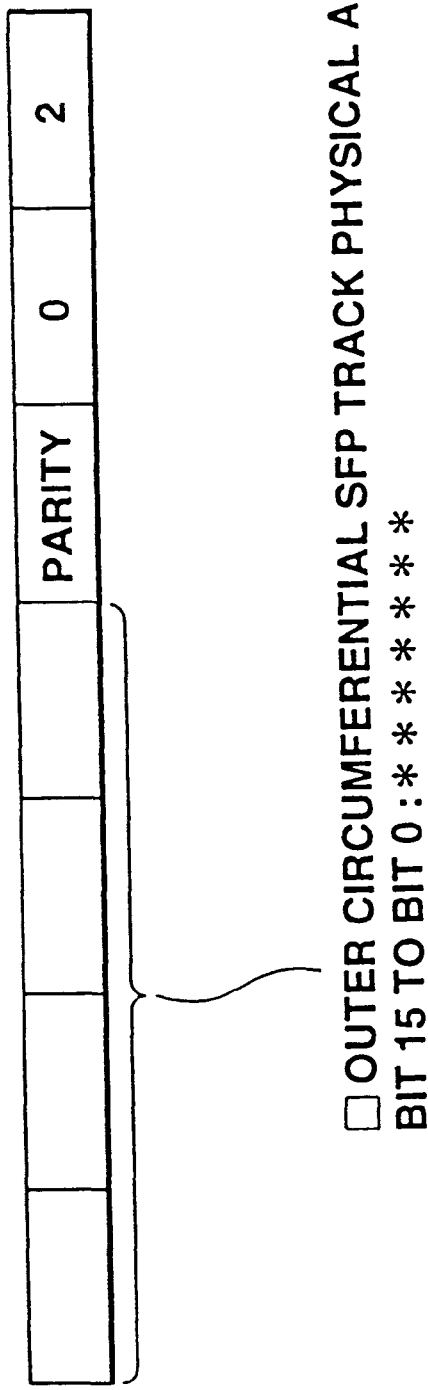
FIG. 23 is a view showing the content of the GCP information of the page number 3 of the GCP segment.

Also, the GCP information of the page number 2 is information indicating the outer circumferential SFP track physical address as shown in FIG. 23, and information indicating the physical address of the control track on the outer circumference side is provided by the bit 15 to the bit 0.

Figure 24:
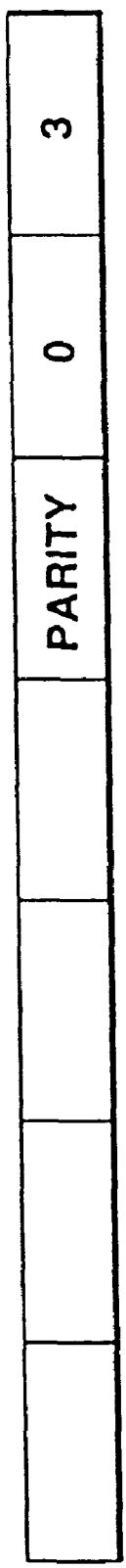
FIG. 24 is a view showing the content of the GCP information of the page number 4 of the GCP segment.

Also, the GCP information of the page number 3 is information indicating the inner circumferential SFP track physical address as shown in FIG. 24, and information indicating the physical address of the control track on the inner circumference side is provided by the bit 15 to the bit 0.

Figure 25:
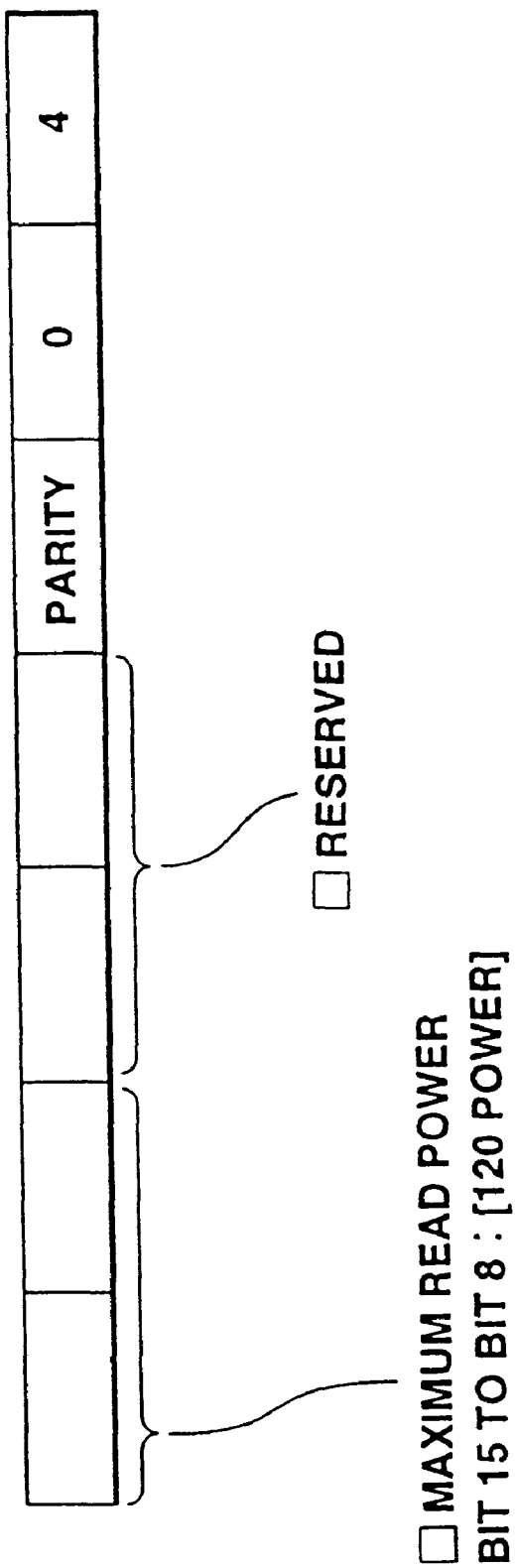
FIG. 25 is a view showing the content of the GCP information of the page number 5 of the GCP segment.

Also, the GCP information of the page number 4 is information indicating the maximum read power as shown in FIG. 25, and information indicating the maximum read power is provided by the bit 15 to the bit 8. Note that, among the GCP information of this page number 4, the bit 7 to the bit 0 are the stand-by information.

Figure 26:
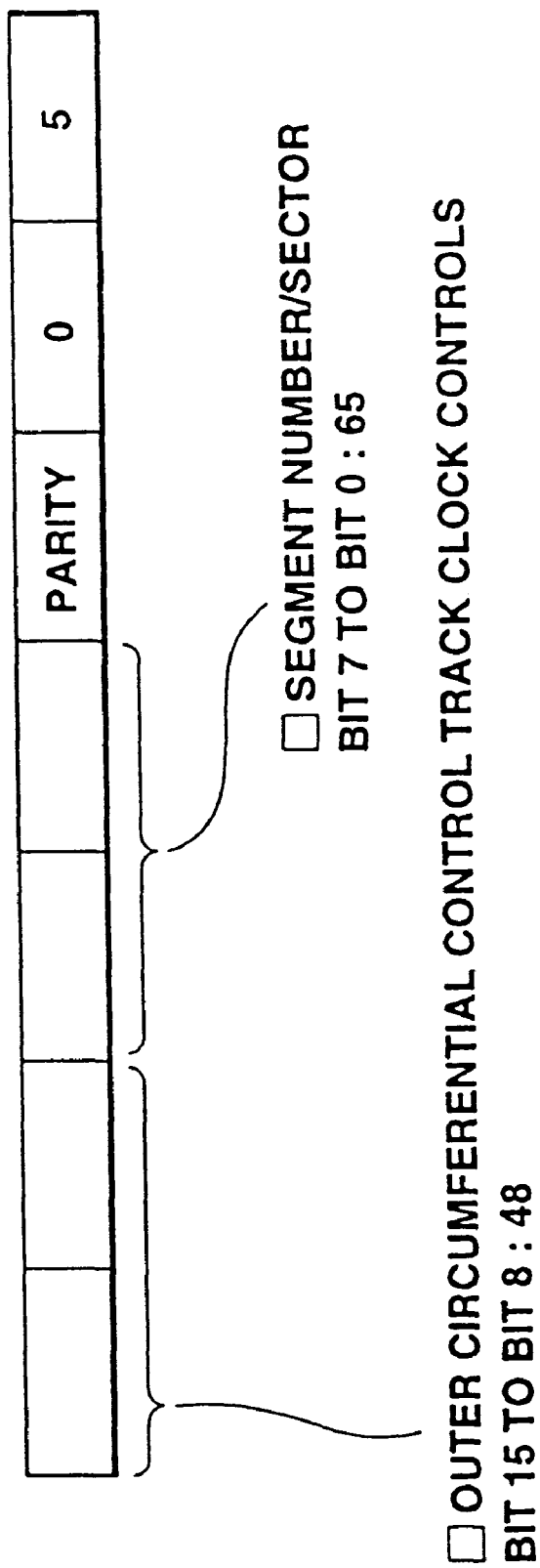
FIG. 26 is a view showing the content of the GCP information of the page number 6 of the GCP segment.

Also, the GCP information of the page number 5 is information indicating an outer circumference control track clock ratio/number of segments per sector as shown in FIG. 26, the value "M" of the clock shown in FIG. 15, which is information indicating the number of clocks of the outer circumference control track, is provided by the bit 15 to the bit 8, and information indicating the number of segments per sector is provided by the bit 7 to the bit 0.

Figure 27:
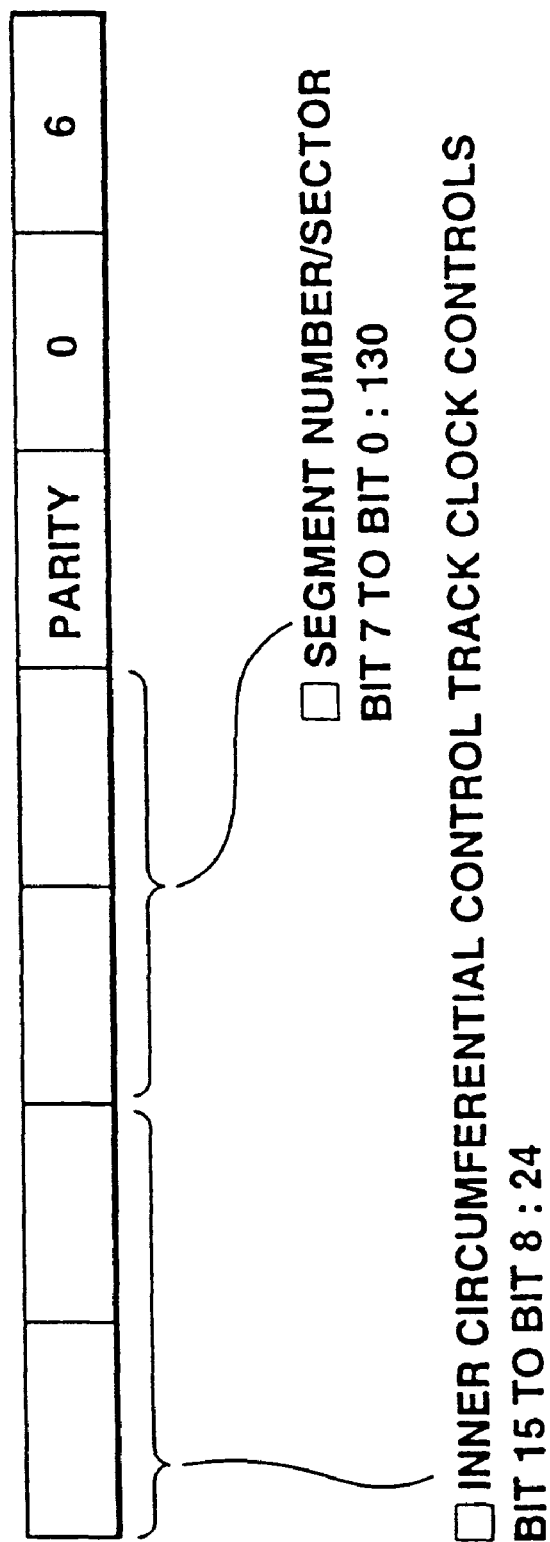
FIG. 27 is a view showing the content of the GCP information of the page number 7 of the GCP segment.

Also, the GCP information of the page number 6 is information indicating the inner circumference control track clock ratio/number of segments per sector as shown in FIG. 27, information indicating the number of clocks of the inner circumference control track is provided by the bit 15 to the bit 8, and information indicating the number of segments per sector is provided by the bit 7 to the bit 0.

Figure 28:
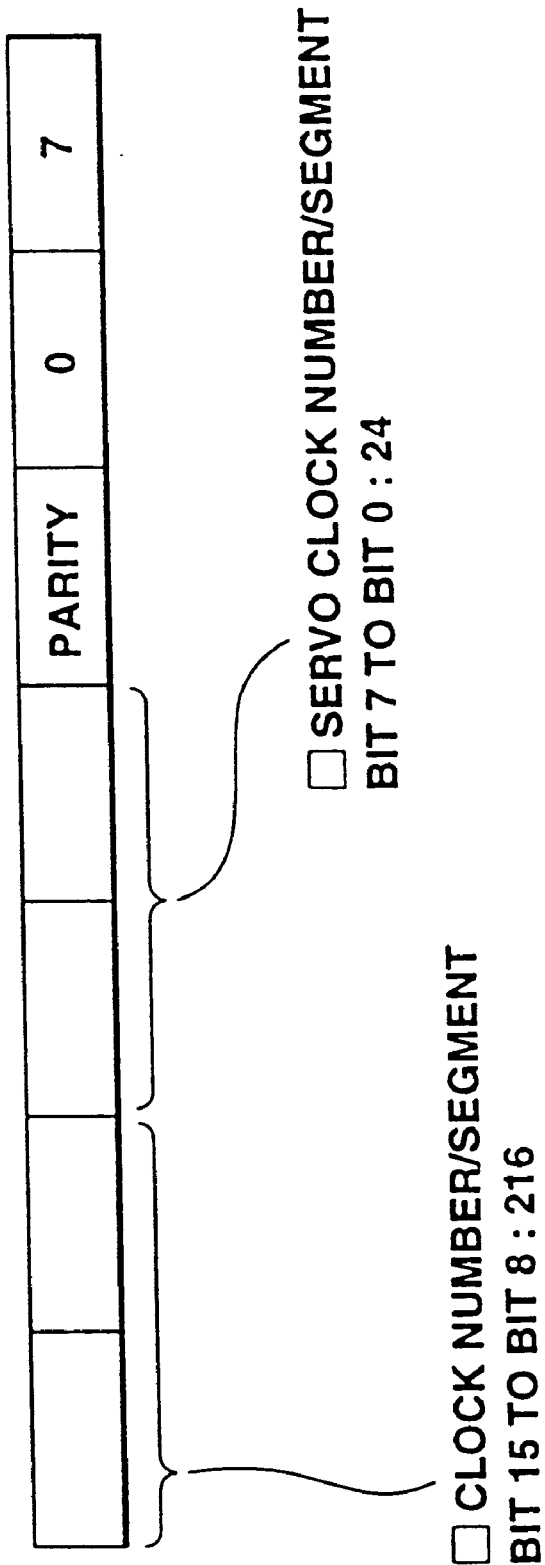
FIG. 28 is a view showing the content of the GCP information of the page number 8 of the GCP segment.

Also, the GCP of the page 7 is information indicating the number of clocks per segment/number of servo clocks per segment as shown in FIG. 28, and information indicating the number of clocks per segment is provided by the bit 15 to the bit 8, and information indicating the number of servo clocks per segment is provided by the bit 7 to the bit 0.

Figure 29:
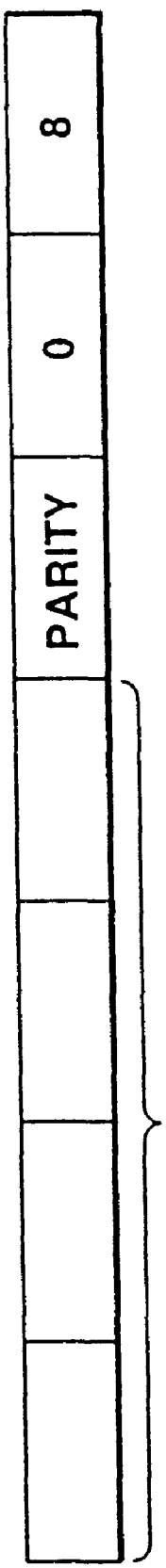
FIG. 29 is a view showing the content of the GCP information of the page number 9 of the GCP segment.

Also, the GCP information of the page number 8 is information indicating the number of segments per track as shown in FIG. 29, and information indicating the number of segments per track is provided by the bit 15 to the bit 0.

Figure 30:
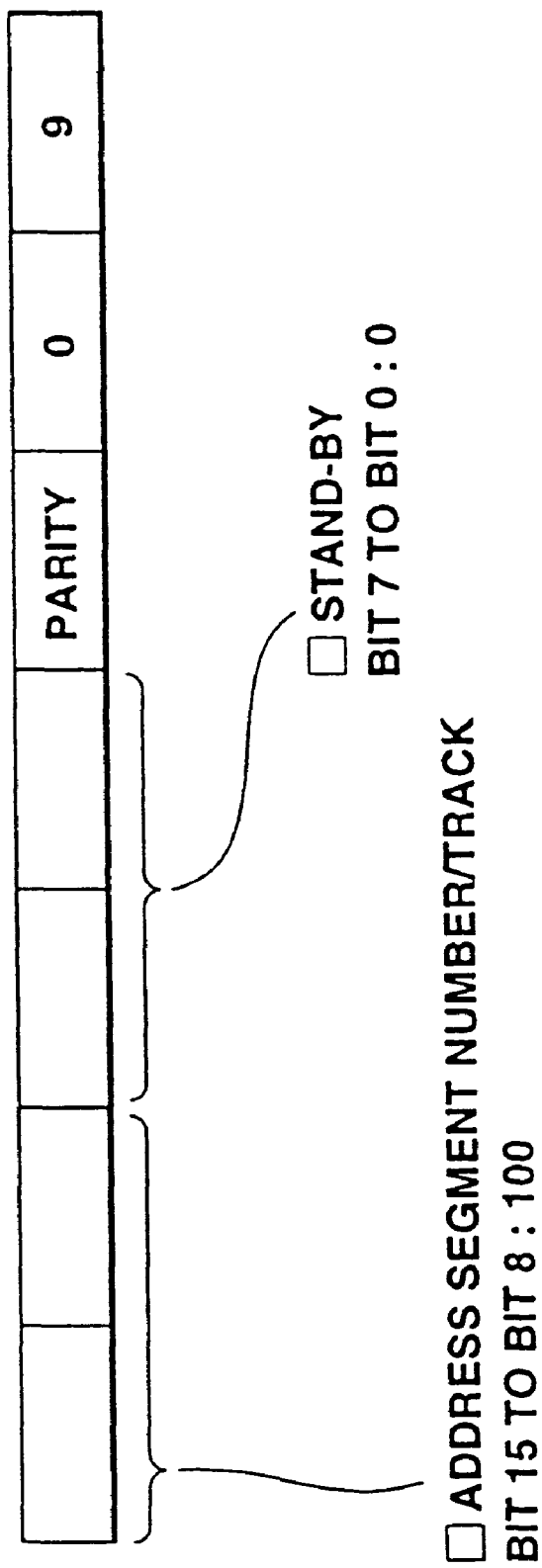
FIG. 30 is a view showing the content of the GCP information of the page number 10 of the GCP segment.

Further, the GCP information of the page number 9 is information indicating the number of address segments per track/stand-by as shown in FIG. 30, and information indicating the number of address segments per track is provided by the bit 15 to the bit 8. Note that, among the GCP information of this page number 9, bit 7 to bit 0 are the stand-by information.

Next, on the control track, the above 20 bytes of GCP information, 10 bytes of media information such as laser wavelength, reflection rate, track pitch, etc., 70 bytes of system information such as various types of physical block addresses, number of bytes of data field, number of data clocks of various types of areas, number of zones, etc., and 320 bytes of band information such as definition data of each zone, etc. are recorded.

By recording information A (A=number of segments/track) indicating the number of segments per track (1 byte), information B indicating the start track number of each zone (2 bytes), information indicating the total number of tracks of each zone (2 bytes), information D (D=number of segments/sector) indicating the number of segments per sector (1 byte), etc. in this control track, for example a physical track address and a physical segment address, can be calculated from the serial sector address as follows.

Namely, by converting the serial sector address to the zone number E and the offset number F by using a table and performing an arithmetic operation such as: F×D/A=G (quotient). . . H (remainder) from that offset number F, the physical track address and the physical segment address in that zone can be calculated while defining:

physical track address=B+G and physical segment address=H

In this way, the magneto-optic disk used in the related juke device can provide information indicating the address segment ASEG and the head segment of a sector by recording the address mark ADM and respective sector marks STM1 and STM2 in the servo area ARs without an increase of redundancy of the data area ARd. In addition, it is indicated by the sector marks STM1 and STM2 whether that segment is the data segment DSEG of the head of the sector or one preceding segment to this, and therefore even if a defect etc. occurs in one sector mark, an inconvenience that all of the sectors have become fault sectors can be prevented, and the rate of generation of the fault sectors can be lowered.

Also, since the magneto-optic disk records a servo pit having a length of 2 clocks for the servo clock SCK to be formed in the servo area ARs, the mirror part in the servo area ARs can be reduced. For this reason, the generation of ghost pits at the time of making the disk etc. can be reduced. Also, the pit interval has become 5 pits or more at the shortest, and therefore mutual interference of data at the time of reproduction can be suppressed and the formation of a stable servo signal can be enabled.

Also, since the magneto-optic disk records the recording data subjected to scramble processing as the KRZI modulated data in the data segment DSEG, the recording pattern can be randomized and an inconvenience that the fixed pattern is continuously generated can be prevented. For this reason, the formation of the disk can be stably carried out, and the required capacity of the memory during Viterbi decoding at the reproduction apparatus can be reduced.

Also, since the magneto-optic disk provides the pre-write area ARPR and the post-write area ARPO in the data area ARd of the data segment DSEG, and therefore a remaining heat time by the laser beam can be secured, and a certain data recording in the data area ARd can be enabled.

Also, since the magneto-optic disk provides the servo information and address information by the servo area ARs and the address segment ASEG arranged at the equiangularly separated positions, the reproduction system can use the servo clock SCK obtained based on the servo information to read the address information irrespective of the recording/reproduction of the data and therefore a stable high speed seek operation is made possible. Also, since the numbers of sectors of the plurality of zones are made the same and the data capacities are made equal, it is not necessary to change the numbers of the parity sectors and the alternate sectors etc. for every zone and the control software can be simplified.

Also, since the magneto-optic disk is provided so that the end segment of a zone and the starting segment of the next zone are connected, the formation of useless segments can be prevented. Also, since the starting segments of the zones are arranged at the same positions of the tracks, the zones can be started from the segments of the same segment numbers and the management of the zones can be facilitated.

Also, the magneto-optic disk can provide media information subjected to gray coding by the same format as that for the address information recorded in the address segment ASEG by the GCP area over a plurality of tracks. For this reason, the media information can be detected by using the decoder for the detection of the address information also for this purpose. Also, even at the time of cutting, it is not necessary to use a special signal generator, and in addition, also the address information can be read during the reading of the GCP area on the reproduction apparatus side and thus reliable management of the position of the pick-up is enabled.

Also, the magneto-optic disk can provide information for reading the media information indicating the type of media and format and information of the control track to the reproduction apparatus by the GCP area. Also, since it can provide media information having the same content a plurality of times by one turn of the track, media information having a high reliability can be given to the reproduction apparatus. Also, since it can provide media information of the same content by the segments positioned in the diameter direction of the tracks of the GCP area, the reproduction of the media information is enabled on the reproduction apparatus side even in the off-track state. Further, in the optical disk, since the same media information can be provided by the GCP area provided in the vicinity of the inner circumferential end and the vicinity of the outer circumferential end, it is possible to handle both of a reproduction apparatus starting the access from the inner circumferential side and are production apparatus starting the access from the outer circumferential side.

Figure 31:
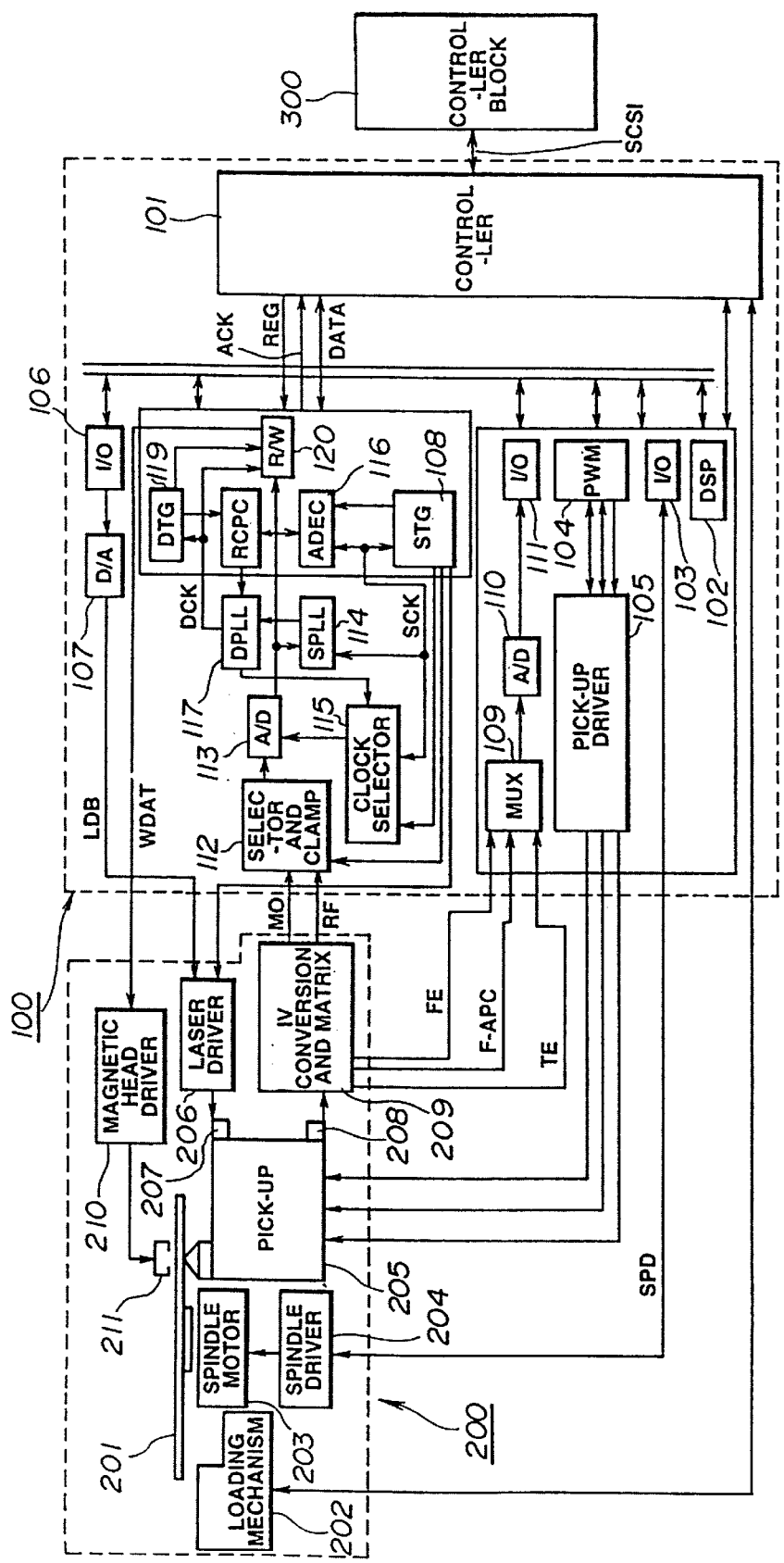
FIG. 31 is a block diagram of an MO drive provided in the juke device.

Since the magneto-optic disk has such numerous characteristics, the overall storage capacity is greatly improved. The MO drives 56 to 60 performing the recording and reproduction of the data to and from such a magneto-optic disk are each constituted by a control circuit block 100 and a disk drive 200 as shown in FIG. 31. This MO drive is connected to the controller block 23 shown in FIG. 1 and first and second SCSI connector terminals 37 and 38 via the SCSI interface and performs the transfer of the commands and data via a controller 101 provided in the control circuit block 100.

The controller 101 adds the CRC, error correction code, etc. to the data (data obtained by converting the serial data from the RS232C connector terminal 35 to parallel data by the controller block 23) supplied via the control block 23 or the data supplied via the first and second SCSI connector terminals 37 and 38 at the time of recording and supplies the same to the disk drive 200. Also, at the time of the reproduction, the controller 101 performs error correction with respect to the data reproduced by the disk drive 200 and supplies the user data part to the controller block 23 or the first and second SCSI connector terminals 37 and 38. Further, in this MO drive, an instruction with respect to the servo system and blocks of the disk drive 200 is carried out by a digital signal processor (DSP) 102 performing the necessary processing with respect to the commands supplied from the controller block 23 via the controller 101.

In such an MO drive, when the magneto-optic disk 201 is inserted into the disk drive 200 via the disk insertion and ejection port 62 shown in FIG. 4 by the manipulator 40 shown in FIG. 2, the magneto-optic disk 201 is loaded on a spindle motor 203 by a loading mechanism 202. When this state is exhibited, the DSP 102 forms a command for rotating the spindle motor 203 automatically or in accordance with a request from the controller block 23 and supplies this to a spindle driver 204 via an I/O block 103. The spindle driver 204 rotates the spindle motor 203 at a constant angular velocity (CAV) when the command is supplied and, at the same time, detects the rotational speed of the spindle motor 203. Then, when detecting that the predetermined rotational speed is obtained for the spindle motor 203, it forms a spindle on-off signal SPD and supplies this to the DSP102 and informs the system that the rotation has become stable.

Figure 32:
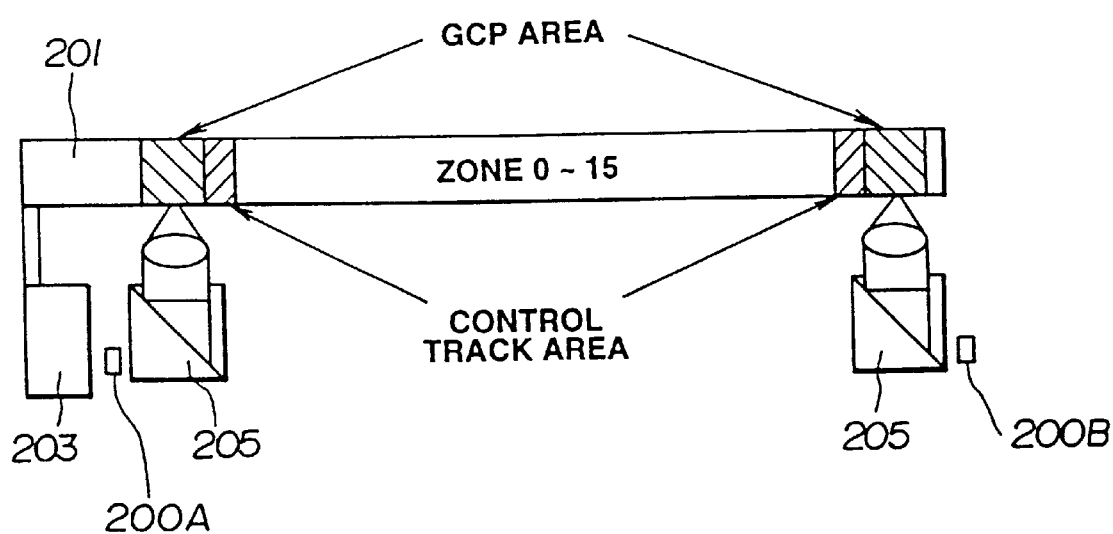
FIG. 32 is a view for explaining a pull-in position of the focus in the MO drive.

On the other hand, the DSP102 moves the pick-up 205 during a period where the rotational speed of the spindle motor 203 becomes stable until it abuts against the stopper 200A in the vicinity of the outer circumferential end of the magneto-optic disk 201 or a stopper 200B in the vicinity of the inner circumferential end as shown in FIG. 32 and controls the pick-up driver 105 via the pulse width modulation circuit (PWM circuit) so as to perform the pull-in of the focus by irradiating the laser beam to the GCP area outside the recording area (outside the zones 0 to 15) of the magneto-optic disk 201.

When the pull-in of the focus is carried out in the recording area, if the sensitivity of the magneto-optic disk is high, there is a concern that the already recorded data will be erroneously erased, but the data is recorded in the GCP area by the pre-pits, and therefore by moving the pick-up 205 to the GCP area and then performing the pull-in of the focus, erroneous erasing of the data can be prevented.

When performing the pull-in of focus in the GCP area in this way, the DSP102 detects the media information recorded in the GCP area and decides if a magneto-optic disk 201 is the ROM disk used only for reproduction or a magneto-optic disk in which recording is possible. As mentioned above, in the GCP area, the media information converted to the gray code is recorded with the same format as that for the address information. For this reason, the DSP102 can read the media information by the same reading method as that for the address information, and the simplification of the control program can be achieved by commonly using the reading method of the two. In addition, the media information are recorded in the respective GCP areas of a plurality of tracks, and therefore before the pull-in of the tracking servo is completed, the reading of the media information can be carried out and the time required until the recording and reproduction are started can be shortened.

Next, when the rotational speed of the spindle motor 203 becomes constant and the pick-up 205 is moved to the vicinity of for example the outer circumferential end, the DSP102 sets a bias current LDB of the laser diode 207 provided in the pick-up 205 and forms a command for driving the laser diode 207 to emit a beam at this set level. Then, this command is supplied to a servo system timing generator (STG) 108 performing the on/off control of the laser diode 207 from the I/O block 106 via the D/A converter 107. Note that, the DSP102 sets a high level bias current LDB at the time of recording and sets a low level bias current LDB at the time of reproduction.

Next, when the laser diode 207 is driven to emit a beam, a part of the laser beam irradiated to the magneto-optic disk 201 is irradiated to the photodetector 208, and a detected output by this photodetector 208 is supplied to a multiplexer 109 as a front APC signal F-APC via a current-voltage (I-V) conversion & matrix amplifier 209. This front APS signal F-APC is digitalized by the A/D converter 110 as the signal selected by the multiplexer 109 in a time division manner and supplied to the DSP102 via the I/O block 111.

The DSP102 detects the light of a current laser beam by the digitalized front APC signal F-APC, and the light control data is calculated by the digital filter provided in the DSP102. Then, based on this light control data, the bias current LDB is variably controlled so that the light of the laser beam emitted from the laser diode 207 becomes constant.

Next, the DSP102 controls a PWM circuit 104 so as to supply for example a current of a triangular wave to the focus driver of the pick-up driver 105. Due to this, a focus actuator of the pick-up 205 is vertically driven in accordance with the triangular wave and a focus search state is exhibited. At this time, the reflected light of the laser beam reflected by the magneto-optic disk 201 is detected by the photodetector for the focus error detection explained later. Then, the detection output by the photodetector for the focus error detection is converted to a voltage by an I-V conversion block of the I-V conversion & matrix amplifier 209 and supplied as the focus error signal FE to the multiplexer 109 via the matrix amplifier. This focus error signal FE is digitalized by the A/D converter 110 as the signal selected by the multiplexer 109 in the time division manner similar to the front APC signal F-APC and supplied to the DSP102 via the I/O block 111.

The DSP102 forms the focus control data by applying a digital filtering processing to the digitalized focus error signal FE and feeds back this to the focus driver of the pick-up driver 105 via the PWM circuit 104. Due to this, a servo loop for the focus control is constituted.

Next, when such a focus control becomes stable, the amplitude of the RF signal (at the time of the ROM disk) or MO signal (at the time of the data area of the MO disk) from the above pre-write area $AR_{PR}$ obtained from the detection output by the photodetector 208 by the I-V conversion & matrix amplifier 209 becomes constant to a certain extent.

This RF signal or MO signal is subjected to clamping processing to an appropriate potential by the selector and clamp 112 and subjected to A/D conversion by the A/D converter 113.

In this way, by performing the clamping processing by utilizing the pre-write area $AR_{PR}$, a stable signal can be obtained and a correct clamping operation is enabled.

Next, to the A/D converter 113, via the clock selector 115, the servo clock signal SCK from the servo system clock production (SPLL) circuit 114, and the data clock signal DCK from the data clock production (DPLL) circuit 117 are selectively supplied. The clock selector 115 is controlled by a servo system timing generator (STG) 1018 so as to select the servo clock signal SCK as the reproduction RF signal from the servo area and select the data clock signal DCK for the reproduction RF signal from the data area. The clock at the time of the pull-in operation of the servo becomes the frequency of the free run state of the servo system clock production (SPLL) circuit 114. Also as the timing pulse of clamping, a signal obtained by dividing this servo clock signal SCK of the frequency in the free run state by a predetermined value is used.

Next, the SPLL circuit 114 detects the pit pattern currently being reproduced based on the amplitude difference of the RF signal digitalized by the A/D converter 113 and detects the pit pattern the same as the pit train of the preliminarily determined servo area. When detecting the same pit pattern, the SPLL circuit 114 forms a window in the servo area of the next frame which is the timing at which the next pit pattern should appear. Then, it detects whether or not the pit patterns coincide at a timing at which the window is formed. Such a detection operation of the pit pattern is continuously carried out a predetermined number of times. When the coincidence of the two patterns is continuously detected a predetermined number of times, the SPLL circuit 114 regards that the phase of the servo clock SCK formed by the SPLL circuit 114 is locked with respect to the rotation phase of the disk.

Figure 33:
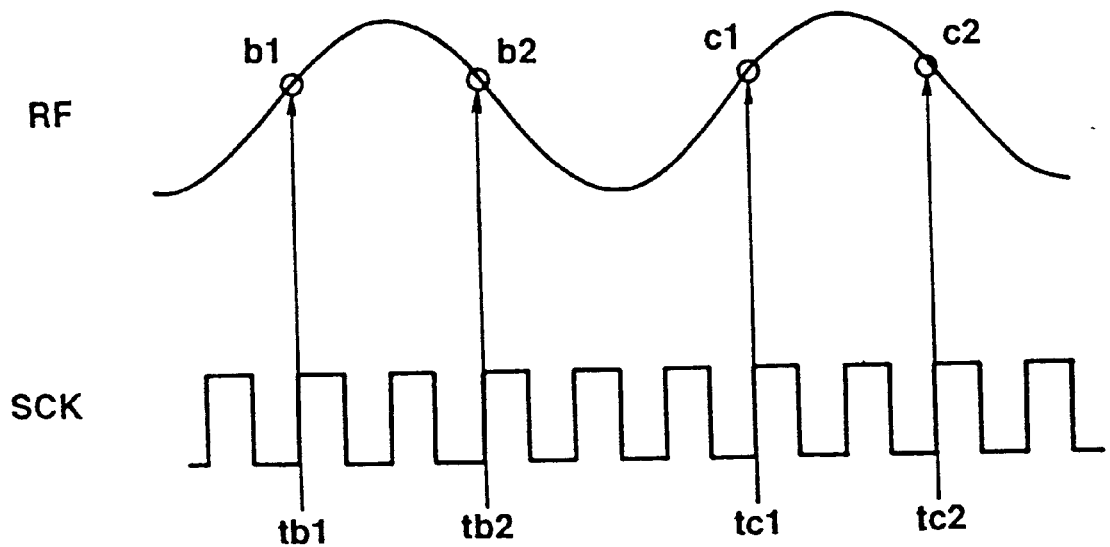
FIG. 33 is a timing chart for explaining a sample timing for taking out clock information from a reproduction RF signal of a wobble pit by the MO drive.

Here, in the reproduction RF signal of the wobble pit Pb, the two shoulders of the waveform are sampled at the timings of tb1, tb2, tc1, and tc2 of the servo clock SCK before or after the center point of the signal waveform (top of the waveform) by the amount of one servo clock as shown in FIG. 33. Then, a phase difference (detection phase difference data) between the servo clock SCK and the servo data is detected by the following equation where the sampling data formed by performing the sampling at the timings of tb1, tb2, tc1, and tc2 are b1, b2, c1, and c2, respectively.

Phase difference data=$[(b2-b1)+(c2-c1)]/2$

The phase servo control by PLL is carried out so that the value of this phase difference data always becomes zero.

In this way, by detecting the amplitude difference of the two shoulders of the wobble pits Pb and Pc in the servo area and adding them, averaging the added values, and detecting the phase information, even if an amplitude change occurs in the reproduced waveform of the wobble pits Pb and Pc due to a tracking position, this can be absorbed by the averaging and a fluctuation in gain can be prevented.

Next, when the SPLL circuit 114 is locked, the controller 101 forms a window at four timings A, B, C, and D shown in FIG. 7, performs the sampling detection of the reproduction RF signal of the first pit Pa at the timings A, B, C, and D and, at the same time, detects the maximum value from among the sample values. Where this maximum value is that detected at the timing A, it indicates that the maximum value is one of the address mark ADM. For this reason, it can be detected that the segment thereof is the address segment and the head of the frame. Due to this, in the controller 101, it is possible to clear the involved frame counter and establish frame synchronization.

Namely, since one frame consists of 14 segments, the controller 101 forms a window for every 14 segments and judges that the frame synchronization is locked when the address mark is continuously detected a predetermined number of times.

When the frame synchronization is established, detection of the position at which the address is recorded becomes possible, and therefore the address decoder (ADEC) 116 performs the decoding of the access code ACC and the frame code FRC.

More specifically, the ADEC 116 performs the sampling of the reproduction RF signals at the positions of a, b, c, and d shown in FIG. 8 and detects the position at which the amplitude value thereof becomes the maximum by the method of detection of the maximum value of the difference (differential detection method). Also, the ADEC 116 similarly performs the sampling of the reproduction RF signal at the positions e, f, g, and h shown in FIG. 8 and detects the position at which the amplitude thereof becomes the maximum. Then, the decoding is carried out by detecting the coincidence of the two by comparing these combinations and the gray code table shown in FIG. 8.

Due to this method, the track addresses [AM] to [AL], parity data [P], and frame addresses [FM] and [FL] are decoded and the results of decoding are stored in the register. The DSP102 detects the current position of the pick-up 205 by reading the decoding results stored in this register when these data are decided. Note, not only four bits, but all of the data are converted to the gray codes, and therefore a comparison with the inverted or non-inverted table is carried out according to whether the LSB among the upper significant 4 bits is "1" or "1" not by merely viewing the coincidence. Here, the first decoded frame code FRC is loaded in the frame counter, and the numerical value obtained by incrementing this frame counter for every frame is compared with the actually reproduced frame code FRC. When they coincide continuously a predetermined number of times, it is regarded that the rotation synchronization is obtained. Thereafter, by feeding back the numerical value obtained by the frame counter to the DSP102 as the frame code FRC, even if a slight defect etc. occurs on the disk, the frame position can be detected without erroneous detection.

Also, the ADEC116 decodes the GCP information by a similar method to that for the track address and frame code FRC. Note, by reading the decoding result stored in the register not by the address segment, but by the GCP segment GCPseg in which the GCP information is recorded, the content of the GCP area ARgcp is detected.

Also, the DSP102 computes the moving speed of the pick-up 205 while reading the previous track address converted to a gray code at the time of the seeking and controls the slide motor of the pick-up 205 via the slide driver of the pick-up driver 105 from the PWM circuit 104 to move the pick-up 205 to a target track. Then, when detecting that the pick-up 205 is moved to the target track, tracking control is carried out.

As mentioned above, the tracking error signal TE is detected as a difference of amplitude values of the reproduction RF signals of two wobble pits recorded in the servo area. The DSP 102 applies filtering processing in a digital manner to this tracking error signal TE to form the tracking control data, feeds back this to the pick-up driver 105 via the PWM circuit 104, and thereby forms the servo loop for the tracking control.

Next, the DSP102 detects the head position of a target sector in a state where the tracking is applied. As mentioned above, in the segment which becomes the head of each sector and the segment preceding this, the sector marks STM1 and STM2 are respectively recorded. The reproduction RF signals of the sector marks STM1 and STM2 are sampled at four timings of A, B, C, and D shown in FIG. 7. The DSP 102 detects the maximum value from among the sample values and where this maximum value is one sampled at the condition of B, it is indicated that the segment thereof is the leading segment of the sector, and where the maximum value is one sampled at the timing of C, it is indicated that the segment thereof is the segment preceding the head of the sector.

Basically, the segment acting as the head of the sector is determined by converting the sector address supplied from the controller block 23 to a physical sector and computing in which segment of which track that sector exists, but the probability that the two types of sector marks will simultaneously become defective becomes less than $10^{-10}$ in terms of experience and the probability of generation of a fault sector by this is extremely small.

Also, the data clock production (DPLL) circuit 117 creates the data clock DCK obtained by multiplying the servo clock SCK applied with the frame synchronization by M/N, obtained by the SPLL circuit 114, and supplies this data clock DCK to the data system timing generator (DTG) 119 and the recording/reproduction circuit (R/W circuit) 120. The data clock DCK created by the data clock production (DPLL) circuit 117 is phase-compensated by the read clock phase compensation (RCPC) circuit 121 based on the phase in the read clock phase compensation area of the reproduction RF signal of the reference data shown in FIG. 14.

At the time of the recording operation mode, in the R/W circuit 120, user data to be recorded is supplied from the controller block 23 via the controller 101. This R/W circuit 120 is provided with a scramble processing circuit having a structure as shown in for example FIG. 34.

Figures 34, 35:
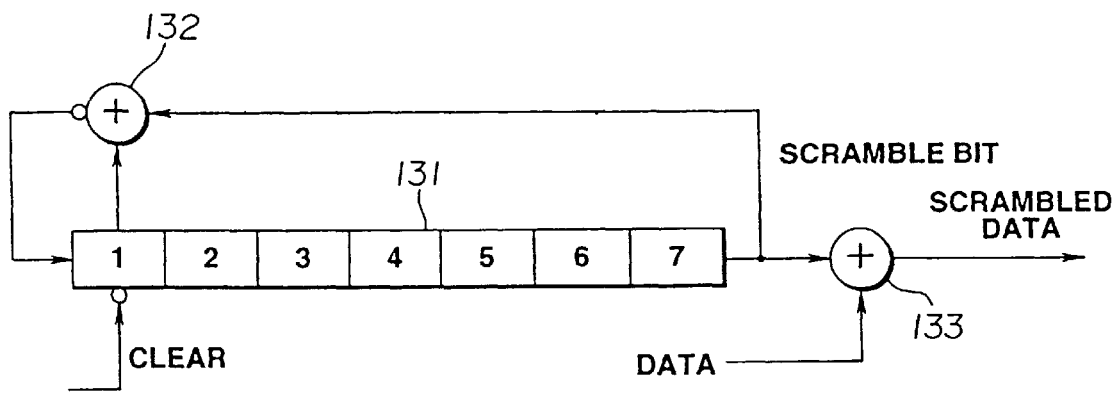
FIG. 34 is a block diagram of a scramble processing circuit provided in the MO drive.
FIG. 35 is a view showing a scramble table of the scramble processing circuit.

The scramble processing circuit shown in FIG. 34 is constituted by a flip-flop 131 having a seven-stage structure, a first adder 132 which adds (EXOR) the outputs of an initial stage and a final stage of the flip-flop 131 and feeds back the same to the initial stage of the flip-flop 131, and a second adder 133 which adds (EXOR) the output of this first adder 132 and the recording data. This scramble processing circuit generates the random number of 127 cycles such as the scramble table shown in for example FIG. 35 as the output of the first adder 132 by clearing the flip-flop 131 for every starting timing of the sector and adds (EXOR) the random number to the recording data by the second adder 133, thereby to perform the scramble processing according to $Y=X^7+X+1$ in the unit of sectors.

Then, in the R/W circuit 120, the user data scrambled in this way is modulated to the data of the NRZI system in synchronization with the data clock DCK. At this time, the initial value is brought to "0" for every segment. Then, a modulation signal WDAT thereof is supplied to a magnetic head 211 via the magnetic head driver 210. The magnetic head 211 generates a magnetic field in accordance with the modulation signal WDAT and applies the generated magnetic field to the data area ARd of the magneto-optic disk 201 over-heated to the Curie temperature by the laser beam from the laser diode 207, thereby to record the data of the NRZI system.

Note that, at the time of the recording, the servo system timing generator (STG) controls the laser driver 206 so as to switch from a laser beam of the reproduction driving level to a laser beam of the recording driving level at a timing where the pick-up 205 moves to the pre-write area of the data area from the servo area. Then, the data system timing generator (DTG) 119 controls the R/W circuit 120 so as to record the data of a specific polarity (data of the same polarity as that of the bulk erase of the pre-write area $AR_{PR}$) in the pre-write area ARPR at a timing where the pick-up 205 passes the pre-write area ARPR.

In this way, by recording the data having the same polarity as that in the bulk erase direction in the pre-write area $AR_{PR}$, even in a case where the data is not normally recorded in the pre-write area $AR_{PR}$ due to the shortage of remaining heat of the media, the recorded data does not change, and therefore stable signal reproduction can be carried out.

Next, at the time of the reproduction mode, the reproduction MO signal obtained from the detection output by the photodetector 208 by the I-V conversion & matrix amplifier 209 is clamped to the appropriate potential by the selector and clamp 112, digitalized by the A/D converter 113, and supplied to the R/W circuit 120. Then, the R/W circuit 120 applies the digital filtering processing to the reproduction MO signal digitalized by the A/D converter 113 for making the reproduction MO signal adapted to the partial response (1:1) and applies the data decoding processing of the NRZI system by Viterbi decoding. Then, the data of this NRZI system is converted to the data of the NRZ system in the unit of segments and then descrambled in the unit of sectors, thereby to form the reproduction data. This reproduction data is supplied to the controller block 23 and the first and second SCSI connector terminals 37 and 38 via the controller 101.

In this way, by applying the scramble processing to the recording data, the data pattern can be randomized and the probability that a data train whose value cannot be decided will continue during the Viterbi decoding can be made small. For this reason, the required memory capacity for the Viterbi decoding can be reduced. Also, where the magneto-optic disk 201 is a ROM disk used only for reproduction, the pit alignment has been randomized, and therefore the ratio of presence/absence of pits on the disk can be made close to the ideal 50 percent and the fabrication of the disk can be facilitated.

Also, the magneto-optic disk 201 is formed by dividing the tracks formed in the form of concentric circles or a spiral into a plurality of sectors each having the servo area ARs and the data area ARd and recording in each servo area an address mark indicating the address segment ASEG in which the track address is recorded, a data segment DSEG in which the data of the head of sector is recorded, and a sector mark indicating the segment preceding this. For this reason, by detecting the address mark and the sector marks recorded in the servo area ARs by the controller 101, the recording/reproduction of data with respect to the target sector can be carried out.

Also, in the GCP zone of the magneto-optic disk 201, since media information converted to a gray code are recorded with the same format as that for the address information of the address segment ASEG, by reading the media information and reading the control information from the control track based on this media information, a control operation based on this control information can be carried out.

Next, the pick-up 205 provided in each of the MO drives 56 to 60 further has the characteristics as explained below.

Figure 36:
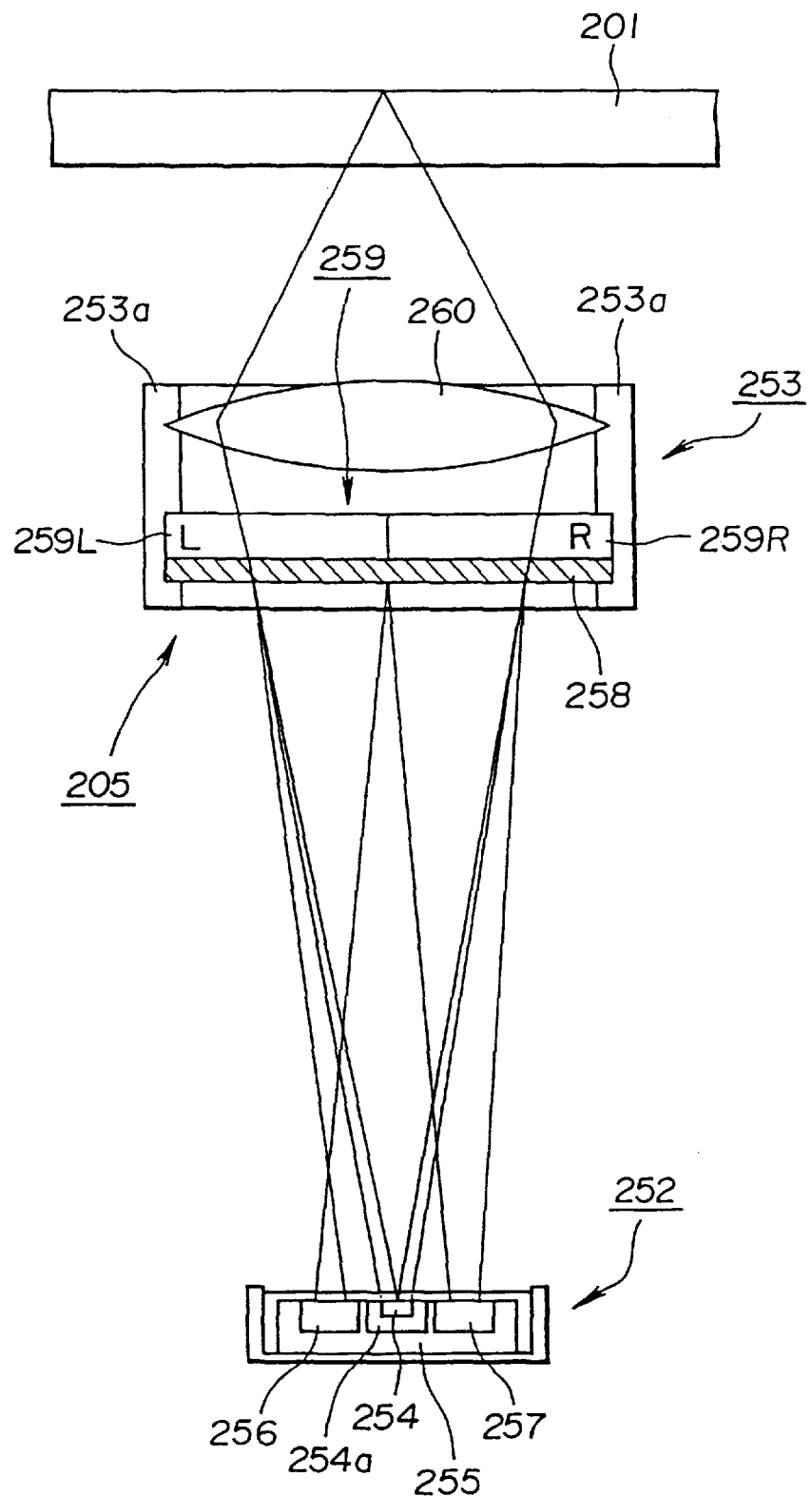
FIG. 36 is a view showing the structure of an optical pick-up provided in the MO drive.

Namely, the pick-up 205 is constituted by a laser module 252 which irradiates a laser beam to the magneto-optic disk 201 as shown in FIG. 36 and receives the reflected light thereof and a movable unit 153 which irradiates the laser beam from the laser module 252 to the magneto-optic disk 201 and, at the same time, irradiates the reflected light thereof to the laser module 252.

The movable unit 253 is constituted by sequentially stacking in an internal portion of a holding portion 3a of a cylindrical shape a polarization hologram 258, a two-piece optical rotation plate 259, and an object lens 260 each having a disk-like shape of the same diameter and is provided so that the emitting surface of the object lens 260 and the recording surface of the magneto-optic disk 201 face each other and the incident surface of the polarization hologram 258 and the emitting surface of the laser module 252 face each other.

The polarization hologram 258 has a characteristic that allows it to pass for example a P polarization component laser beam from the laser module 252 therethrough as it is and emits the reflected light of the S polarization component with a polarization direction orthogonal to the P polarization component after changing the light path thereof.

Also, the two-piece optical rotation plate 259 is divided into two, i.e., a right optical rotation plate 259R and a left optical rotation plate 259L, with the light axis of the laser beam passed through the polarization hologram 258 as a boundary. This direction of division is the diameter direction of the disk. Also, the right optical rotation plate 259R has a characteristic emitting the laser beam transmitted through the polarization hologram 258 while rotating the same to the right direction by for example 22.5 degrees and the left optical rotation plate 259L has a characteristic of emitting the laser beam while rotating the same to the left direction by for example 22.5 degrees.

Note that, this movable unit 253 is driven and controlled in accordance with the tracking error, focus error, etc.

The laser module 252 is constituted by a laser diode 254 which emits a laser beam in a parallel direction to the recording surface of the magneto-optic disk 201, a reflection mirror 254 which reflects the laser beam from the laser diode 254 toward the recording surface of the magneto-optic disk 201, and first to third three photodetectors 255 to 257. The photodetectors 255 to 257 are arranged in parallel along the diameter direction of the disk so as to receive three beams of reflected light from the movable unit 253 as shown in FIG. 37A to FIG. 37C.

Figure 37A:
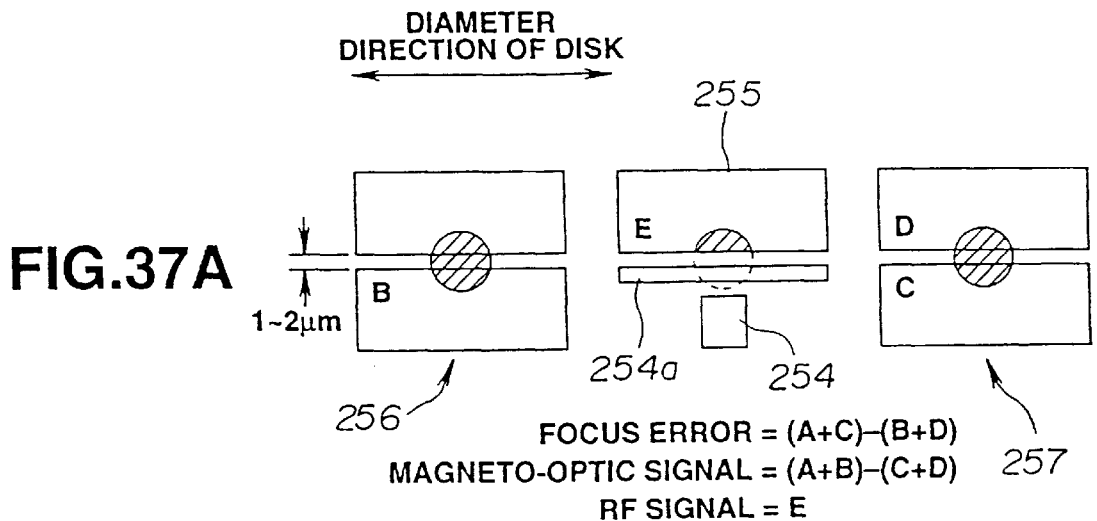
FIG. 37A is a view showing a positional relationship of a photodetector provided in a laser module of the optical pick-up and a state of emission of reflected light at the time of exact focus.
Figure 37B:
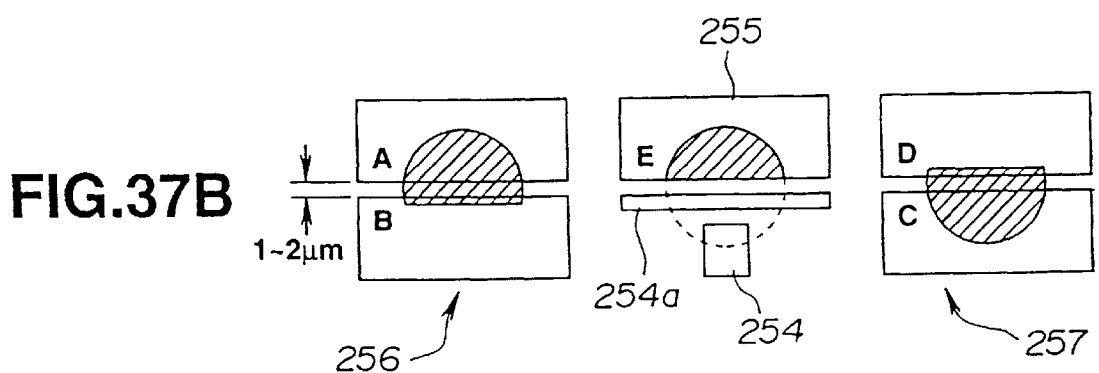
FIG. 37B is a view showing the state of emission of reflected light emitted to the laser module where the focus is deviated to the disk side.
Figure 37C:
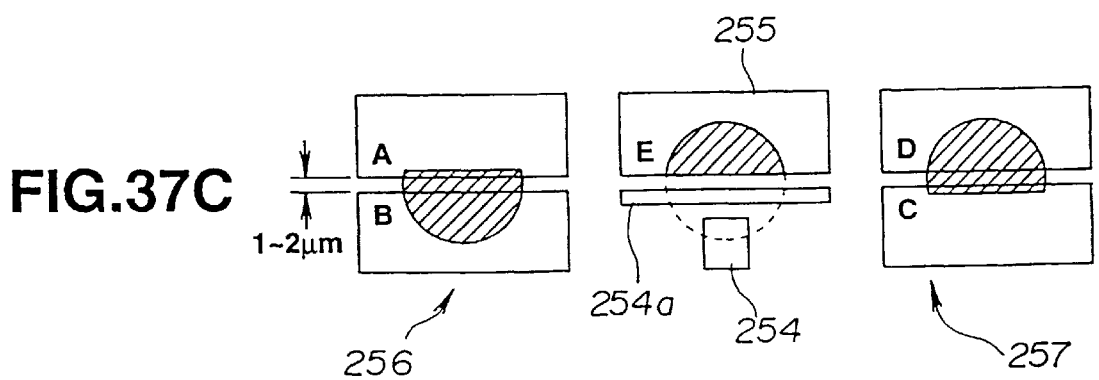
FIG. 37C is a view showing the state of emission of the reflected light emitted to the laser module where the focus is deviated to the anti-disk side.

Namely, the first photodetector 255 is provided on the rear side of the reflection mirror 254a as shown in FIG. 37A to FIG. 37C and receives substantially half of the reflected light emitted without a change of the light path by the polarization hologram 258.

Also, the second photodetector 256 is a two-piece photodetector divided into two in the diameter direction of the disk with for example a 1 to 2 μm interval and receives the reflected light from the left optical rotation plate 259L the light path of which being changed by the polarization hologram 258 at substantially the center portion thereof.

Moreover, also the third photodetector 257 is a two-piece photodetector divided into two in the diameter direction of the disk with for example a 1 to 2 μm interval and receives the reflected light from the right optical rotation plate 259R changed in light path by the polarization hologram 258 at substantially the center portion thereof.

Note that, the photodetector 208 shown in FIG. 31 is constituted by these first to third photodetectors 255 to 257.

Next, an explanation will be made of the operation of the pick-up 205 having such a structure.

Figure 38A:
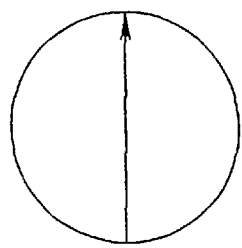
FIG. 38A is a view showing a direction of polarization of a laser beam emitted from the laser module of the optical pick-up.

First, the P polarization component laser beam as shown in FIG. 38A is emitted from the laser diode 254 of the laser module 252 in a parallel direction to the recording surface of the magneto-optic disk 201. This laser beam is vertically reflected to the recording surface of the magneto-optic disk 201 by the reflection mirror 254a at a reflection angle of 45 degrees and is irradiated to the polarization hologram 258 of the movable unit 253.

The polarization hologram 258 has a characteristic that emits the P polarization component as it is without a change of the light path and emits the S polarization component by changing the light path thereof. For this reason, the laser beam incident upon the polarization hologram 258 passes as it is through the polarization hologram 258 and strikes the two-piece optical rotation plate 259.

Figure 38B:
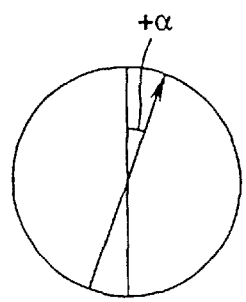
FIG. 38B is a view showing an optical rotation direction of the laser beam rotated by a right optical rotation plate provided in the optical pick-up.
Figure 38C:
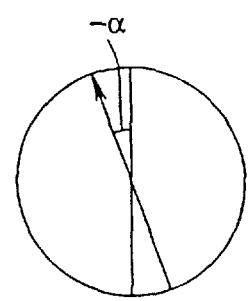
FIG. 38C is a view showing the optical rotation direction of the laser beam rotated by a left optical rotation plate provided in the optical pick-up.

The two-piece optical rotation plate 259 emits the right direction laser beam while rotating the same to the right direction by 22.5 degrees (+a) as shown in FIG. 38B by the right optical rotation plate 259R with the light axis as the boundary and, at the same time, emits the left direction laser beam while rotating the same to the left direction by 22.5 degrees (−a) as shown in C of the same figure by the left optical rotation plate 259L with the light axis as the boundary. The laser beams respectively rotated by this two-piece optical rotation plate 259 are converged by an object lens 260 and irradiated to the magneto-optic disk 201.

Next, the reflected light is produced by the emission of the laser beam to the magneto-optic disk 201, but the right-rotated or left-rotated laser beam is rotated in the right direction or left direction by qK degrees, respectively, by a so-called Kerr effect in accordance with the data recorded on the magneto-optic disk 201. This reflected light strikes the two-piece optical rotation plate 259 via the object lens 260. At this time, the laser beam and the reflected light have exactly opposite directions of advance and therefore the laser beam passing via the right optical rotation plate 259R at the stage of the laser beam is incident upon the left optical rotation plate 259L ar the stage of the reflected light, and the one passing via the left optical rotation plate 259L at the stage of the laser beam is incident upon the right optical rotation plate 259R at the stage of the reflected light.

The reflected light incident upon the left optical rotation plate 259L is rotated to the further right direction by the left optical rotation plate 259L by 22.5 degrees and emitted, and the reflected light incident upon the right optical rotation plate 259R is rotated to the further right direction by the right optical rotation plate 259R by 22.5 degrees and emitted.

Figure 38D:
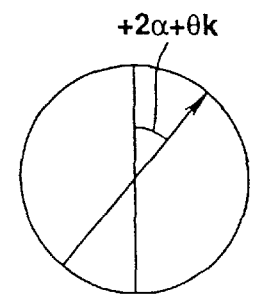
FIG. 38D is a view showing the optical rotation direction of the reflected light of the laser beam rotated by the left optical rotation plate provided in the optical pick-up.
Figure 38E:
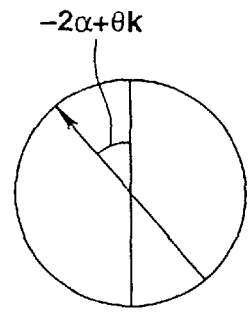
FIG. 38E is a view showing the optical rotation direction of the reflected light of the laser beam rotated by the right optical rotation plate provided in the optical pick-up.

Accordingly, the reflected light emitted from the left optical rotation plate 259L is rotated to the right direction by +45 degrees+θK minutes (22.5 degrees+22.5 degrees+θK (data amount)=+45 degrees+θK) as shown in FIG. 38D and emitted. Also, the reflected light emitted from the right optical rotation plate 259R is rotated to the left direction by −45 degrees+θK minutes (−22.5 degrees−22.5 degrees+θK (data amount)=−45 degrees+θK) as shown in FIG. 38E and emitted. The beams of reflected light rotated to the respective directions by this two-piece optical rotation plate 259 strike the polarization hologram 258.

Here, since the reflected light is rotated to the right direction or left direction by an amount of +45 degrees+θK minutes as mentioned above, it has both components of the P polarization component and the S polarization component. Also, the polarization hologram 258 changes the light path of the light of the S polarization component by the predetermined amount and then emits the same. At this time, even with the same S polarization components, it has a characteristic of emitting the light of the S polarization component having a right optical rotational direction while changing the light path thereof to the left direction, while emitting the light of the S polarization component having the left optical rotational direction while changing the light path thereof to the right direction.

Figure 38F:
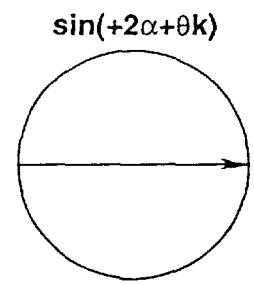
FIG. 38F is a view showing the polarization component of the reflected light after the left optical rotation plate.
Figure 38G:
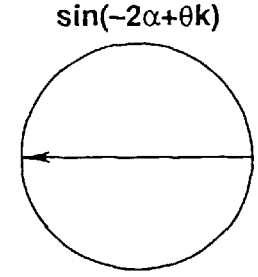
FIG. 38G is a view showing the polarization component of the reflected light after the right optical rotation plate.

For this reason, since the reflected light as shown in FIG. 38F coming via the left optical rotation plate 259L has the S polarization component having a right optical rotational direction, it is changed in the light path thereof to the left direction by a predetermined amount by the polarization hologram 258 and then is irradiated to the second photodetector 256 of the laser module 252 as shown in FIG. 37A. Also, since the reflected light as shown in FIG. 38G coming via the right optical rotation plate 259R has the S polarization component having a left optical rotational direction, it is changed in the light path thereof to the right direction by a predetermined amount by the polarization hologram 258, and irradiated to the third photodetector 257 of the laser module 252 as shown in FIG. 37A. Further, among the beams of reflected light incident upon the polarization hologram 258, the reflected light of the P polarization component is emitted as it is without a change of the light path by the polarization hologram 258, and therefore irradiated to the first photodetector 255 of the laser module 252 as shown in FIG. 37A.

More specifically, in the case of an exact focus, as indicated by the hatching in FIG. 37A, the three beams of reflected lights formed as straight lines along the diameter direction of the disk by the polarization hologram 258 are irradiated to the photodetectors 255 to 257 as beam spots having a predetermined diameter. Note that, the movable unit 253 and the laser module 252 are adjusted in position so as to obtain a diameter of beam spot of for example the diffraction limit (the predetermined diameter) in a state of this exact focus.

Also, the beam of reflected light irradiated to the first photodetector 255 is reflected light of the P polarization component, and therefore will pass through the same light path as that for the laser beam without a change of the light path by the polarization hologram 258. For this reason, the reflected light of the P polarization component is divided into two by the reflection mirror 54a and substantially half of the overall reflected light is received by the first photodetector 255.

When receiving the beams of reflected light, the photodetectors 255 to 257 form light detection signals which are electric signals based on the amount of light received and supply them to the I-V conversion & matrix amplifier 209 shown in FIG. 31.

The I-V conversion & matrix amplifier 209 forms a focus error signal (FE signal), a magneto-optic signal (MO signal), and an RF signal based on the equations shown as the following Equation 1 to Equation 3 while defining the light detection signals from the light receiving region A and the light receiving region B of the second photodetector 256, which is a 2-division photodetector, as A and B, similarly defining the light detection signals from the light receiving region C and the light receiving region D of the third photodetector 257, which is a 2-division photodetector, as C and D, and defining the light detection signal from the light receiving region E of the first photodetector 255 as E.

FE signal=(A+C)−(B+D)  Equation 1

MO signal=(A+B)−(C+D)  Equation 2

RF signal=E  Equation 3

The FE signal is supplied to the DSP102 as mentioned above. The DSP102 drives the movable unit 253 via the pick-up driver 105 to a direction correcting the defocus based on the FE signal. Due to this, the recording and reproduction of data can be always carried out in the exact focused state.

Also, in the detection of the MO signal, since the MO signal is detected by using substantially 100 percent of the reflected light (reflected light of the S polarization component) rotated to the right direction or the left direction in accordance with the data recorded in the magneto-optic disk 201, it is possible to handle fluctuations of wavelength and, in addition, improve the S/N ratio.

Also, since the MO signal is detected by subtraction of the light detection signal of the reflected light of the S polarization component which is received at the second photodetector 256 via the right optical rotation plate 259R and has a left optical rotational direction from the light detection signal of the reflected light of the S polarization component which was received at the second photodetector 256 via the left optical rotation plate 259L and has a right optical rotational direction, it is possible to eliminate the same phase noise component and, at the same time, to detect the MO signal in such a way that only the signal component is amplified.

The RF signal is formed by receiving substantially half of the reflected light of the P polarization component from the magneto-optic disk 201 at the first photodetector 255 as mentioned above, but this reflected light of the P polarization component is obtained by directly receiving the reflected light from the magneto-optic disk 201, and therefore all of signal components from the low range to the high range are contained. For this reason, an RF signal having a good S/N ratio can be formed, which can contribute to the formation of the correct system clock and so on.

In this way, the light detection signals formed by the photodetectors 255 to 257 are used for the formation of the system clock, FE signal, ME signal, etc., but if the focus is deviated to the disk side and defocus occurs, the diameter of the beam spot of the laser beam irradiated to the magneto-optic disk 201 becomes larger than the predetermined diameter and therefore the diameters of the beam spots of the reflected light irradiated to the photodetectors 255 to 257 become larger than the predetermined diameter as shown in FIG. 37B.

Also, the reflected light which should strike the left optical rotation plate 259L of the two-piece optical rotation plate 259 will strike the right optical rotation plate 259R, and the reflected light which should be rotated to the further right direction by 22.5 degrees by the left optical rotation plate 259L will be rotated to the left direction by 22.5 degrees by the right optical rotation plate 259R and the light returned at the stage of reflected light by the amount of optical rotation at the stage of the laser beam. Similarly, the reflected light which should strike the right optical rotation plate 259R of the two-piece optical rotation plate 259 will strike the left optical rotation plate 259L, and the reflected light which should be rotated to the further left direction by 22.5 degrees by the right optical rotation plate 259R will be rotated to the left direction by 22.5 degrees by the left optical rotation plate 259L and the light returned at the stage of reflected light by the amount of optical rotation at the stage of the laser beam. For this reason, the amount of reflected light with a light path changed by the polarization hologram 258 becomes small, and as shown in FIG. 37B, so-called half moon-like reflected light will be irradiated to the light receiving region A of the second photodetector 256, and similarly half moon-like reflected light will be irradiated to the light receiving region C of the third photodetector 257.

Accordingly, where the focus is deviated to the disk side and defocus occurs, the light detection signals at the light receiving region A and the light receiving region C become large, and therefore if the FE signal is computed based on Equation 1, the result of the computation becomes plus (+).

The DSP102 drives the movable unit 253 to the anti-disk direction in accordance with the plus result of computation when the FE signal indicating the plus result of computation is supplied. Due to this, the defocus state deviated to the disk side can be corrected to an exact focus state as shown in FIG. 37A.

Next, when the focus is deviated to the anti-disk side to cause defocus, the diameter of the beam spot of the laser beam irradiated to the magneto-optic disk 201 becomes larger than the predetermined diameter, and the diameters of the beam spots of the reflected light irradiated to the photodetectors 255 to 257 become larger than the predetermined diameter as shown in FIG. 37C. Also, the reflected light which should strike the left optical rotation plate 259L of the two-piece optical rotation plate 259 will strike the right optical rotation plate 259R, and the reflected light which should be rotated to the further right direction by 22.5 degrees by the left optical rotation plate 259L will be rotated to the left direction by 22.5 degrees by the right optical rotation plate 259R and the light returned at the stage of reflected light by the amount of optical rotation at the stage of the laser beam. Similarly, the reflected light which should strike the right optical rotation plate 259R of the two-piece optical rotation plate 259 will strike the left optical rotation plate 259L, and the reflected light which should be rotated to the further left direction by 22.5 degrees by the right optical rotation plate 259R will be rotated to the left direction by 22.5 degrees by the left optical rotation plate 259L and the light returned at the stage of reflected light by the amount of optical rotation at the stage of the laser beam.

For this reason, the amount of reflected light with a light path changed by the polarization hologram 258 becomes small, and as shown in FIG. 37C, half moon-like reflected light will be irradiated to the light receiving region B of the second photodetector 256, and similarly half moon-like reflected light will be irradiated to the light receiving region D of the third photodetector 257.

Accordingly, where the focus is deviated to the anti-disk side and defocus occurs, the light detection signal at the light receiving region B and the light receiving region D becomes large, and therefore if the FE signal is computed based on Equation 1, the result of operation becomes minus (−). The DSP102 drives the movable unit 3 to the disk direction in accordance with the minus result of computation when the focus error signal indicating the minus result of computation is supplied. Due to this, the defocus state deviated to the anti-disk side can be corrected to the exact focus state as shown in FIG. 37A.

In this way, the pick-up 205 is structured so that the laser beam is rotated to the right direction or the left direction with the light axis as the boundary by the two-piece optical rotation plate 259 and this reflected light is divided into three by the polarization hologram 258 in accordance with the optical rotational direction and directly received at the first to third photodetectors 255 to 257 of the laser module 252 which is integrally constituted with the laser diode 254. Therefore it is not necessary to provide a polarization beam splitter, a beam splitter, etc. for extracting the reflected light in the light path and a reduction of the number of parts can be achieved. For this reason, the overall light path can be shortened, and in addition a reduction of the cost of the related pick-up 205 per se can be achieved through the simplification of the structure, more specifically, a reduction of cost of the MO drive in which the related pick-up 205 is provided can be achieved.

Also, the coupling efficiency and the S/N ratio have a trade-off relationship. For example if it is intended to enhance the coupling efficiency, the S/N ratio is lowered, and conversely if it is intended to enhance the S/N ratio, the coupling efficiency is lowered, but the polarization hologram 258 does not act at the stage of the laser beam (forward path), but acts only at the stage of the reflected light (returning path), and therefore a high coupling efficiency can be realized and in addition three beams of reflected light from the polarization hologram 258 can be directly received in substantially the entire light amount by the photodetectors 255 to 257 and a high S/N ratio can be realized.

Also, it is sufficient so far as the position of the laser module 252 is controlled so that the reflected light from the movable unit 253 is appropriately received at the photodetectors 255 to 257, and therefore the assembly, position adjustment, etc. can be easily carried out.

Also, the entire movable unit 253 is driven in accordance with the FE signal, and therefore focus error can be corrected while maintaining the initial set position of the portions 258 to 260 constituting the movable unit 253.

Next, the MO disk arrays 4 and 5 having such MO drives 56 to 60 record data by the RAID1, RAID3, and RAID5 recording systems having different functions and performances, but to record the data, it is necessary to preliminarily load the magneto-optic disk in the related juke device. For this reason, the user loads the magneto-optic disk before the recording. As mentioned above, in the related juke device, 20 magneto-optic disks can be accommodated. There are two types of methods of loading magneto-optic disks.

First, a first loading method is one in which, as shown in FIG. 3, the front door 7 is opened, the lower magazine 21 and upper magazine 22 are taken out, and the magneto-optic disks are loaded in the magazines 21 and 22 by hand. Where using this loading method, the user turns on the functional switch 11 provided in the front panel 8. In FIG. 1, when the functional switch 11 is turned on, the controller block 23 supplies current for opening the front door 7 to the door lock coil 16. Due to this, an interlock switch 17 is turned off, and the front door 7 which has been kept in a locked state heretofore becomes open and enables the removal of the magazines 21 and 22. Also, when the front door 7 becomes open, the door sensor 15 detects this and supplies this detection output to the controller block 23. The controller block 23 controls the display 10 so as to display the message of for example "DOOR OPEN" when the detection output is supplied. The user can recognize that the front door 7 is in the open state by the message displayed on the display 10.

When the front door 7 is opened, the user takes out the magazines 21 and 22 and loads the magneto-optic disks in them by hand. Then, the user accommodates the magazines 21 and 22 in which the magneto-optic disks are loaded in the juke device again and closes the front door 7. Due to this, it is possible to load 20 magneto-optic disks at one time.

Next, the second loading method is a method in which the magneto-optic disks are loaded one by one via the mail slot 12 shown in FIG. 2. Where this loading method is used, the user inserts the magneto-optic disks one by one into the mail slot 12. When the magneto-optic disks are inserted into the mail slot 12, the controller block 23 detects this and drives the transfer motor 13 to transfer the magneto-optic disks to the mail box 41. It is possible to continuously insert 20 magneto-optic disks via the mail slot 12. A full sensor 14 shown in FIG. 1 detects the state of fullness whenever a magneto-optic disk is inserted and supplies the detection output to the controller block 23. When the insertion of magneto-optic disks is started, the controller block 23 displays the insertable number on the display 10 and displays the reduction of the insertable number on the display 10 based on the detection output from the full sensor 14 whenever a magneto-optic disk is inserted. Due to this, whenever a magneto-optic disk is inserted, the insertable number displayed on the display 10 is decremented such as for example 20, 19, 18, 17, . . . , etc., so the user can insert the magneto-optic disks while confirming the insertable number.

Note that, when the insertable number becomes 0, that is, when 10 magneto-optic disks are accommodated in each of the magazines 21 and 22, the controller block 23 displays a message of for example "FULL" on the display 10. Due to this, the user can recognize that 10 magneto-optic disks are accommodated in each of the magazines 21 and 22.

On the other hand, when a magneto-optic disk is transferred to the mail box 41, the controller block 23 drives the motor 30 for vertical operation and moves the manipulator 40 to a direction where the mail box 41 is provided and, at the same time, drives the motor 24 for the gripping operation to grip and lift the magneto-optic disk transferred to the mail box 41 by the gripper 42 provided in the manipulator 40. Next, the controller block 23 drives the motor 30 for vertical operation and moves the magneto-optic disk gripped and lifted by the gripper 42 to the empty disk accommodating portion of the magazines 21 and 22. Then, it drives the motor 24 for the gripping operation and releases the magneto-optic disk gripped and lifted by the gripper 42 inside the disk accommodating portion. The controller block 23 controls the portions so that such a series of loading operations is repeatedly carried out whenever a magneto-optic disk is inserted via the mail slot 12.

In this second loading method, it is necessary to insert the magneto-optic disks one by one via the mail slot 12, but the inserted magneto-optic disks can be automatically loaded in the magazines 21 and 22 by the control of the movement of the magneto-optic disks by the controller block 23.

Next, when the magneto-optic disks are loaded in the magazines 21 and 22 by the first loading method or the second loading method in this way, the controller block 23 controls the manipulator 40 and transfers the magneto-optic disks accommodated in the lower magazine 21 or the upper magazine 22 to the first MO disk array 4 or the second MO disk array 5. As mentioned above, five magneto-optic disks can be loaded in each of the MO drives 4 and 5. Using the manipulator 40, five among the 20 magneto-optic disks accommodated in the magazines 21 and 22 will be loaded in the first MO disk array 4 and another five disks will be loaded in the second MO disk array 5.

Next, when the magneto-optic disks are loaded in the MO disk arrays 4 and 5, the controller block 23 controls the first to fifth MO drives 56 to 60 to the reproduction state via the RAID controllers 55 provided in the MO disk arrays 4 and 5. Then, the GCP information recorded in the GCP segments GCPseg in the data segments DSEG of the magneto-optic disks are read and stored in the memory provided in the related controller block 23. As the GCP information, as explained by using FIG. 21 to FIG. 30, media information indicating if that magneto-optic disk is a ROM disk used only for reproduction, a RAM disk for which the recording is possible, or a hybrid disk in which a ROM region and a RAM region are mixed, etc. are recorded. For this reason, by reading out the GCP information, the attributes of the magneto-optic disks can be detected, and thereafter control of the recording and reproduction in accordance with the attributes of the magneto-optic disks becomes possible.

Next, where recording data, the user operates the keypad 9 to select a desired recording system from among the RAID1, RAID3, and RAID5 recording systems, select a desired exchange system from among the first to sixth exchange systems, and, at the same time, designate one or both of the MO disk arrays 4 and 5 for the recording operation. Then, after the selection of the recording system and exchange system, the user operates the keypad 9 and designates the start of recording of data.

As mentioned above, the MO disk arrays 4 and 5 are supplied with the data to be recorded via the RE232C connector terminal 35 or first and second SCSI connector terminals 37 and 38. When the start of recording of the data is designated, the controller block 23 controls the MO disk arrays 4 and 5 via the RAID controller 55 so that the recording of the data is carried out in accordance with the selected recording system and exchange system.

More specifically, the RAID1 recording system is a recording system emphasizing safety and is referred to as a mirroring system. Where this RAID1 recording system is selected, the controller block 23 supplies the data indicating that the RAID1 recording system is selected to the RAID controller 55. When the data is supplied from the controller block 23, the RAID controller 55 controls the MO drives 56 to 60 so as to record the data by the RAID1 recording system.

Figure 39A:
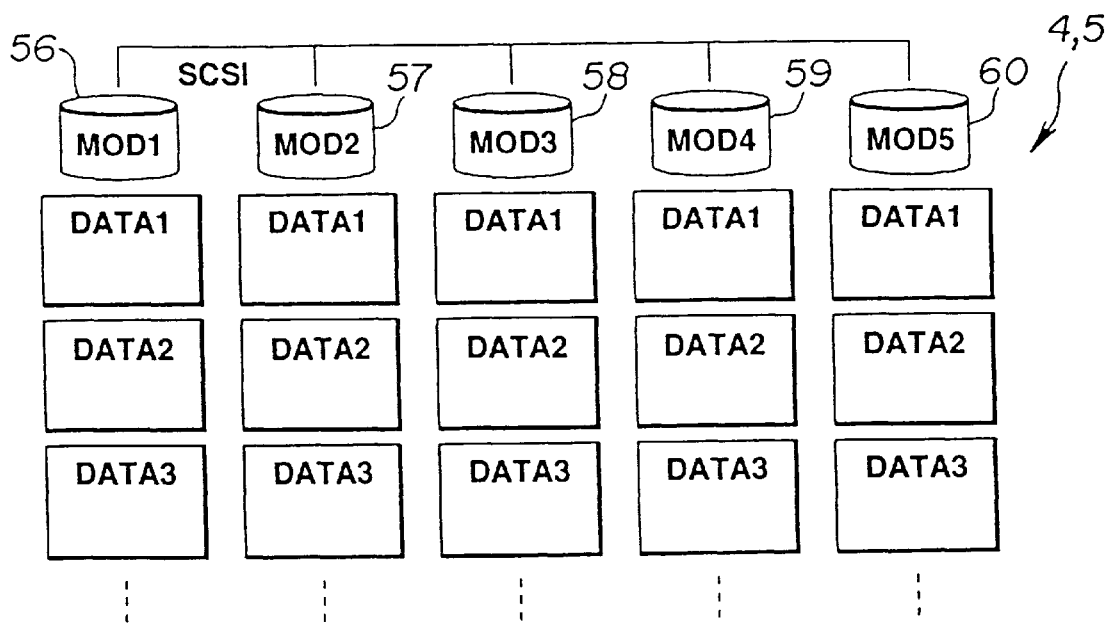
FIG. 39A is a view for explaining the RAID1 recording system (mirroring) carried out by the MO disk array of the juke device.

Namely, as shown in FIG. 39A, where a series of data consisting of for example the data 1, data 2, data 3, . . . are recorded by the RAID1 recording system, the RAID controller 55 controls the MO drives 56 to 60 so that a series of data consisting of the data 1, data 2, data 3, . . . is recorded by the MO drives 56 to 60. Due to this, the same data is recorded by the MO drives 56 to 60 and therefore even in a case where trouble occurs in for example the first MO drive 56, the series of data can be recorded by the remaining second to fifth MO drives 57 to 60 and the safety of the data can be secured.

Figure 39B:
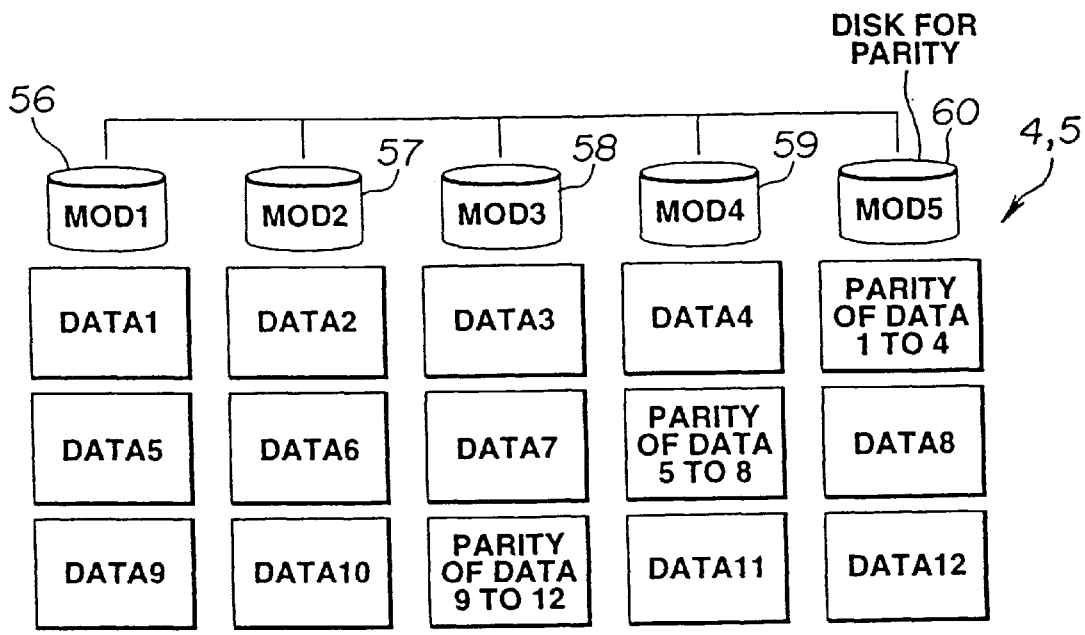
FIG. 39B is a view for explaining the RAID3 recording system (striping) carried out in the MO disk array of the juke device.

Next, RAID3 and RAID5 are recording systems which are referred to as striping systems and emphasize the speed of transfer of data, but the RAID3 is characterized in that a specific MO drive is used as the MO drive for parity data, and the RAID5 is characterized in that the parity data is recorded dispersed in a plurality of MO drives.

Where the RAID3 recording system is selected and a series of data is recorded, the RAID controller 55 controls the MO drives 56 to 59 so as to record the data 1, data 5, data 9, . . . by the first MO drive 56 as shown in FIG. 39B, record the data 2, data 6, data 10, . . . by the second MO drive 57, record the data 3, data 7, data 11, . . . by the third MO drive 58, and record the data 4, data 8, data 12, . . . by the fourth MO drive 59. Then, the fifth MO drive 60 is designated as the MO drive for parity data, and the fifth MO drive 60 is controlled so as to record the parity data of the data 1 to data 4, the parity data of the data 5 to data 8, the parity data of the data 9 to data 12, . . . by the fifth MO drive 60. Due to this, the series of data can be recorded in parallel by the MO drives 41 to 45, and therefore it is possible to handle data of a high transfer speed.

Figure 39C:
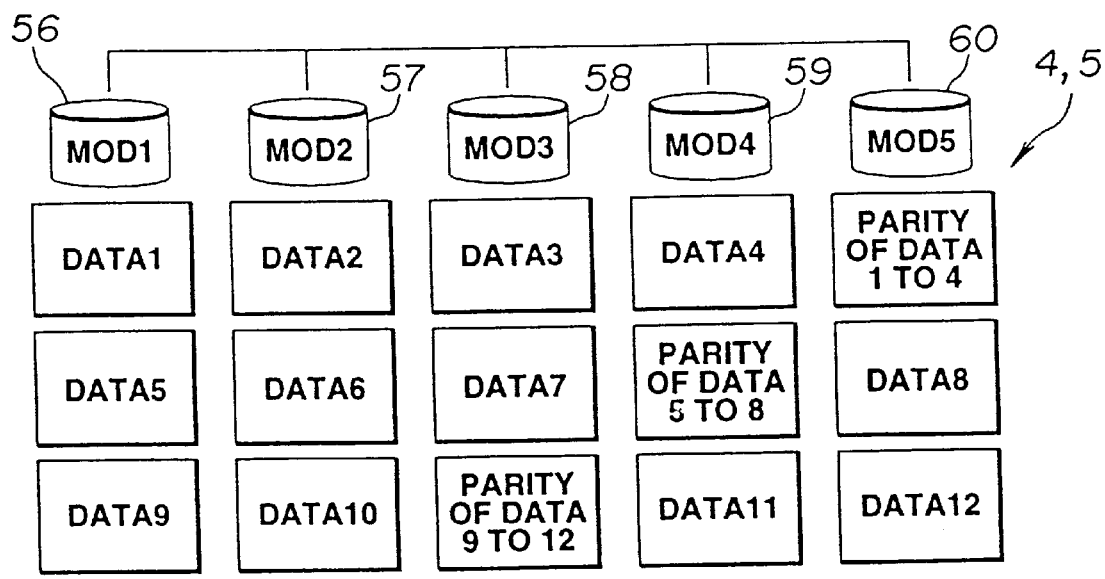
FIG. 39C is a view for explaining the RAID5 recording system (striping) carried out in the MO disk array of the juke device.

Next, where the RAID5 recording system is selected and a series of data is recorded, the RAID controller 55 controls the MO drives 56 to 60 so as to record the data 1, data 2, data 3 and data 4 by the first to fourth MO drives 56 to 59 as shown in FIG. 39C and, at the same time, record the parity data of the data 1 to data 4 by the fifth MO drive 60, record the data 5 to data 7 and data 8 by the first to third MO drives 56 to 58 and the fifth MO drive 60 and, at the same time, record the parity data of the data 5 to data 8 by the fourth MO drive 59, record the data 9, data 10, data 11, and data 12 by the first and second MO drives 56 and 57 and the fourth and fifth MO drives 59 and 60 and, at the same time, record the parity data of the data 9 to data 12 by the third MO drive 58. Due to this, the series of data can be recorded in parallel by the MO drives 56 to 60, and therefore it is possible to handle data of a high transfer speed.

In the RAID3 recording system, the parity data is recorded only by the fifth MO drive 60, and therefore data cannot be simultaneously written by different MO drives, but in the RAID5 recording system, the parity data is recorded dispersed by the MO drives 56 to 60, and therefore data can be simultaneously written by the different MO drives and the overall performance can be improved.

For example, where the image data of 640 pixels and 480 pixels is transferred in full color, the data is transferred at a transfer speed of about 26 MP per second, but in the related juke device, the RAID3 and RAID5 recording systems enables data to be recorded in parallel by five or 10 MO drives, and therefore it is possible to handle data of such a high transfer speed.

Moreover, it is also possible to set the MO disk arrays 4 and 5 to the desired recording systems, for example, set the first MO disk array 4 to the RAID1 recording system, set the second MO disk array 5 to the RAID3 recording system, etc. Due to this, improvement of the convenience of the related juke device can be achieved, for example, the recording corresponding to the data of high transfer speed by the RAID3 recording system is possible in the second MO disk array 5 while performing recording for which the safety is guaranteed by the RAID1 recording system in the first MO disk array 4.

Also, in recent years, samples of movies (sample movies) etc. have been supplied in the form of CDROMs, but these CDROMs have slow transfer rates. For this reason, by dividing the data reproduced from the CDROMs and recording it in parallel in the magneto-optic disks by the RAID3 or RAID5 recording system, recording and reproduction with a high transfer rate is enabled.

Next, when the data continues to be recorded by such recording systems (RAID1, RAID3, and RAID5), the recordable regions of the magneto-optic disk are gradually decreased and finally the data is recorded in all recording regions, whereafter it is necessary to exchange the already recorded magneto-optic disk with a new magneto-optic disk so as to continue the recording of the data. The method of the exchange of the magneto-optic disk which has to be exchanged in this way is set by the selection of the exchange system performed before the start of the recording. In the related juke device, six types of exchange systems, that is, the first to sixth in total, are provided. The controller block 23 exchanges the already recorded magneto-optic disk with a new magneto-optic disk in accordance with the exchange system selected from among the exchange systems by the user.

Note that the storage capacity of a general hard disk at present is 2 to 3 gigabytes and that the hard disk peripherals are adjusted to a data processing speed in accordance with this storage capacity etc. For this reason, in the related juke device, by setting the storage capacity of the magneto-optic disks to 650 megabytes and performing the recording and reproduction with respect to such a magneto-optic disk by five MO drives 56 to 60, a storage capacity of 2.35 gigabytes (650 MB×5=3.25 GB) is obtained as a whole (by one MO disk array) and interchangeability with the already existing peripherals is secured.

Figure 40:
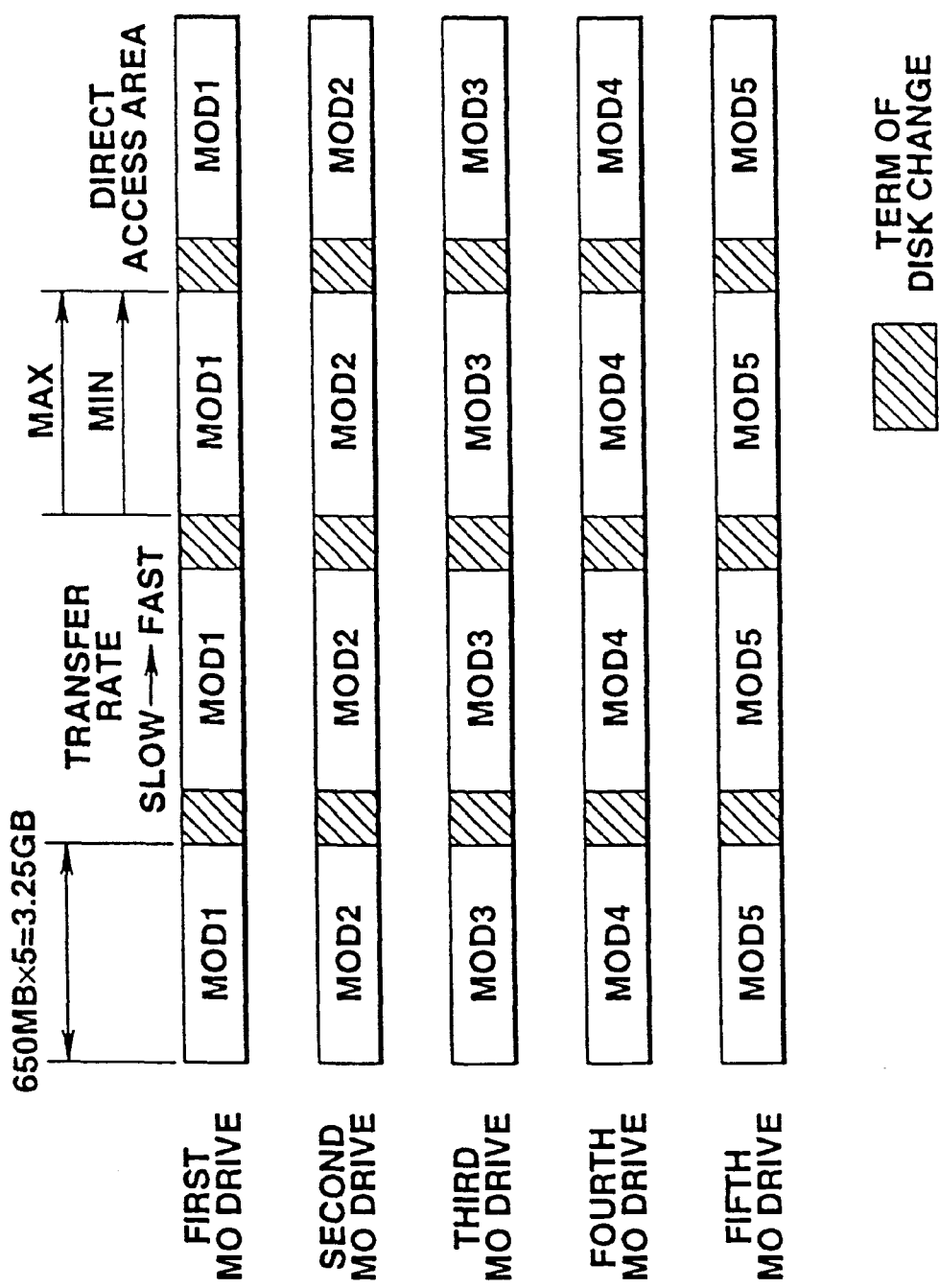
FIG. 40 is a view for explaining a first exchange system of the magneto-optic disks carried out in the respective MO disk arrays of the juke device.

First, the first exchange system is an exchange system as shown in FIG. 40. When this first exchange system is selected, the controller block 23 controls the MO drives 56 to 60 via the RAID controller 55 so that the recording of the data is started all together by the selected recording system. Due to this, the. data for the MO drives 56 to 60 (MOD1 to MOD5) will be recorded by the MO drives 56 to 60.

Also, the controller block 23 forms the drive identification data indicating the MO drive which recorded the data in the magneto-optic disk thereof and the recording order identification data indicating the order of the magneto-optic disk in which the recording is carried out by that MO drive as the disk identification data (disk ID) together with the recording of the data and stores this once in the memory provided in the controller block 23. Then, the MO drives 56 to 60 are controlled so that, when the recording of the magneto-optic disks is ended, the disk IDs for the magneto-optic disks are read out from the memory and are recorded in the GCP segment GCPseg of the magneto-optic disks shown in for example FIG. 21.

More specifically, the disk IDs are recorded in the bit 8 to bit 13 to be used as the reserve of the GCP segment GCPseg of 16 bits, the drive identification data is recorded in the bit 8 to bit 10, and the recording order identification data is recorded in the bit 10 to bit 13.

Note that, it is not always necessary to record the disk ID in the GCP segment GCPseg. Other than this, it can be recorded in any segment too so far as it is a preliminarily determined empty region of the disk.

Next, when starting the recording of the data at the MO drives 56 to 60 all together, since the magneto-optic disks recorded on by the MO drives 56 to 60 have the same storage capacities (650 MB), the recording of the data is ended at substantially the same timing. When the recording of the magneto-optic disks is ended, the controller block 23 controls the manipulator 40 so as to take out the magneto-optic disks finished being recorded on from the MO drives 56 to 60, accommodate them in the empty accommodating portion of the lower magazine 21 or the upper magazine 22 and, at the same time, take out the substitute magneto-optic disks from the magazines 21 and 22 and load them in the MO drives 56 to 60. Then, when such a disk exchange of the MO drives 56 to 60 is ended, the controller block 23 controls the MO drives 56 to 60 so as to restart the recording. The controller block 23 controls such a recording and disk exchange until the user indicates to stop the recording or until the magneto-optic disks accommodated in the magazines 21 and 22 have all been recorded on.

In this first exchange system, the recording is started at the MO drives 56 to 60 all together, and accordingly also the timings of the disk exchange of the MO drives 56 to 60 become substantially the same timing, so as indicated by the hatching in FIG. 40, a blank period during which the recording is stopped is produced during the exchange of the disks. However, since the timing of the start of the recording and the timing of the end of the recording of the MO drives 56 to 60 substantially coincide with each other, a "DIRECT ACCESS AREA" indicating the magnitude of the storage capacity of the entire MO disk array during the period for which the MO drives recording data all become able to record can be set to 3.25 GB of from the start of recording of the MO drives 56 to 60 to the end of recording (disk exchange). For this reason, the controller block 23 can assign the data to all MO drives for periods other the blank period and therefore the load of the recording management etc. of the controller block 23 (and RAID controller 55) can be reduced.

Next, in the first exchange system, there is an inconvenience that the above blank period is produced. For this reason, linear disk exchange is made possible by the second exchange system shown in FIG. 41.

Figure 41:
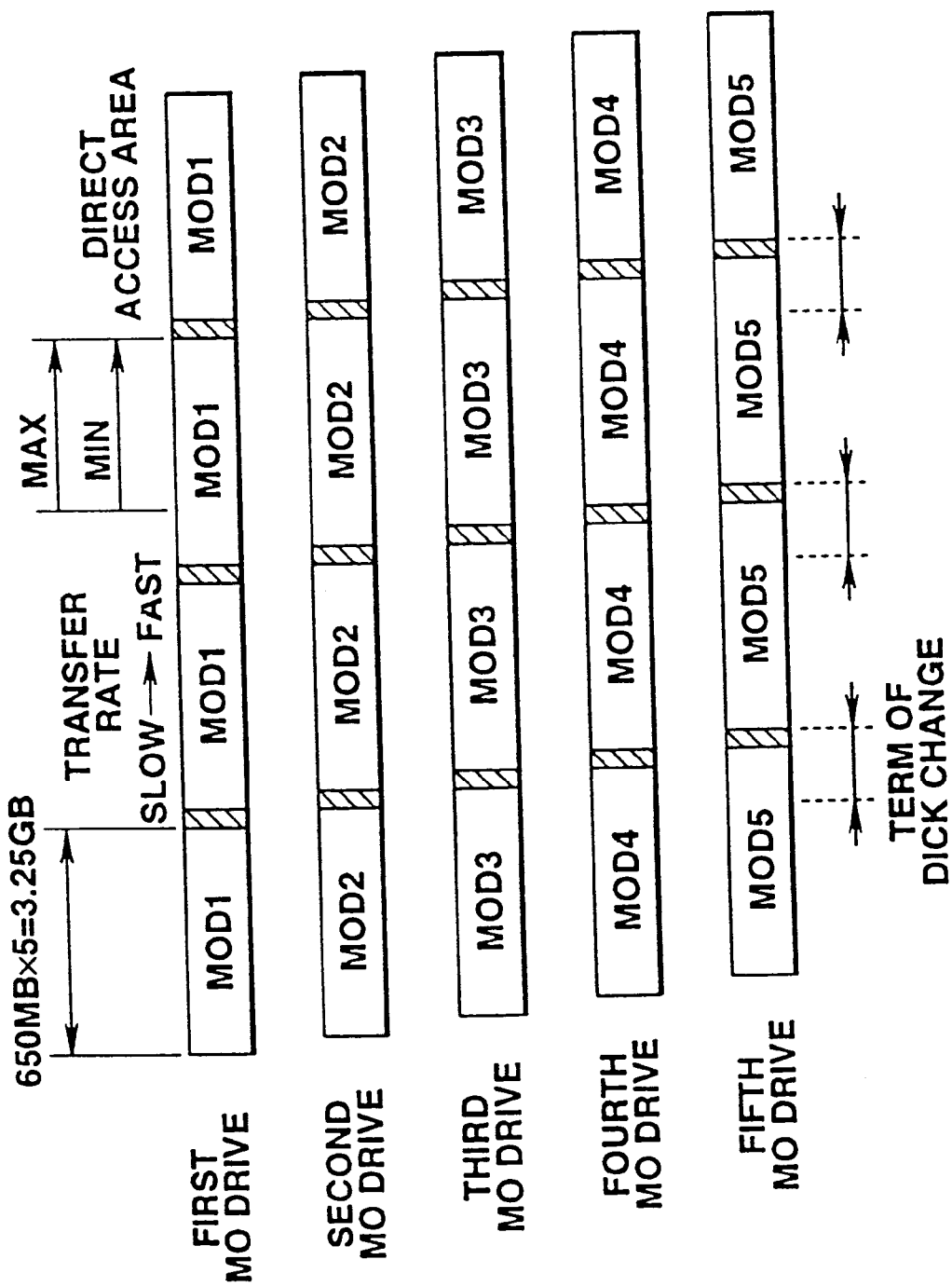
FIG. 41 is a view for explaining a second exchange system of the magneto-optic disks carried out in the respective MO disk arrays of the juke device.

When this second exchange system is selected, the controller block 23 controls the MO drives 56 to 60 so that the predetermined outer circumferential region of the magneto-optic disks is secured as the "RECOVERY DATA AREA". Then, by the selected recording system, the MO drives 56 to 60 are controlled so that the recording of the data is sequentially started at every other predetermined time as will be explained below. Due to this, as shown in FIG. 41, the MO drives 56 to 60 sequentially start the recording of the data at every other predetermined time and the data for the MO drives 56 to 60 (MOD1 to MOD5) will be recorded.

Next, when the recording of the data is ended (when the recording of the data of 650 MB is ended) up to immediately before the recovery data area with respect to the magneto-optic disk of the first MO drive 56 among the five MO drives 56 to 60 which started the recording earliest, the controller block 23 controls the second to fifth MO drives 57 to 60 so as to record the data for the first MO drive 56 which is successively supplied thereafter in the recovery data areas of the second to fifth MO drives 57 to 60 in a divided manner. Then, the manipulator 40 is controlled so as to exchange the disk of the first MO drive 56 during a period where the data for the first MO drive 56 is recorded by the second to fifth MO drives 57 to 60.

Namely, as mentioned above, the MO disk arrays 4 and 5 perform so-called zone CAV recording and reproduction. In this zone CAV recording and reproduction, the transfer rate of the outer circumferential side of the magneto-optic disk becomes a transfer rate two times the transfer rate of the inner circumferential side. For this reason, recording regions which can record the data of ⅕ of the data to be supplied at the transfer rate of the outer circumferential side during the disk exchange are provided in the magneto-optic disks of the MO drives 56 to 60 as the recovery data areas. Then, the controller block 23 controls the MO drives 56 to 60 so that the recording operation is started with a time difference of the amount of the time for which the recording of the data with the transfer rate of the outer circumferential side is ended (the predetermined time) in the entire recovery data area and, at the same time, controls the MO drives 56 to 60 so that the data to be supplied during the disk exchange of a certain MO drive is recorded in the recovery data areas by dividing the same among the remaining four MO drives.

Due to this, the data for the first MO drive 56 supplied during the disk exchange of for example the first MO drive 56 can be recorded in the recovery data areas of the magneto-optic disks loaded in the second to fifth MO drives 57 to 60 in a divided manner, and therefore it is possible to prevent the inconvenience that a blank period during which data recording becomes impossible during disk exchange is produced as in the first exchange system and linear disk exchange can be enabled without stopping the recording operation for the disk exchange.

Note that, in the recovery data areas of the magneto-optic disks, together with the data, data indicating for which MO drive that data is and data indicating which order of data among the divided data that data is are recorded as the disk ID. Due to this, the data can be reproduced in the order of recording based on the disk ID at the time of reproduction etc.

Also, the direct access area in this case becomes the period during which none of the MO drives 56 to 60 accesses the recovery data area (none of the MO drives 56 to 60 performs disk exchange) as shown in FIG. 41.

Figure 42:
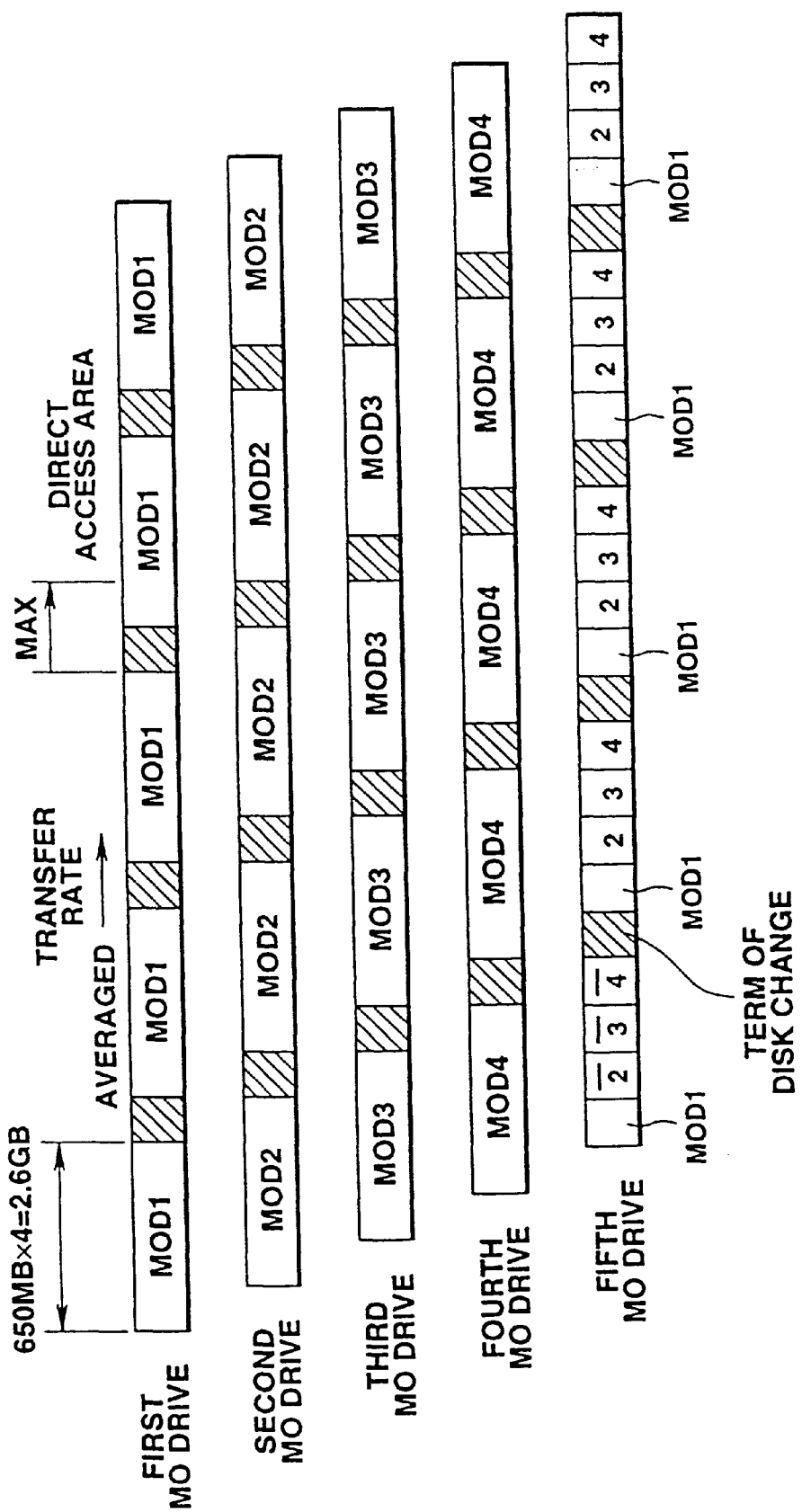
FIG. 42 is a view for explaining a third exchange system of the magneto-optic disks carried out in the respective MO disk arrays of the juke device.

Next, the third exchange system is an exchange system which enables linear disk exchange similar to the second exchange system as shown in FIG. 42.

When this third exchange system is selected, the controller block 23 controls the RAID controller 55 so that for example the fifth MO drive 60 operates as a support driver for recording the data to be supplied to the MO drives 56 to 60 during a period where the first to fourth MO drives 56 to 59 perform the disk exchange. Then, it controls the MO drives 56 to 59 so that the first to fourth MO drives 56 to 59 sequentially start the recording operation with a time difference of the amount of the time required for one disk exchange.

Due to this, as indicated by the hatching in FIG. 42, in the first to fourth MO drives 56 to 59, the necessity of disk exchange sequentially occurs with a time difference. When a necessity of the disk exchange occurs, the controller block 23 controls the manipulator 40 to perform the disk exchange as mentioned above and controls the fifth MO drive 60 so that the data for the MO drive thereof which is supplied until the disk exchange is ended is recorded. Also, the controller block 23 controls the fifth MO drive 60 so as to record the data indicating which order of data for which MO drive the data to be recorded by the fifth MO drive 60 is as the disk ID.

Due to this, the data for the MO drives supplied during a period where the first to fourth MO drives 56 to 59 are performing the disk exchange can be recorded in the fifth MO drive 60 which is the support drive, and therefore linear data recording is enabled without occurrence of a blank period at the time of the disk exchange of the MO drives 56 to 60.

Note that, in this third exchange system, the first to fourth MO drives 56 to 59 are used for recording data, and therefore the storage capacity of the MO disk arrays 4 and 5 becomes 650 MB×4=2.6 GB, but linear data recording is enabled and therefore improvement of the convenience can be achieved.

Figure 43:
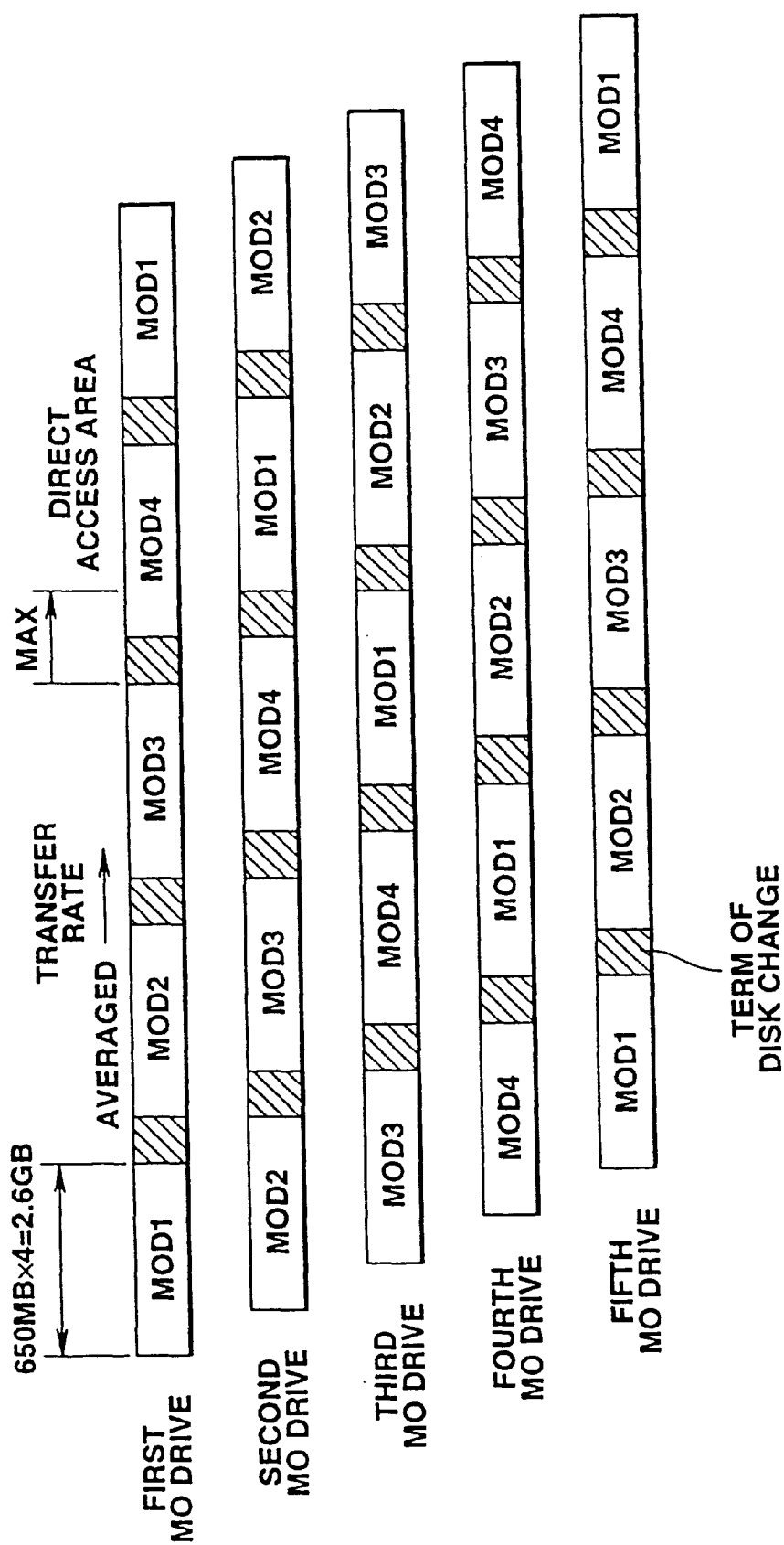
FIG. 43 is a view for explaining a fourth exchange system of the magneto-optic disks carried out in the respective MO disk arrays of the juke device.

Next, as shown in FIG. 43, the fourth exchange system is an exchange system which enables linear data recording similar to the third exchange system by spirally recording four types of data for the first to fourth MO drives 56 to 59 by five MO drives in total, i.e., the MO drives 56 to 60.

Namely, when this fourth exchange system is selected, the controller block 23 controls the first to fourth MO drives 56 to 59 so as to sequentially start the recording operation with a time difference of the amount of the time required for one disk exchange as shown in FIG. 43 and, at the same time, supplies the data for the MO drives (MOD1 to MOD4) to the MO drives 56 to 59, Due to this, the recording of the data is carried out by the MO drives 56 to 59 and, as indicated by the hatching in FIG. 43, a necessity of disk exchange occurs with a time difference in an order of the first to fourth MO drives 56 to 59.

Next, when a necessity of disk exchange occurs in the first MO drive 56, the controller block 23 controls the manipulator 40 to perform the disk exchange of the first MO drive 56 and, at the same time, controls the fifth MO drive 60 so that the data of the first MO drive (MOD1) is supplied to the fifth MO drive 60 and the recording is started.

Similarly, when a necessity of the disk exchange occurs in the second MO drive 57, the controller block 23 controls the manipulator 40 to perform the disk exchange of the second MO drive 57 and, at the same time, controls the first MO drive 56 so that the data of the second MO drive (MOD2) is supplied to the first MO drive 56 for which the disk exchange has been ended at this point of time and recorded.

Similarly, when a necessity of the disk exchange occurs in the fourth MO drive 59, the controller block 23 controls the manipulator 40 to perform the disk exchange of the fourth MO drive 59 and, at the same time, controls the third MO drive 58 so that the data of the fourth MO drive (MOD4) is supplied to the third MO drive 58 for which the disk exchange has been ended at this point of time and recorded.

Similarly, when a necessity of the disk exchange occurs in the fifth MO drive 60, the controller block 23 controls the manipulator 40 to perform the disk exchange of the fifth MO drive 60 and, at the same time, controls the fourth MO drive 59 so that the data of the first MO drive (MOD1) is supplied to the fourth MO drive 59 for which the disk exchange has been ended at this point of time and recorded.

In this way, by sequentially starting the recording of the MO drives 56 to 60 with a time difference of the amount of a disk exchange, supplying the data recorded in the MO drive for which the necessity of the disk exchange occurs to the MO drive for which the disk exchange has been already ended at a timing of the disk exchange and continuing the recording, the data for the MO drives can be spirally recorded by the five MO drives 56 to 60 and the data for the MO drives can be continuously recorded without an occurrence of blanks.

Also, since the data for the first to fourth MO drives are spirally recorded by five MO drives 56 to 60, the recording of the data can be carried out by averaging the difference in the transfer rates on the inner circumferential side and the outer circumferential side of the magneto-optic disk as a whole.

Note that, in this fourth exchange system, the data for the first to fourth MO drives are recorded by five MO drives 56 to 60, therefore the storage capacity of the MO disk arrays 4 and 5 becomes 650 MB×4=2.6 GB, but linear data recording is enabled and therefore an improvement of convenience can be achieved.

Figure 44:
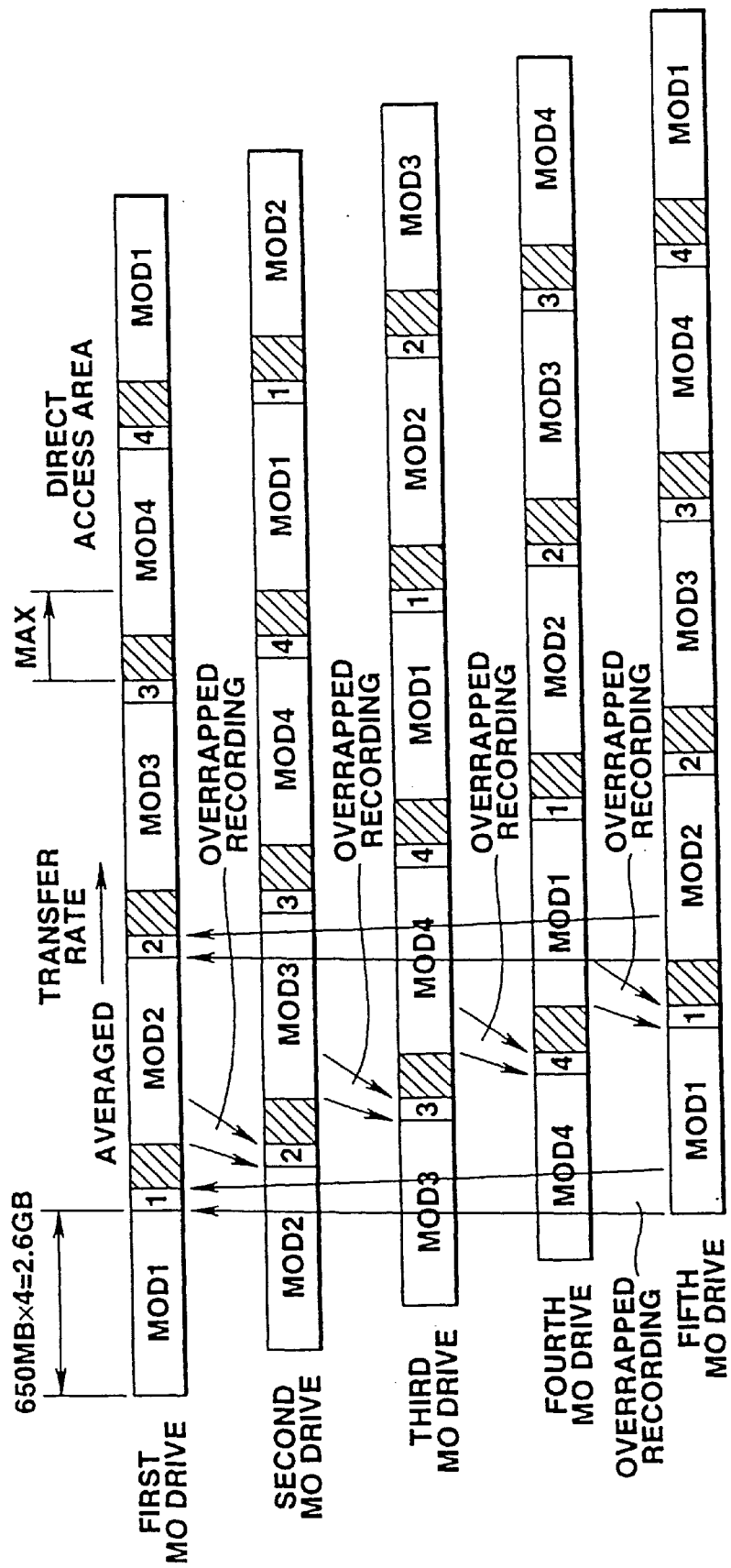
FIG. 44 is a view for explaining a fifth exchange system of the magneto-optic disks carried out in the respective MO disk arrays of the juke device.

Next, the fifth exchange system is an exchange system which achieves linear data recording similar to the fourth exchange system and the extension of the direct access area by spirally recording four types of data for the first to fourth MO drives 56 to 59 by five MO drives in total, i.e., the first to fifth MO drives 56 to 60 as shown in FIG. 44 and, at the same time, by repeatedly recording the data for the MO drives to be recorded on the inner circumferential side of the disk with the high speed transfer rate of the outer circumferential side of the other MO drives.

Namely, when this fourth exchange system is selected, the controller block 23 controls the MO drives 56 to 60 so as to provide the predetermined recovery data area on the outer circumferential side of the magneto-optic disks. Then, it controls the MO drives 56 to 60 so as to sequentially start the recording operation with a time difference of the amount of the time required for one disk exchange as shown in FIG. 44 and, at the same time, supplies the data for the MO drives (MOD1 to MOD4) to the MO drives 56 to 59. Due to this, the recording of data are carried out by the first to fourth MO drives 56 to 59.

Next, the controller block 23 supplies the data MOD1 for the first MO drive (continuous data MOD1) continuing from the data MOD1 for the first MO drive to be recorded by the first MO drive 56 to the fifth MO drive 60 and, at the same time, supplies the data of the amount of the first half predetermined time of the continuous data MOD1 supplied to the fifth MO drive 60 to the first MO drive 56. At about a time when the recording is started by the fifth MO drive 60, the recording to the recovery data area of the first MO drive 56 is started. For this reason, the continuous data MOD1 for the first MO drive is recorded at the data transfer rate of the inner circumferential side by the fifth MO drive 60, and the continuous data MOD1 of the amount of the first half predetermined time will be recorded at the data transfer rate of the outer circumferential side in the recovery data area of the magneto-optic disk by the first MO drive 56. Accordingly, the continuous data MOD1 of the amount of the first half predetermined time will be recorded in the recovery data area of the magneto-optic disk of the first MO drive 56 and the first half portion of the magneto-optic disk of the fifth MO drive 60 while being overlapped.

Next, when the MO drives 56 to 60 are controlled to start the recording with a time difference, a necessity of the disk exchange will occur in the MO drives 56 to 60 at the time difference as indicated by the hatching in FIG. 43. When a necessity of disk exchange occurs, the controller block 23 controls the manipulator 40 to exchange the magneto-optic disks of the MO drives 56 to 60 and, at the same time, supplies the continuous data MOD2 for the second MO drive (continuous data MOD2) to the first MO drive 56, supplies the continuous data MOD3 for the third MO drive (continuous data MOD3) to the second MO drive 57, supplies the continuous data MOD4 for the fourth MO drive (continuous data MOD4) to the third MO drive 58, supplies the continuous data MOD1 to the fourth MO drive 59, and supplies the continuous data MOD2 to the fifth MO drive 60. Also, together with this, the controller block 23 supplies the data of the amount of the first half predetermined time of the continuous data MOD2 supplied to the first MO drive 56 to the second MO drive 57, supplies the data of the amount of the first half predetermined time of the continuous data MOD3 supplied to the second MO drive 57 to the third MO drive 58, supplies the data of the amount of the first half predetermined time of the continuous data MOD4 supplied to the third MO drive 58 to the fourth MO drive 59, supplies the data of the amount of the first half predetermined time of the continuous data MOD1 supplied to the fourth MO drive 59 to the fifth MO drive 60, and supplies the data of the amount of the first half predetermined time of the continuous data MOD2 supplied to the fifth MO drive 60 to the first MO drive 56.

Due to this, the data of the amount of the first half predetermined time of the continuous data MOD2 supplied to the first MO drive 56 will be recorded in the recovery data area of the magneto-optic disk of the second MO drive 57 at the transfer rate of the outer circumferential side, the data of the amount of the first half predetermined time of the continuous data MOD3 supplied to the second MO drive 57 will be recorded in the recovery data area of the magneto-optic disk of the third MO drive 58 at the transfer rate of the outer circumferential side, and the data of the amount of the first half predetermined time of the continuous data MOD4 supplied to the third MO drive 58 will be recorded in the recovery data area of the magneto-optic disk of the fourth MO drive 59 at the transfer rate of the outer circumferential side. Also, the data of the amount of the first half predetermined time of the continuous data MOD1 supplied to the fourth MO drive 59 will be recorded in the recovery data area of the magneto-optic disk of the fifth MO drive 60 at the transfer rate of the outer circumferential side, and the data of the amount of the first half predetermined time of the continuous data MOD2 supplied to the fifth MO drive 60 will be recorded in the recovery data area of the magneto-optic disk of the first MO drive 56 at the transfer rate of the outer circumferential side.

Note that, in the magneto-optic disks, together with the data, data indicating which order of data for which drive that data is recorded.

In this way, the recording of the MO drives 56 to 60 is sequentially started with a time difference of the amount of a disk exchange and the data recorded by the MO drive in which the necessity of the disk exchange occurs is supplied to the MO drive for which the disk exchange has been already ended at the timing of the disk exchange to continue the recording and, at the same time, the data of the amount of the predetermined time among the continuous data supplied to the MO drive for which the disk exchange is ended is supplied to the MO drive which is performing the recording with respect to the recovery data area of the magneto-optic disk and is recorded while being overlapped, whereby the data for the MO drives can be spirally recorded by the five MO drives 56 to 60, and the data for the MO drives can be continuously recorded without an occurrence of blanks. Also, the continuous data of the amount of the first half predetermined time is recorded in the recovery data area provided on the outer circumferential side of that magneto-optic disk and other magneto-optic disks while being overlapped, and therefore the direct access area can be broadened more than the fourth exchange system.

Figure 45:
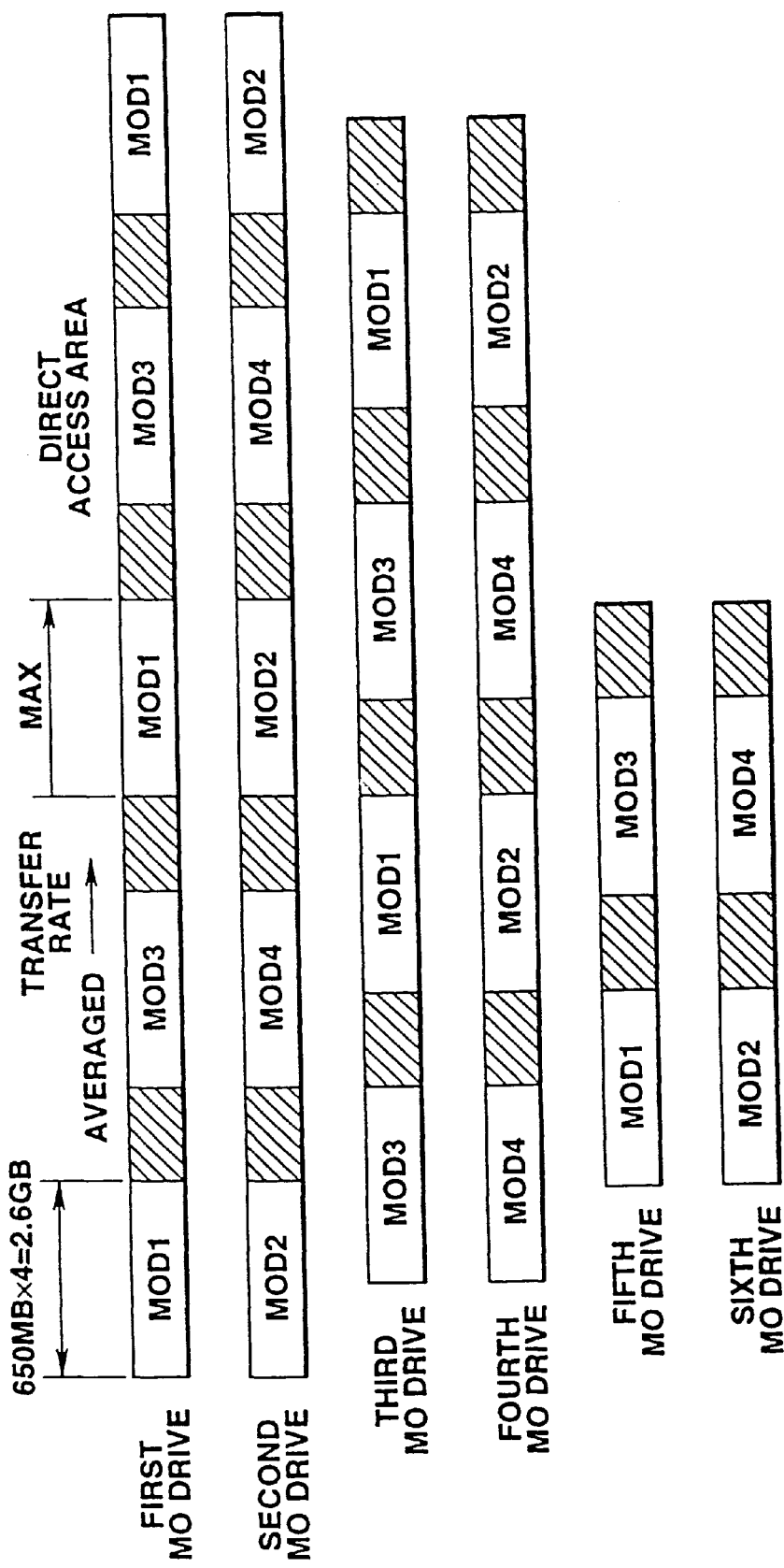
FIG. 45 is a view for explaining a sixth exchange system of the magneto-optic disks carried out in the respective MO disk arrays of the juke device.

Next, the sixth exchange system is an exchange system which enables linear data recording similar to the fourth exchange system by spirally recording four types of data for the first to fourth MO drives 56 to 59 by six MO drives in total of the first to fifth MO drives 56 to 60 of the first MO disk array 4 and the first MO drive 56 of the second MO disk array 5 as shown in FIG. 45 and, at the same time, simultaneously performing the disk exchange for two disks.

Namely, when this sixth exchange system is selected, the controller block 23 designates the MO drives 56 to 60 of the first MO disk array 4 to the first to fifth MO drives via the RAID controller 55 of the MO disk arrays 4 and 5 and, at the same time, designates the first MO drive 56 of the second MO disk array 5 to the sixth MO drive. Then, it supplies the data for the MO drives (MOD1, MOD2) to the first and second MO drives 56 and 57, controls the first and second MO drives 56 and 57 so as to simultaneously start the recording, supplies the data for the MO drives (MOD3, MOD4) to the third and fourth MO drives 58 and 59 at a timing such that for example a half of the recording of the first and second MO drives 56 and 57 is ended, and controls the third and fourth MO drives 58 and 59 so as to simultaneously start the recording.

Next, the controller block 23 supplies the continuous data for the first and second MO drives (MOD1, MOD2) to the fifth and sixth MO drives 60 and 58 at a timing where the recording of the first and second MO drives 56 and 57 is ended, controls the fifth and sixth MO drives 60 and 58 so as to simultaneously start the recording and, at the same time, controls the manipulator 40 so that the magneto-optic disks of the first and second MO drives 56 and 57 for which the recording is ended as indicated by the hatching in FIG. 45 are exchanged with new magneto-optic disks.

Next, the controller block 23 controls the manipulator 40 so as to perform the disk exchange of the third and fourth MO drives 58 and 59 since the necessity of the disk exchange occurs in the third and fourth MO drives 58 and 59 at a timing where the disk exchange o f the first and second MO drives 56 and 57 is ended and, at the same time, controls the first and second MO drives 56 and 57 so that the continuous data for the third and fourth MO drives (MOD3, MOD4) are supplied to t he first and second MO drives 56 and 57 for which the disk exchange is ended and the recording is simultaneously started.

Next, when the recording of the fifth and sixth MO drives 56 and 57 is ended, the controller block 23 controls the manipulator 40 to perform the disk exchange of the fifth and sixth MO drives 56 and 57 and, at the same time, supplies the data continued from the data for the first and second MO drives supplied to the fifth and sixth MO drives 60 and 58 to the third and fourth MO drives 58 and 59 since the disk exchange of the third and fourth MO drives 58 and 59 is ended at a timing where the recording of the fifth and sixth MO drives 56 and 57 is ended and controls the third and fourth MO drives 58 and 59 so that the recording is simultaneously started.

Next, when the recording of the data for the third and fourth MO drives at the first and second MO drives 56 and 57 is ended, the controller block 23 controls the manipulator 40 so as to control the disk exchange of the first and second MO drives 56 and 57 and, at the same time, supplies the data continued from the data for the third and fourth MO drives recorded by the first and second MO drives 56 and 57 to the fifth and sixth MO drives 60 and 58 for which the disk exchange is ended at the timing of termination of recording of the first and second MO drives 56 and 57 and controls the fifth and sixth MO drives 60 and 58 so as to simultaneously start the recording.

In this way, four types of data for the first to fourth MO drives 56 to 59 are spirally recorded by the six MO drives and, at the same time, the recording or disk exchange is simultaneously carried out for every two disks, whereby the linear data recording is enabled similar to the fourth exchange system and in addition the direct access area can be broadened.

The related juke device can perform the recording of data by selecting the desired recording system and exchange system from among the various types of recording systems and exchange systems of disks in this way. Also, the magneto-optic disk and the MO drive etc. having a fault can be exchanged while continuing the recording of the data.

Namely, during the recording of the data, where a defect occurs in a magneto-optic disk and the recording of the data becomes impossible in that magneto-optic disk, the RAID controller 55 shown in FIG. 4 detects this, stops the recording of data to that magneto-optic disk, continues the recording of the data recorded in this magneto-optic disk and the data to be recorded from now by using an empty other MO drive or the MO drive other the MO drive which has been performing the recording of the data with respect to the magneto-optic disk in which the defect occurred and, at the same time, supplies data indicating an occurrence of a defect in the magneto-optic disk to the controller block 23 shown in FIG. 1. When the data indicating the defect of the disk is supplied, the controller block 23 controls the manipulator 40 so as to exchange the magneto-optic disk in which the defect occurred (faulty disk) with a new magneto-optic disk accommodated in the lower magazine 21 or the upper magazine 22 and, at the same time, controls the display 10 so as to display a message, for example "FAULTY DISK" for notifying that a defect occurred in the magneto-optic disk to the user. Then, it controls the manipulator 40 so as to transfer the faulty disk to the mail box 41 and, at the same time, controls the rotation of the transfer motor 13 via the motor controller 33 for transfer so that the faulty disk transferred to the mail box 41 is ejected.

Due to this, the faulty disk can be automatically ejected via the mail slot 12 and the user can recognize that the ejected magneto-optic disk is a faulty disk by seeing the message displayed on the display 10.

As mentioned above, the magneto-optic disk to be loaded in the related juke device is accommodated in a cartridge 51 as shown in FIG. 3. For this reason, when a faulty disk is ejected, the user takes out the faulty disk accommodated in the cartridge 51 and exchanges this with a new magneto-optic disk. Then, the user inserts the cartridge 51 exchanged with this new magneto-optic disk into the related juke device via the mail slot 12. When the cartridge 51 is inserted, the controller block 23 controls the rotation of the transfer motor 13 so as to transfer this to the mail box 41 and, at the same time, loads the cartridge 51 transferred to the mail box 41 in the MO drive from which the faulty disk was taken out or accommodates the magneto-optic disk in place of the faulty disk in the taken out magazines 21 and 22. Due to this, the related juke device can be returned to a state before the occurrence of the faulty disk.

Next, the cartridge 51 is structured so that a shutter portion 51a is closed when it is not loaded in the MO drive as shown in FIG. 3. The shutter portion 51a is slid open when loaded in the MO drive and the irradiation of the laser beam for recording or for reproduction to the magneto-optic disk accommodated in this becomes possible. For this reason, there sometimes occurs a case where a defect occurs in the cartridge 51 per se, for example, the sliding of the shutter portion 51a becomes impossible Such a defect of the cartridge 51 per se is seen at a point of time when the cartridge 51 is loaded in the MO drives 56 to 60, and therefore the RAID controller 55 detects the loading state of the magneto-optic disk loaded in the MO drives 56 to 60 preceding the recording or reproduction of the data and, where a defect of the cartridge 51 is detected, supplies this detection data to the controller block 23.

When data indicating the defect of the cartridge 51 is supplied, the controller block 23 controls the manipulator 40 so as to exchange the cartridge 51 in which a defect occurred (faulty cartridge) with a new cartridge accommodated in the lower magazine 21 or the upper magazine 22 and, at the same time, controls the display 10 so as to display a message such as for example "FAULTY CARTRIDGE" for notifying that the defect occurred in the cartridge 51 to the user. Then, it controls the manipulator 40 so as to transfer the faulty cartridge to the mail box 41 and, at the same time, controls the rotation of the transfer motor 13 via the transfer motor controller 33 so as to eject the faulty cartridge transferred to the mail box 41.

Due to this, the faulty cartridge can be automatically ejected via the mail slot 12, and the user can recognize that the ejected cartridge is a faulty cartridge by viewing the message displayed on the display 10.

When the faulty cartridge is ejected, the user inserts a new cartridge in place of the faulty cartridge into the related juke device via the mail slot 12. When the new cartridge is inserted, the controller block 23 controls the rotation of the transfer motor 13 so as to transfer this to the mail box 41 and, at the same time, loads the cartridge transferred to the mail box 41 in the MO drive from which the faulty cartridge was taken out, or accommodates the cartridge in place of the faulty cartridge in the taken out magazines 21 and 22. Due to this, the related juke device can be returned to the state before the faulty cartridge was produced.

Next, during the recording of the data, the RAID controller 55 performs the detection of defects of the MO drives 56 to 60 per se by detecting the recording state of the MO drives 56 to 60. Then, where a fault is detected in a part or all of the MO drives 56 to 60, the RAID controller 55 supplies this detection data to the controller block 23. Where the detection data indicating the fault of a part of the MO drive constituting for example the MO disk array 4 is supplied, the controller block 23 stops the data recording by that MO drive, activates the MO drive of the second MO disk array 5 instead and, at the same time, controls the second MO disk array 5 so as to record the data recorded in the MO drive in which the fault occurred (fault drive) and the data to be recorded from now by the MO drive activated in place of the MO drive in which the fault occurred.

Also, where a fault occurs in all of the first MO disk array 4, the controller block 23 stops the data recording at the first MO disk array 4, activates the whole second MO disk array 5 instead and, at the same time, controls the second MO disk array 5 so as to record the data recorded by the MO disk array 4 in which the fault occurred and the data to be recorded from now by the second MO disk array 5 activated instead.

Due to this, even in a case where a fault occurs in part or all of the MO disk array 4, the recording of the data can be continued.

Also, the controller block 23 controls the display 10 so as to display a message indicating the MO drive in which the fault occurred for example, "FAULT OCCURRED IN FIRST MO DRIVE OF FIRST MO DISK ARRAY" for notifying that the fault occurred in the MO drive to the user.

Due to this, the user can recognize the MO drive in which the fault occurred by viewing the message displayed on the display 10.

On the other hand, when a message indicating a faulty drive is displayed on the display 10, the user turns on the functional switch 11 provided at the front panel 8 preferably at the point of time when the recording of the data is all ended. As mentioned above, the controller block 23 controls the interlock switch 17 so as to open the front door 7 as shown in FIG. 3 when the functional switch 11 is turned ON. Due to this, the front door 7 which has been locked heretofore becomes open and the removal of the MO disk arrays 4 and 5 becomes possible. Note that, when the front door 7 becomes open, the door sensor 15 detects this and supplies this detection output to the controller block 23. When the detection output is supplied, the controller block 23 controls the display 10 so as to display the message of for example "DOOR OPEN".

When the front door 7 is opened, the user takes out the faulty drive or faulty disk array indicated by the message and exchanges this with a new MO drive or MO disk array. Then, the user accommodates this exchanged new MO disk array in the juke device again and closes the front door 7. Due to this, the related juke device can be returned to the state before the faulty drive or the faulty disk array is produced.

Next, the related juke device can continue the recording while automatically exchanging the already recorded magneto-optic disks loaded in the MO drives 56 to 60.

Namely, as mentioned above, in the magazines 21 and 22, 10 magneto-optic disks each can be accommodated, and five magneto-optic disks among them are each loaded in the first MO disk array 4 and the second MO disk array 5 and the recording of the data is carried out, but the RAID controllers 55 provided in the MO disk arrays 4 and 5 constantly detect the recording state of the MO drives 56 to 60. Then, when the recording of the magneto-optic disks for which the recording is carried out by the MO drives 56 to 60 is ended (when the data is recorded in all of the recording regions of the magneto-optic disks), the RAID controller 55 supplies this detection data to the controller block 23.

When the detection data is supplied, the controller block 23 controls the manipulator 40 so as to take out the magneto-optic disks for which the recording is ended from the MO drives 56 to 60, accommodate the taken out magneto-optic disks in the empty accommodating portions of either of the magazine 21 or 22 and, at the same time, take out new magneto-optic disks from either of the magazine 21 or 22 instead, and load them in the MO drives from which the already recorded magneto-optic disk were taken out.

Due to this, the already recorded magneto-optic disks are automatically exchanged with new magneto-optic disks and the recording of the data can be continued.

Also, by accommodating the already recorded magneto-optic disks in the empty accommodating portions of the magazines 21 and 22, a magazine in which one block of data is recorded can be formed and data management for every magazine is enabled. As mentioned above, the storage capacity of the MO disk arrays 4 and 5 is 650 megabytes× 4=2.6 gigabytes or 650 megabytes×5=3.25 gigabytes. For this reason, by completing the recording of the data for every magazine, a data package of 2.6 gigabytes to 3.25 gigabytes with a high frequency of utilization can be formed and a desired product can be provided.

Note that, in this case, it is also possible to eject the already recorded magneto-optic disks taken out from the MO drive to the outside of the related juke device via the mail slot 12 by the controller block 23.

Here, when the already recorded magneto-optic disks are automatically exchanged with new magneto-optic disks and the recording of the data is continued in this way, where all of the magneto-optic disks accommodated in the magazines 21 and 22 become recorded, there arises an inconvenience that the recording of the data cannot be continued thereafter. For this reason, the controller block 23 detects the number of the magneto-optic disks accommodated in the magazines 21 and 22 for which the recording is possible and controls the display 10 so as to display this and, at the same time, controls the display 10 so as to perform the count down display of the number of the magneto-optic disks displayed on the display 10 for which the recording is possible whenever the number of the recordable magneto-optic disks is decreased (whenever it is used). Then, it controls the display 10 so as to display a message such as for example "WHERE RECORDING IS CONTINUED, PLEASE SET NEW DISK" when the number of the recordable magneto-optic disks becomes less than a predetermined number (for example less than five).

In such a state, where the number of the recordable magneto-optic disks becomes zero and a new magneto-optic disk has not yet been loaded, the controller block 23 stops the recording of the data. Due to this, an inconvenience that the data is further recorded on an already recorded magneto-optic disk and the previously recorded data is erased can be prevented. Note that, in this case, the number of the recordable magneto-optic disks is displayed as "0" on the display 10, and therefore the user can recognize that the number of the recordable magneto-optic disks has become zero in the juke device by seeing this.

On the other hand, where the user wants to continue the recording of the data, the user operates the keypad 9 provided at the front panel 8 when the above message is displayed on the display 10 and selects the continuation of recording of the data. When the continuation of recording of the data is selected, the controller block 23 controls the manipulator 40 so as to take out the already recorded magneto-optic disks accommodated in the magazines one by one and eject them via the mail slot 12. The user inserts a substitute new magneto-optic disk via the mail slot 12 whenever an already recorded magneto-optic disk is ejected. When the new magneto-optic disk is inserted, the controller block 23 controls the manipulator 40 so as to accommodate this in the empty accommodating portion of the magazines 21 and 22 and, at the same time, increments the number of the recordable magneto-optic disks displayed on the display 10. Then, the controller block 23 controls the display 10 so as to display the message of for example "FULL" when the number of the magneto-optic disks accommodated in the related juke device becomes the upper limit accommodation number by performing such an automatic replacement control of the magneto-optic disks.

Due to this, even in a case where the magneto-optic disks in the related juke device become all already recorded, the recording of the data can be continued while automatically exchanging them with the new magneto-optic disks supplied from the outside. For this reason, the storage capacity of the related juke device can be made an infinitely large capacity. Accordingly, even with data of for example an ultrahigh speed transfer rate, the recording of the data can be carried out without interruption corresponding to this, and even with data of a large amount for example high definition image data, the recording of the data can be carried out without interruption corresponding to this.

Also, today, the cost of a recording apparatus of a large storage capacity becomes high, for example, the cost of a recording apparatus having a storage capacity of 4 gigabytes becomes two or more times the cost of a recording apparatus having a storage capacity of 2 gigabytes, but the related juke device can continue the recording of the data just by exchanging the already recorded magneto-optic disks with new magneto-optic disks and therefore a juke device having a large storage capacity of for example 1 Tbyte (terabytes) can be easily realized at a low cost.

Next, the related juke device is able to perform the editing of the data recorded in the magneto-optic disks by the MO disk arrays 4 and 5.

Namely, in the magneto-optic disks, as mentioned above, data indicating the MO drive in which the data was recorded, recording order identification data indicating the order of the magneto-optic disks recorded by that MO drive, etc. are recorded as the disk ID together with the data. For this reason, where for example the user intends to edit only the data recorded by the first MO drive 56, the user operates the keypad 9 and selects the editing of the data recorded by the first MO drive 56.

When the editing of the data recorded by the first MO drive 56 is selected, the controller block 23 controls the reproduction operations of the MO drives 56 to 60 so as to read out the disk ID from the magneto-optic disks loaded on the MO drives 56 to 60 constituting the first MO disk array 4. Also, it controls the reproduction operation of the MO drives 56 to 60 so that the disk ID reproduced from the magneto-optic disks is once stored in the memory provided in the related controller block 23 and only the data recorded by the first MO drive 56 is reproduced by time series (so that it is reproduced in an order of recording) based on the disk ID recorded in this disk. Then, it sequentially supplies the data reproduced with the time series to the MO drives 56 to 60 of the second MO disk array 5 and controls the recording for the MO drives 56 to 60.

Due to this, using the MO drives 56 to 60 of the second MO disk array 5, it is possible to edit and record only the data for the first MO drive 56 recorded by the first MO drives 56 to 60 and a package media comprising only the edited data for the first MO drive 56 can be easily formed.

Here, in the related juke device, editing adding special effects by the editing use ROM disk becomes possible where the editing of such data is carried out.

Namely, where the data for which the editing is carried out is image data, as the ROM disk use is made of a disk which records images for editing such as video clips, background images, visual effect images, etc. selected by the manufacturer. The user loads this ROM disk in the first MO disk array 4 or the second MO disk array 5. Then, where the ROM disk is loaded on the first MO disk array 4, the user operates the keypad 9, designates the MO drive of the first MO disk array 4 in which the ROM disk was loaded and, at the same time, designates the editing operation.

When the editing operation is designated, the controller block 23 controls the reproduction operation of the designated MO disk array so as to read out the GCP information which is recorded in the GCP segments GCPseg of the disks. As explained by using FIG. 21, as the GCP information of pace number 0 among the GCP information, information indicating the media information/media type is recorded and information indicating the format of the media such as MO, ROM, etc. is provided by the bit 7 to bit 4. For this reason, when the editing operation is designated, the controller block 23 recognizes the type of the disks loaded on the MO drives 56 to 60 based on the GCP information of the disks.

Where the data for which the editing is carried out is image data, this image during editing is supplied to the monitor device via the RS232C connector terminal 35, the first SCSI connector terminal 37 or the second SCSI connector terminal 38 shown in FIG. 1 and displayed. For this reason, the user designates the reproduction of the MO drive in which the ROM disk was loaded in a desired scene while viewing the edited image of the monitor device. When the reproduction by the MO drive in which the ROM disk is loaded is designated, the controller block 23 controls the reproduction operation for the MO drive and supplies this reproduction image to the monitor device. The user searches for the desired image from among the reproduction images from the ROM disk displayed on the monitor device and designates this. When the desired image is designated from among the reproduction images reproduced from the ROM disk, the controller block 23 controls the second MO disk array 5 so as to record this.

More specifically, where a video clip is selected from among the reproduction images from the ROM disk, the controller block 23 controls the recording operation of the second MO disk array 5 so that the video clip is inserted between one image and another image during the editing and edited. The video clip is for example an animation of a predetermined character and by inserting this between the image and another image during the editing and recording the same, the division between the image and the other image can be clarified.

Also, where a background image is selected from among the reproduction images from the ROM disk, the controller block 23 controls the recording operation of the second MO disk array 5 so as to superimpose the background image on the image during the editing and record this. Due to this, animation using the selected image as the background can be recorded.

Also, where a visual effect image is selected from among the reproduction images from the ROM disk, the controller block 23 controls the recording operation of the second MO disk array 5 so as to superimpose the visual effect image on the image during the editing and record this. Due to this, the animation modified by the selected visual effect image can be recorded.

Note that, the juke device can perform not only the editing for a background image or visual effect image but also editing adding both at such an editing. In this case, the user loads the ROM disk on which the background image was recorded in for example the first MO drive 56 of the first MO disk array 4, loads the magneto-optic disk of the animation recorded by the user on the second MO drive 57, loads the ROM disk on which the visual effect image was recorded in the third MO drive 58, and loads the ROM disk on which the video clip was recorded in the fourth MO drive 59. Then, it is sufficient to designate the insertion of the video clip, superimposing of the background image, insertion of the visual effect image and superimposing, etc. while viewing the monitor device.

Due to this, it is made possible for a shop to prepare ROM disks on which for example background images, video clips, and visual effect images are recorded and superimpose and insert the background images etc. with respect to animation brought in by a user. Accordingly, it enables the provision of a new type of business such as a so-called photo shop of animation.

Next, where the editing of the data is carried out, the related juke device reads the control data for editing (editing control data) from the ROM disk for editing and can perform the editing control based on this editing control data.

In this case, the ROM disk on which the editing control data is recorded is loaded in any MO drive of for example the first MO disk array 4 and, at the same time, the already recorded magneto-optic disk is loaded in the MO drive other than the MO drive in which the ROM disk is loaded.

When the editing operation is designated, the controller block 23 controls the reproduction operation of the first MO disk array 4 so as to read the GCP information to be recorded in the GCP segment GCPseg of the disks. As explained by using FIG. 21, as the GCP information of the page number 0 among the GCP information, information indicating the media information/media type is recorded, and the information indicating the format of the media such as the magneto-optic disk, ROM disk, etc. is provided by the bit 7 to the bit 4. For this reason, when the editing operation is designated, the controller block 23 determines whether or not that disk is a ROM disk based on the GCP information of the disks and, at the same time, controls the reproduction operation of the MO drive on which the ROM disk is loaded and once stores the editing control data in the memory. Then, it controls the reproduction operation of the first MO disk array 4 so as to bring the MO drive other than the MO drive in which the ROM disk is loaded into the reproduction state based on this editing control data and, at the same time, controls the recording operation of the second MO disk array 5. Due to this, based on the editing control data recorded on the ROM disk, the editing of the image recorded by the user etc. can be carried out.

Next, the related juke device can perform the reproduction of data by using a ROM disk on which the parity code of predetermined data is recorded. In this case, the user performs the recording of the data corresponding to the parity code recorded in the ROM disk at the time of the recording. Then, when assuming that the data is recorded by the first MO disk array 4, it loads the ROM disk in the second MO disk array 5 and brings the MO disk arrays 4 and 5 into the reproduction state. The controller block 23 applies error correction processing based on the parity code reproduced from the second MO disk array 5 with respect to the data reproduced from the first MO disk array 4. Then, it outputs this reproduction data via the RS232C connector terminal 35, the first SCSI connector terminal 37, or the second SCSI connector terminal 38.

The parity code of the data to be recorded by the first MO disk array 4 is preliminarily recorded on the ROM disk, and therefore it is not necessary to record the parity code of the data to be recorded in the first MO disk array 4 together with the data and it is possible to increase the amount of the data to be recorded by the first MO disk array 4 and effectively utilize the recording region of the magneto-optic disk.

Next, the related juke device can prevent illegal reproduction by performing the reproduction while performing the decipherment of the data based on a decipherment code reproduced from the ROM disk at the time of reproduction by using the ROM disk on which a decipherment code of predetermined data is recorded.

Namely, by recording a mass of data by the MO disk array as mentioned above, the provision of an MO disk array in which data such as for example animation is packaged becomes possible. For this reason, so as to prevent the illegal reproduction of the data, scrambling or coding etc. are applied to the data when recording the data. Then, a ROM disk on which the descrambling code for performing the descrambling for the scrambled data or the decipherment code for performing the deciphering for the coded data is recorded is separatively formed, and the ROM disk is provided together with the packaged MO disk array.

When the packaged MO disk array is loaded, the controller block 23 controls the reproduction operation of the MO disk array based on the descrambling code or the decipherment code etc. recorded on the ROM disk. Where the ROM disk is not loaded, the descrambling code or the decipherment code cannot be obtained, and therefore the reproduction control cannot be carried out for the MO disk array. For this reason, illegal reproduction by a user not having the ROM disk can be prevented.

Next, the recording and reproduction control was based on the control program of the controller block 23, but it is also possible if a control program for performing special recording and reproduction control is recorded on the ROM disk, the controller block 23 reads and fetches this control program from the ROM disk and performs the recording and reproduction control based on this control program.

In this case, the user loads the ROM disk on which the control program is recorded on the first MO disk array 4 or the second MO disk array 5 and designates the reproduction of this. When the reproduction of the ROM disk is designated, the controller block 23 performs the fetching of the control program recorded on the ROM disk. Then, after this, it performs the recording and reproduction control based on this fetched control program.

Due to this, the user can utilize the ROM disk as application software. Also, by recording a new version of the control program on the ROM disk and reproducing this by the controller block 23, it is easy to update the version for the controller block 23.

Figure 46:
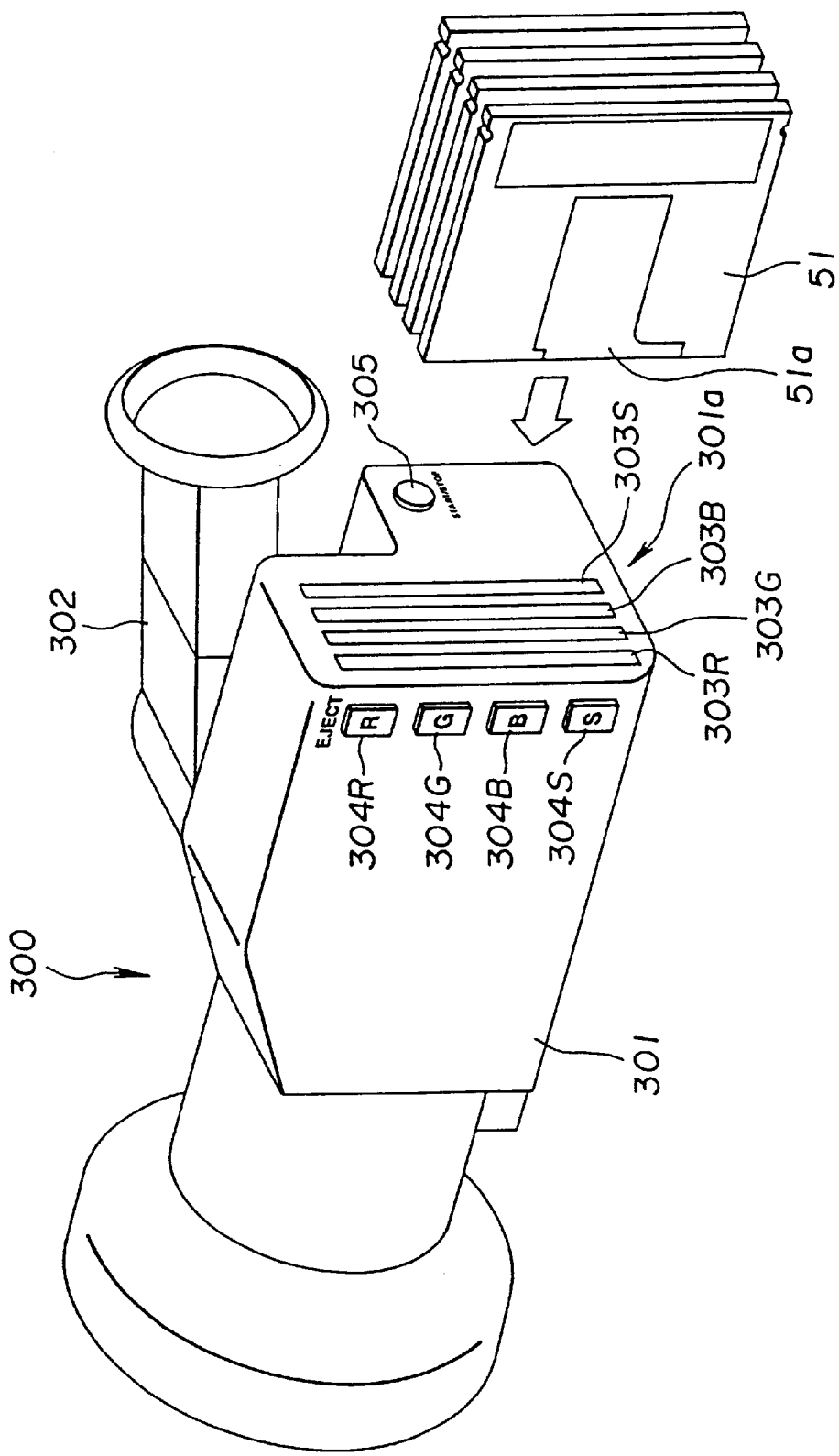
FIG. 46 is a view for explaining an outer appearance of a digital camera apparatus to which the recording apparatus according to the present invention is applied.
Figure 47:
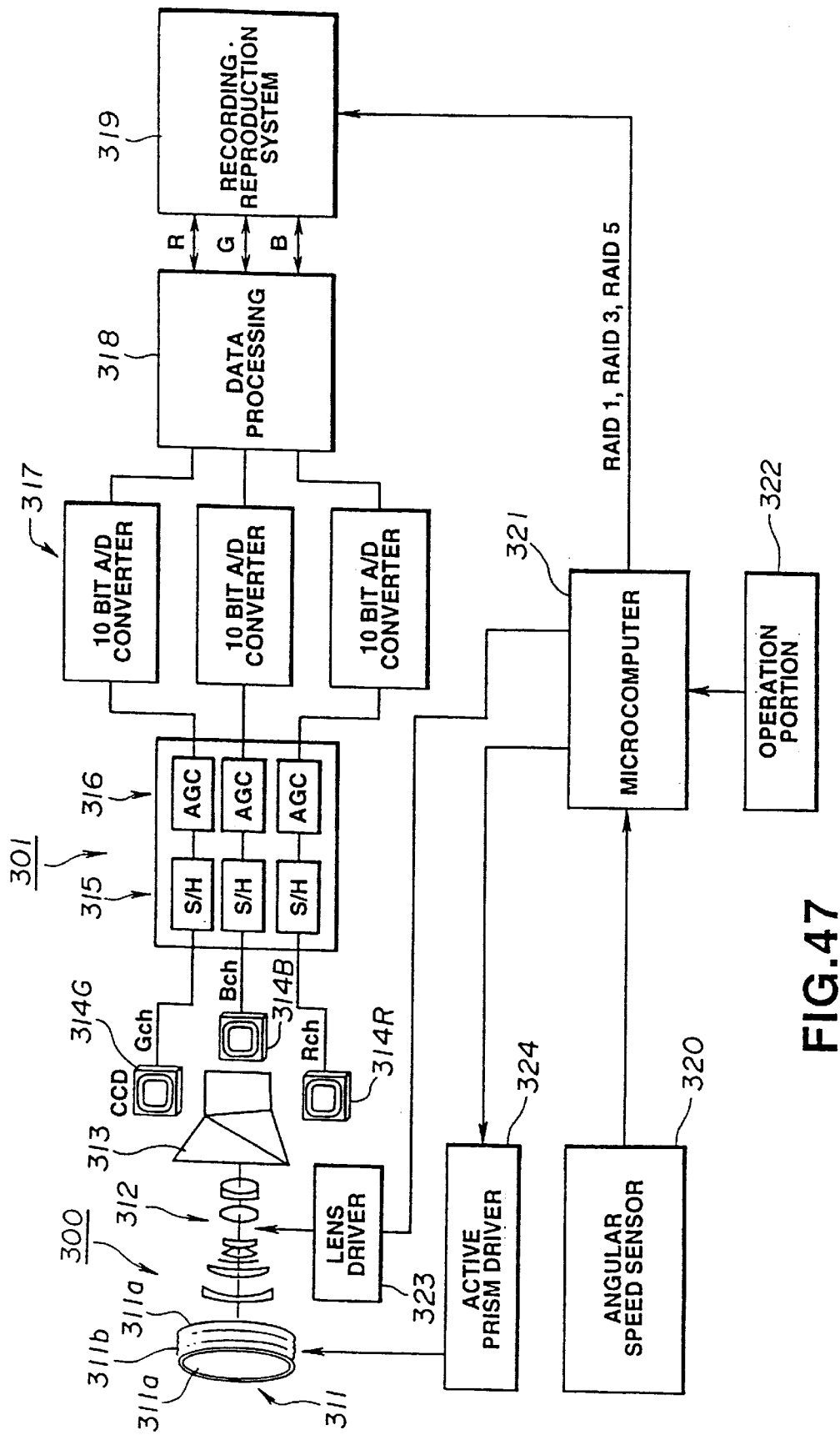
FIG. 47 is a block diagram of the camera apparatus.

Next, the recording apparatus according to the present invention can be applied to a digital camera apparatus as shown in FIG. 46 and FIG. 47. This digital camera apparatus is a so-called three-plate type digital camera apparatus taking pictures of subjects by CCD image sensors of the colors R, G, and B. It digitalizes the color picture signals and records them by the RAID1, RAID3, or RAID5 recording system.

Namely, in FIG. 46 and FIG. 47, the digital camera apparatus is constituted by a lens portion 300 which fetches the picture light into the related digital camera apparatus, a camera body 301 which performs the recording and reproduction by forming the picture data in accordance with the picture light fetched via the lens portion 300, and a color view finder 302 which displays the subject during the photographing.

The lens portion 300 is provided with an active prism 311 which variably controls the light path of the picture light in accordance with the wobbling, a zoom lens 312 having a zoom function of a magnification of for example 20, and a color breakdown prism 313 which breaks down the picture light via the zoom lens 312 to a picture light for a red color (R), a picture light for a green color (G) and a picture light for a blue color (B). Then, it fetches the picture light of the subject with a magnification rate in accordance with the operation of the user.

The color view finder 302 has substantially a tubular shape which can be extended to a predetermined length. It is extended up to the predetermined length when taking a picture and retracted and placed on side of the camera body 301 when not taking a picture. Also, inside the color view finder 302, a small size color liquid crystal monitor is provided. When taking a picture, the picture signal subjected to the signal processing at the camera body 301 is supplied to this color liquid crystal monitor. Due to this, the user can take a picture while viewing the subject during the photographing displayed on the color liquid crystal monitor.

The camera body 301 is provided with CDD image sensors 314R, 314G, and 314B for the colors which receive the picture lights for the colors R, G and B broken down by the color breakdown prism of the lens portion 301 and form the picture signals; a correlation double sample hold circuit 315 which applies noise eliminating processing by so-called correlation double sampling processing to the color picture signals; and an autogain controller 316 performing the gain adjustment of the color picture signals. Also, the camera body 301 is provided with an A/D converter 317 which digitalizes the color picture signals from the autogain controller 316 and forms for example 10 bits of color picture data; a data processing circuit 318 which applies the predetermined processing to the color picture data; and a recording and reproduction system 328 which records the picture data from the data processing circuit 318 on the magneto-optic disk 51 and reproduces the same. Also, in the camera body 301, provision is made of an operation portion 322 provided with a start/stop key 305 for designation of the recording start and recording stop, eject keys 304R, 304G, 304B, and 304S for designating the ejection of the magneto-optic disk loaded in the camera body, a zoom key for designating the magnification/reduction of the subject to be photographed, etc.; an angular velocity sensor 320 detecting wobbling while dividing this to a vertical wobbling and a lateral wobbling; and a microcomputer (micon) 321 performing the control of the entire digital camera apparatus.

The recording and reproduction system 319 provided in the camera body 301 is similar to the MO disk arrays 4 and 5 and is constituted by four MO drives in total, i.e., a first MO drive performing the recording and reproduction of the picture data for R, a second MO drive performing the recording and reproduction of the picture data for G, a third MO drive performing the recording and reproduction of the picture data for B, and an MO drive for shockproofing. The recording system is controlled to the RAID1, RAID3 or RAID5 by the microcomputer 321 acting also as the RAID controller. As shown in FIG. 46, the disk insertion ports 303R, 303G, 303B, and 303S of the four MO drives are provided in the rear portion 301a. of the camera body 301. The user inserts four magneto-optic disks 51 into the camera body 301 via these disk insertion ports 303R, 303G, 303B, and 303S. Then, when the magneto-optic disks 51 are inserted via the disk insertion ports 303R, 303G, 303B, and 303S, the shutter portion 51a which is in the closed state when not used is slid open, emission of a laser beam for recording or reproduction to the magneto-optic disks accommodated inside becomes possible, and the recording and reproduction are carried out.

Also, the thickness of the MO drives constituting the MO disk array is set to ½ inch. For this reason, the MO disk array constituted by four MO drives becomes a thickness of 2 inches.

Next, an explanation of the operation of the digital camera apparatus having such a structure will be made. First, when photographing a subject, the user extends the color view finder 302, turns on the main power source and, at the same time, operates the recording system selection key provided in the operation portion 322 and selects a desired recording system from among the RAID1, RAID3, and RAID5 recording systems. Then, the user turns on the start/stop key 305 one time. When the start/stop key 305 is turned on one time, the microcomputer 321 controls the CCD image sensors 314R, 314G, and 314B for the colors to the driving state. Due to this, the digital camera apparatus enters a picture stand-by state awaiting the start of photographing.

More specifically, the picture light of the subject is made incident upon the color breakdown prism 313 via the active prism 311 and the zoom lens 312. The color breakdown prism 313 breaks down the incident picture light to the picture light for R, picture light for G and the picture light for B and emits them to the color CCD image sensors 314R, 314G and 314B.

Here, the angle speed sensor 320 detects the wobbling during the photographing and supplies this wobbling detection signal to the microcomputer 321. When the wobbling detection signal is supplied, the microcomputer 321 controls the active prism 311 via the active prism driver 324 so as to cancel the wobbling. The active prism 311 is formed by placing two photographing lenses 311 facing each other, connecting the outer circumferential portions of the two photographing lenses 311a by an accordian connection member 311b, and injecting a liquid having a predetermined optical characteristic into this. When driven in accordance with the wobbling detection signal, this active prism 311 changes the light path of the incident picture light and emits the same. For this reason, it can emit color picture lights to the color CCD image sensors 314R, 314G and 314B in a state where the wobbling is canceled and can enable photographing of a subject without influence by the wobbling.

Next, the color CCD image sensors 314R, 314G and 314B receive the color picture lights and form the color picture signals in accordance with the color picture lights. Then, they supply these color picture signals to the correlation double sample hold circuit 315. The correlation double sample hold circuit 315 applies so-called correlation double sampling processing to the color picture signals to eliminate the noise components and extract only pure signal components and supply them to the A/D converter 317 via the autogain controller 316. The A/D converter 317 forms the color picture data by digitalizing the color picture signals supplied as analog signals and supplies them to the data processing circuit 318. The data processing circuit 318 applies processing such as a black balance processing, white balance processing, gamma correction processing, shading correction processing, etc. with respect to the color picture data and supplies them to the color liquid crystal monitor of the color view finder 302. Due to this, an image in accordance with the subject now being photographed is displayed in color on the color view finder 302 and the picture stand-by state is exhibited.

Here, where the user intends to take the picture by magnifying or reducing the subject, the user operates the zoom key provided in the operation portion 322. The microcomputer 321 controls the zoom lens 312 via the lens driver 323 when the zoom key is operated. Due to this, the subject image according to the picture lights emitted to the color CCD image sensors 314R, 314G and 314B can be magnified or reduced, and the subject displayed on the color view finder 302 and the subject recorded can be magnified or reduced.

Next, the user determines the subject while viewing the image displayed on the color view finder 302 and operates the start/stop key 305. When the start/stop key 305 is operated in the picture stand-by state, the microcomputer 321 supplies the color picture data subjected to the processing by the data processing circuit 318 to the recording and reproduction system 319. As mentioned above, the recording and reproduction system 319 is constituted by four MO drives of the first to third MO drives which are color MO drives and the fourth MO drive which is the MO drive for shockproofing. The microcomputer 321 controls the recording operation for the first to third MO drives so that the color picture data are recorded in accordance with the RAID recording system selected by the user. Also, the microcomputer 321 applies the delay processing of an amount of a predetermined time with respect to the color picture data and controls the recording operation for the fourth MO drive so that this is sequentially recorded in the order of supplying of the selected RAID recording system. Due to this, in the first to third MO drives, the color picture data of the photographed subject can be recorded.

Here, if a shock from the outside is applied during the recording, detracking etc. occurs in the first to fourth MO drives and the recording of the color picture data becomes impossible. When the detracking etc. occurs and the recording of the color picture data becomes impossible, the microcomputer 321 forms data (detrack data) for specifying the picture data which was not correctly recorded due to the detracking etc. such as the address during the time for which for example the detracking occurs and stores this in the memory provided in the microcomputer 321. Then, it controls the recording operation for the first to third MO drives so that the MO drives are restored from the detracking, the detrack data is read out from the memory after the recording is once ended, and this is recorded in an excess region such as for example a user TOC. Due to this, the detrack data will be recorded on the magneto-optic disks on which the color picture data are recorded.

On the other hand, the digital camera apparatus records the color picture data subjected to the delay processing of an amount of a predetermined time by the fourth MO drive. For this reason, even if the detracking occurs, after the MO drives are restored from the detracking, the color picture data which could not be recorded by the first to third MO drives can be recorded by the fourth MO drive. Note that, due to this, as the predetermined delay time to be applied to the color picture data, preferably a time required for restoring the MO drives from the detracking which temporarily occurred is used.

Next, when reproducing the color picture data recorded in this way, the user operates the reproduction key provided in the operation portion 322. The microcomputer 321 detects this when the reproduction key is operated and controls the reproduction operation of the MO drives so as to perform the reproduction in accordance with the RAID recording system by which those picture data were recorded. These reproduced color picture data are supplied to the data processing circuit 318. The digital camera apparatus is provided with a component data output terminal which is the digital output terminal; a composite data output terminal; a component signal output terminal which is the analog output terminal; and a composite signal output terminal. The data processing circuit 318 supplies the component data, that is, the color picture data of R, G and B reproduced from the magneto-optic disks, to the component data output terminal and, at the same time, converts the component data to analog data, forms the component signals and supplies them to the component signal output terminal. Also, the data processing circuit 318 forms the composite data based on the color picture data reproduced from the magneto-optic disks and supplies this to the composite data output terminal and, at the same time, converts the composite data to analog data, forms the composite signals, and supplies them to the composite signal output terminal.

The data or signals supplied to the output terminals are supplied to for example an externally connected monitor device. Due to this, the subject photographed by the related digital camera apparatus can be displayed on the monitor device.

On the other hand, as mentioned above, the detrack data is recorded in the user TOC of the magneto-optic disks for R, G, and B. The microcomputer 321 reads the detrack data preceding such a reproduction control and stores this in the memory. Then, it controls the data processing circuit 318 so as to output the picture data reproduced by the fourth MO drive in which the detracking occurred based on the detrack data stored in the memory. Due to this, the color picture data which could not be correctly recorded by the first to third MO drives due to shock etc. can be made up for by the color picture data recorded by the fourth MO drive and a series of picture data can be formed and output.

Also, if a video tape is used as the recording medium of the video camera apparatus, although the video camera apparatus per se has an increased scale due to the recording and reproduction system such as the accommodating portion of the video tape, recording and reproduction head, pinch roller, etc., since the related digital camera apparatus uses an MO disk array having a thickness of 2 inches as the recording medium, a reduction of size of the related digital camera apparatus per se can be achieved.

Also, the picture data recorded by the related digital camera apparatus can be reproduced also by a juke device. In this case, the user loads the four magneto-optic disks formed by the digital camera apparatus in the juke device via the mail slot 12 and designates the reproduction. Due to this, the controller block 23 controls the reproduction operation corresponding to the RAID recording system by which that picture data was recorded similar to the reproduction control of the digital camera apparatus. Then, the color picture data are supplemented based on the detrack data and the result is output via the RS232C connector terminal 35, the first SCSI connector terminal 37, or the second SCSI connector terminal 38. Due to this, the subject photographed by the digital camera apparatus can be displayed on a monitor device externally connected to the juke device.

Also, when editing the picture data recorded on the four magneto-optic disks, the user performs the key operation of the keypad 9 and designates that the picture data reproduced by the first MO disk array 4 is recorded by the second MO disk array 5. Due to this, the controller block 23 controls the MO disk arrays 4 and 5 so that the recording of the picture data reproduced by the first MO disk array 4 is performed again by the second MO disk array 5 and performs the editing of the picture data. In this editing, since a series of picture data can be formed and reproduced by the above supplementation, the picture data can be recorded on the R, G and B magneto-optic disks according to the editing in a format with the picture data which were not recorded on the R, G and B magneto-optic disks due to the detracking etc. inserted. Accordingly, the perfect color magneto-optic disks can be formed.

Note that, in the explanation of the best mode for carrying out the above invention, a magneto-optic disk was used as the disk-like recording medium in the recording apparatus according to the present invention, but any disk-like recording medium can be used so far as it can perform at least one recording such as, for example, a hard disk, a phase change optical disk, an organic dye disk, a two-surface laminated optical disk, an optical disk of a multiple layer type having a plurality of recording layers on one surface, a write-once phase-varying type optical disk, a floppy disk, etc. Where such a disk is used in place of the magneto-optic disk, well known exclusive drives are provided in place of the MO drives 56 to 60, and the RAID control is carried out by the controller block 23, whereby a similar effect to the above can be obtained.

Moreover, it is also possible to provide the MO drive in the mail box 41 and perform easy writing or reading of data with respect to the magneto-optic disk inserted via the mail slot 12. Due to this, the reading of the GCP information or the writing of the disk ID etc. can be carried out with respect to the magneto-optic disks inserted via the mail slot 12 before they are transferred to the magazines 21 and 22 etc., and the recording and reproduction operation after the transfer can be simplified.

Moreover, a structure providing the MO drive in the manipulator 40 can be adopted. Due to this, the reading of the GCP information or the writing of the disk ID, etc. can be carried out with respect to the magneto-optic disks inserted via the mail slot 12 before they are transferred to the magazines 21 and 22 etc. and the recording and reproduction operation after the transfer can be simplified.

Also, two MO disk arrays were provided in the related juke device, but a structure providing only one MO disk array or three or more arrays can be adopted. Also, each of the MO disk arrays 4 and 5 was constituted by five MO drives, but this may be constituted by the MO drives of a number in accordance with the design such as three, six, etc. Also, basically, the second MO disk array 5 was used as the stand-by array of the first MO disk array 4, but it is also possible to perform the recording and reproduction of the data by using all of the 10 MO drives in total constituting the MO disk arrays 4 and 5.

Also, the gripper 42 gripped and lifted the magneto-optic disks transferred to the mail box 41 one by one and transferred them to the magazines 21 and 22 etc., but it is also possible to provide a gripper which can grasp and lift for example five magneto-optic disks at one time and exchange five magneto-optic disks loaded in the MO disk arrays 4 and 5 at one time.

Also, the faulty drive or the faulty disk array was exchanged by hand by the user, but it is also possible to provide a magazine accommodating the MO drive or MO disk array for exchange and a manipulator for the exchange of the MO drive or MO disk array and automatically exchange the same by controlling the manipulator where the fault is detected by the controller block 23. When performing this, although the cost becomes higher than the juke device due to an increase of the number of parts, this rather becomes effective where the related juke device is used for data recording in for example a space vehicle or artificial satellite where human hands cannot reach.

Also, in the digital camera apparatus, the color picture data were recorded on the magneto-optic disks as the picture data, but it is sufficient so far as recording using a desired data format is carried out, for example the picture data are recorded on three magneto-optic disks as luminance data (Y) and two chroma data (Cr, Cb).

Finally, the magneto-optic disk was explained in detail by mentioning concrete numerical values, for example, it was constituted by 66 bytes of reference data, 2048 bytes of user data, 256 bytes of ECC, 8 bytes of CRC, 40 bytes of user defined data, and so on, but the present invention is not restricted to the above format and of course various changes are possible in accordance with the design etc. so far as it is within a range not out of the technical concept according to the present invention.

The recording apparatus according to the present invention divides a series of data and records this in parallel by a plurality of recording means and therefore can cope with data of a high transfer speed such as for example image data.

Also, it can continue the recording by automatically exchanging an already recorded disk-like recording medium with a new disk-like recording medium, and therefore an unlimited increase of capacity can be achieved.

Further, by providing a plurality of disk arrays, even when a trouble or the like occurs in one disk array, the recording can be carried out by activating the other disk array, and therefore the recording can be continued without an interruption of the recording due to the trouble, etc. and in addition one disk array in which the trouble occurred can be exchanged with a new disk array while continuing the recording. Accordingly, a removable system in which a partial exchange is easy can be realized.

What is claimed is:

1. A recording apparatus utilizing a series of RAID recording systems comprising:

a partially exchangeable disk array constituted by connecting a plurality of disk drives performing recording of data with respect to a loaded disk-like recording medium;

a loading and unloading means for loading and unloading a cartridge accommodating said disk-like recording medium with respect to the disk drives of said partially exchangeable disk array; and a control means for controlling the loading and unloading operation of the cartridge by said loading and unloading means and, at the same time, said control means controlling the recording operation for said partially exchangeable disk array by one of the RAID recording systems such that the data to be recorded on the disk-like recording medium loaded in one of the disk drives which is in a state of being loaded or unloaded is recorded successively on the disk-like recording medium loaded in another of the disk drives, and said control means controls said partially exchangeable disk array such that the disk drives record disk identification data indicative of the disk drive which recorded the data in the disk loaded therein and indicative of the order of the disk in which the recording operation is performed by the disk drive.

2. The recording apparatus as set forth in claim 1, further comprising an accommodating portion which can accommodate a plurality of said disk-like recording media, and wherein the control means controls said loading and unloading means so as to exchange the already recorded disk-like recording medium with a new disk-like recording medium accommodated in said accommodating portion whenever the recording is ended by the disk drives of said disk array.

3. The recording apparatus as set forth in claim 2, wherein said control means controls the recording operation for said disk array by the RAID recording system recording the same information with respect to said disk-like recording media.

4. The recording apparatus as set forth in claim 3, wherein said control means divides a series of information and controls the recording operation for said disk array by the RAID recording system performing the recording in parallel by the disk drives constituting the disk array.

5. The recording apparatus as set forth in claim 4, wherein said control means divides a series of information, forms the parity information of said divided information, and, at the same time, records the parity information of said information as one block by at least one disk drive among a plurality of disk drives constituting the disk array and controls the recording operation for said disk array by the RAID recording system recording said divided information in parallel by the remaining disk drives.

6. The recording apparatus as set forth in claim 5, wherein said control means divides a series of information, forms the parity information of said divided information, and, at the same time, controls the recording operation for said disk array by the RAID recording system performing the recording of said divided information and parity information in parallel by the disk drives constituting the disk array.

7. The recording apparatus as set forth in claim 6, wherein said control means controls the disk drives of said disk array so as to sequentially start the recording with a predetermined time difference, controls said loading and unloading means so as to sequentially perform the exchange control of the disks from the disk drive for which the recording is ended and, at the same time, supplies the information continuing from the information recorded by the disk drive for which the recording is ended to the disk drive for which the disk exchange is ended thereby to continue the recording of information.

8. The recording apparatus as set forth in claim 7, wherein said control means controls the disk drives so as to perform the start of recording and the disk. exchange at least for each two.

9. A RAID system comprising:

a partially exchangeable disk array having a plurality of disk drives each performing recording of data with respect to a disk-like recording medium loaded thereto;

loading and unloading means for loading and unloading a cartridge accommodating said disk-like recording medium with respect to the disk drives of said partially exchangeable disk array; and control means for controlling the loading and unloading operation of the cartridge and for controlling the recording operation of the disk drives so as to perform RAID operation with respect to each of the disk-like recording media loaded in said disk drives and for controlling said partially exchangeable disk array such that the disk drives record disk identification data indicative of the disk drive which recorded the data in the disk loaded therein and indicative of the order of the disk in which the recording operation is performed by the disk drive.

* * * * *